Figure 1:
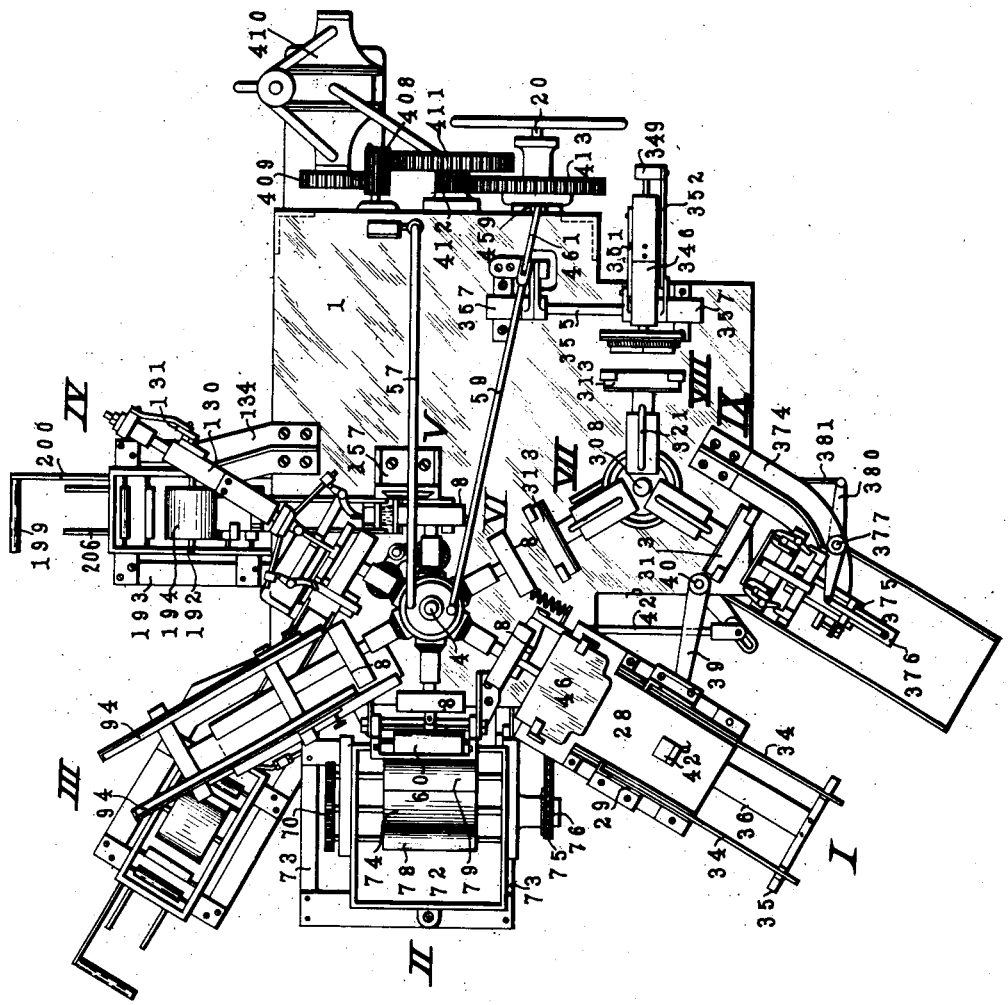

Nov. 27, 1928.

H. CARLE 1,693,136

MACHINE FOR MAKING PAPER BOXES

Original Filed April 27, 1923    32 Sheets-Sheet 1

INVENTOR
Harold Carle
BY
Duell, Warfield & Duell
ATTORNEY

Nov. 27, 1928.  1,693,136
H. CARLE
MACHINE FOR MAKING PAPER BOXES
Original Filed April 27, 1923  32 Sheets-Sheet 2
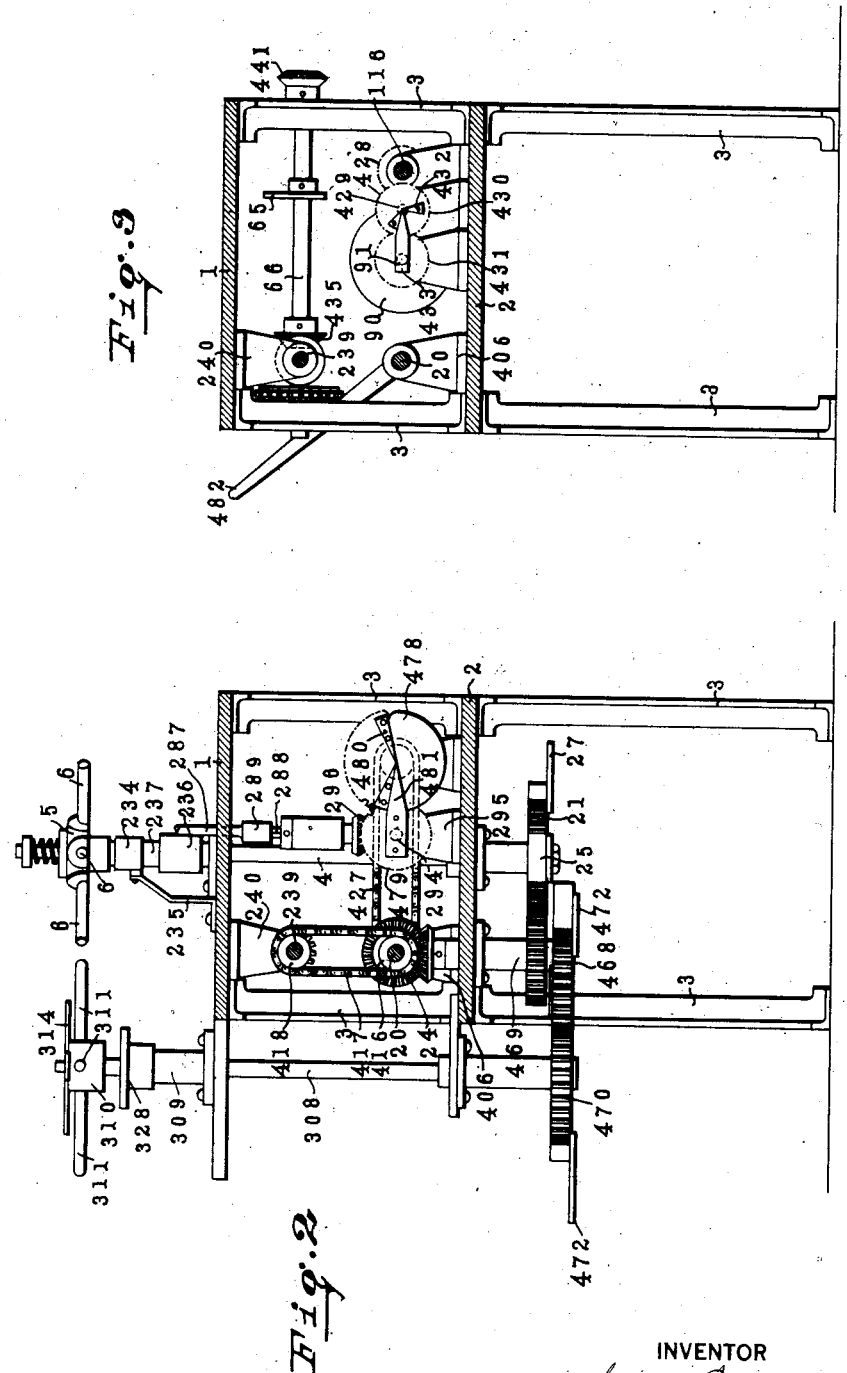
INVENTOR
Harold Carle
BY
Duell, Warfield & Duell
ATTORNEY Nov. 27, 1928.

H. CARLE 1,693,136

MACHINE FOR MAKING PAPER BOXES

Original Filed April 27, 1923   32 Sheets-Sheet 3

INVENTOR
Harold Carle
BY
Duell, Warfield & Duell
ATTORNEY

Nov. 27, 1928.
H. CARLE
1,693,136
MACHINE FOR MAKING PAPER BOXES
Original Filed April 27, 1923
32 Sheets-Sheet 4
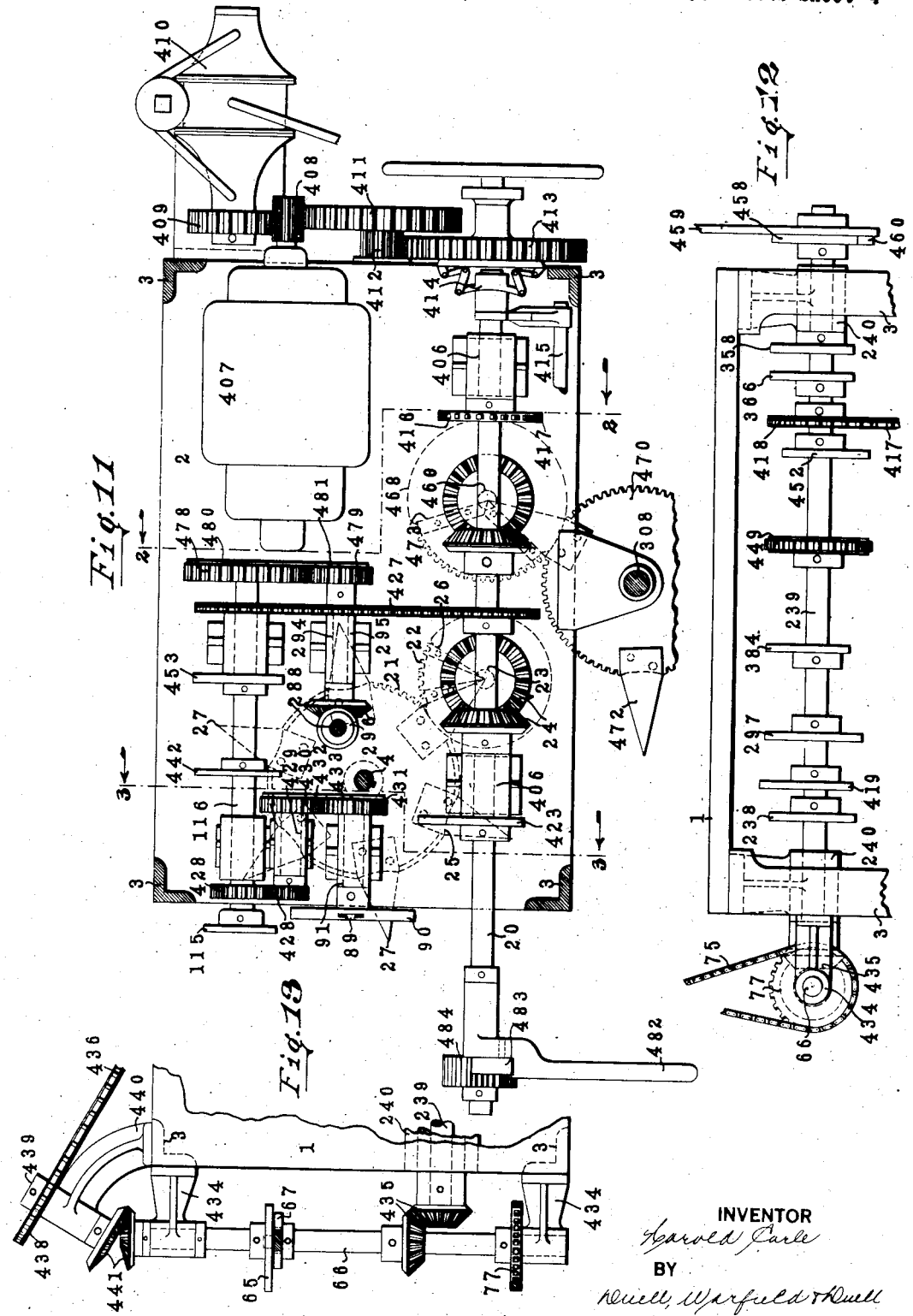
INVENTOR
Harold Carle
BY
Duell, Warfield & Duell
ATTORNEY Nov. 27, 1928.
H. CARLE
1,693,136
MACHINE FOR MAKING PAPER BOXES
Original Filed April 27, 1923   32 Sheets-Sheet 5
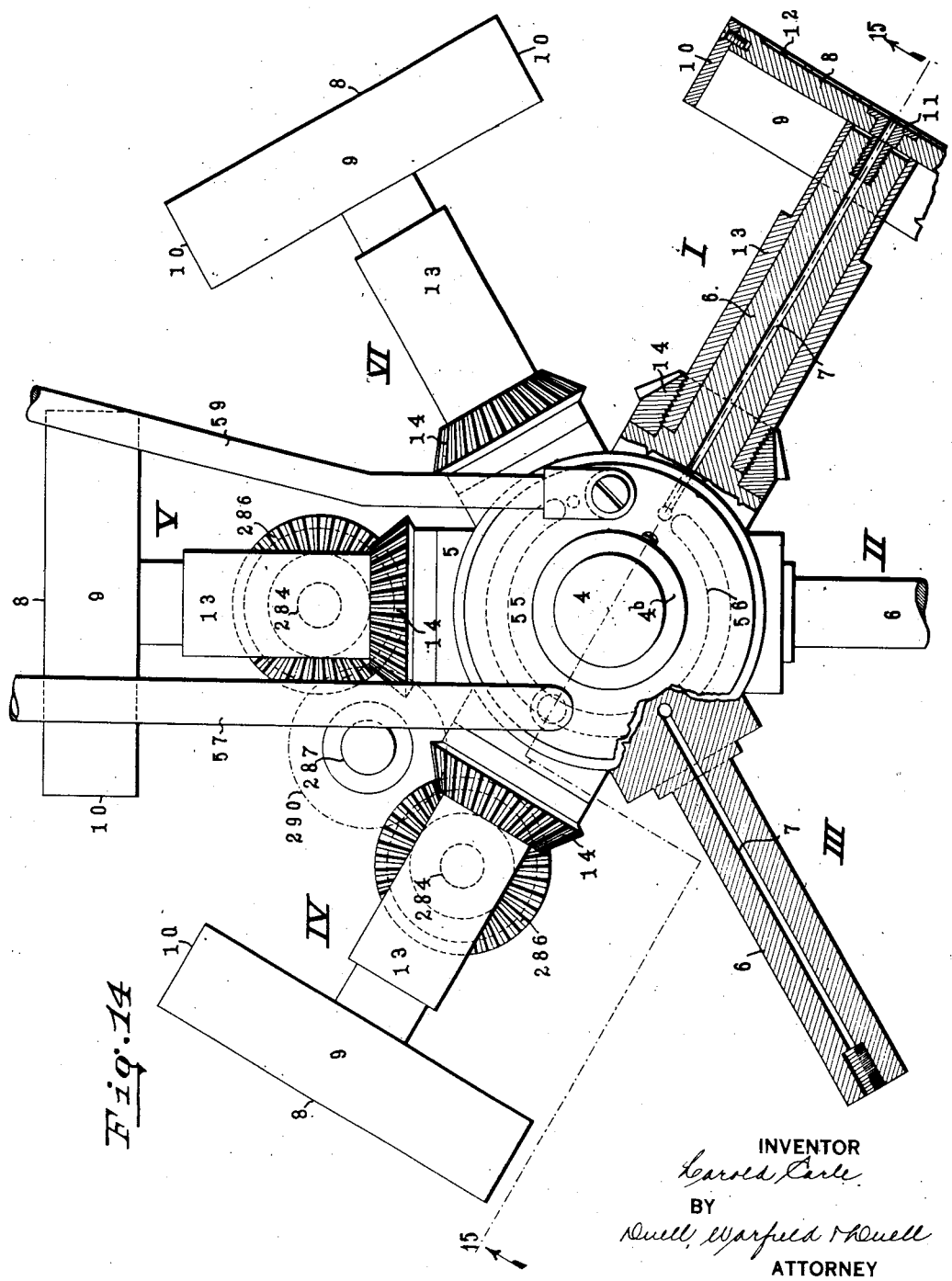
INVENTOR
Harold Carle
BY
Duell, Warfield & Duell
ATTORNEY Nov. 27, 1928.
1,693,136
H. CARLE
MACHINE FOR MAKING PAPER BOXES
Original Filed April 27, 1923
32 Sheets-Sheet 6
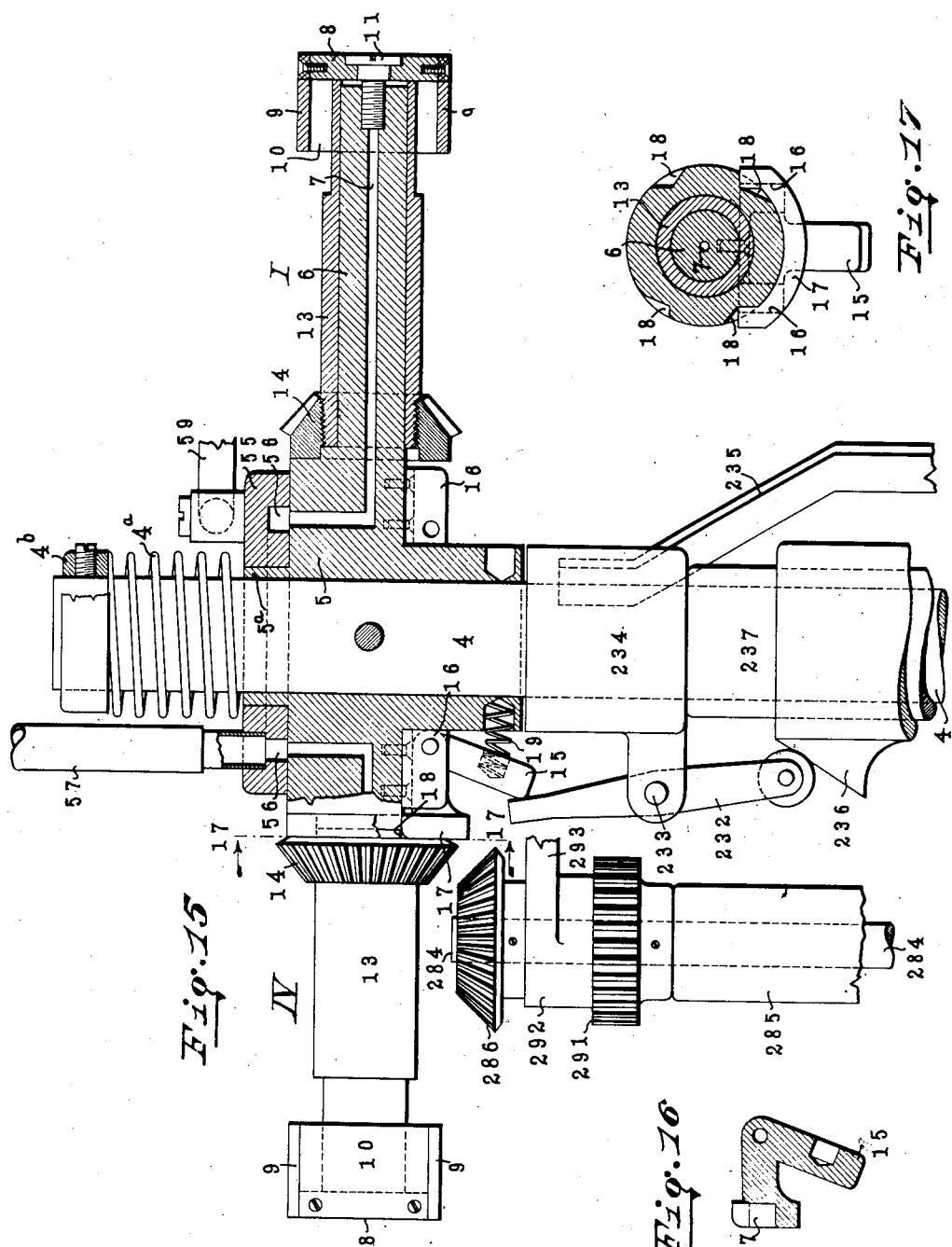
INVENTOR
Harold Carle
BY
Duell, Warfield & Duell
ATTORNEY Nov. 27, 1928.
H. CARLE
1,693,136
MACHINE FOR MAKING PAPER BOXES
Original Filed April 27, 1923   32 Sheets-Sheet 7
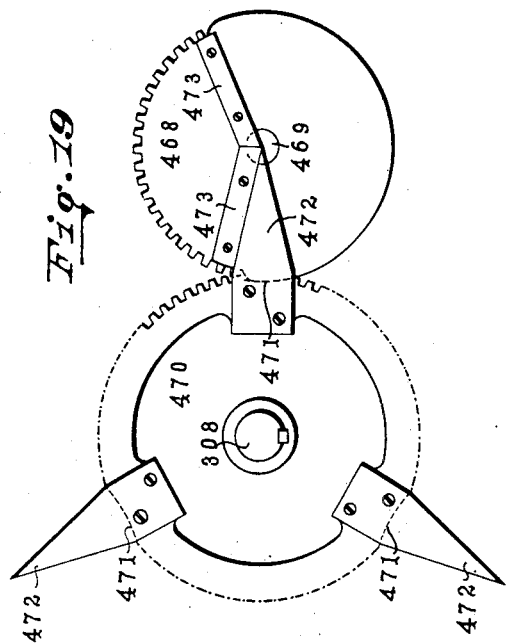
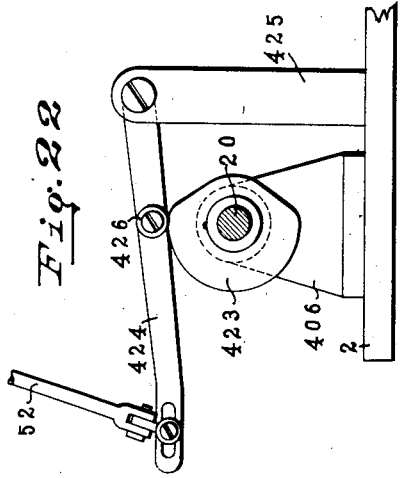
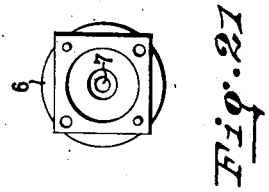
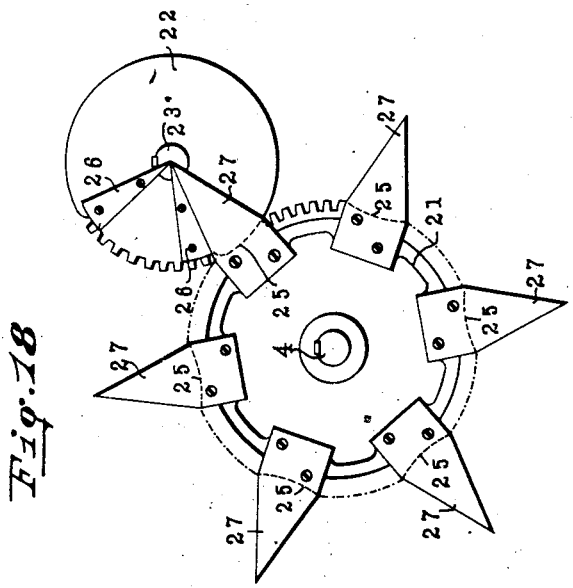
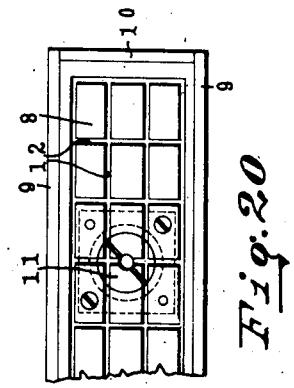
INVENTOR
Harold Carle
BY
Duell, Warfield & Duell
ATTORNEY Nov. 27, 1928.  
H. CARLE  
1,693,136  
MACHINE FOR MAKING PAPER BOXES  
Original Filed April 27, 1923   32 Sheets-Sheet 8

INVENTOR  
*Harold Carle*  
BY  
*Duell, Warfield & Duell*  
ATTORNEY

Nov. 27, 1928.

H. CARLE 1,693,136

MACHINE FOR MAKING PAPER BOXES

Original Filed April 27, 1923 32 Sheets-Sheet 9

INVENTOR
Harold Carle
BY
Duell, Warfield & Duell
ATTORNEY

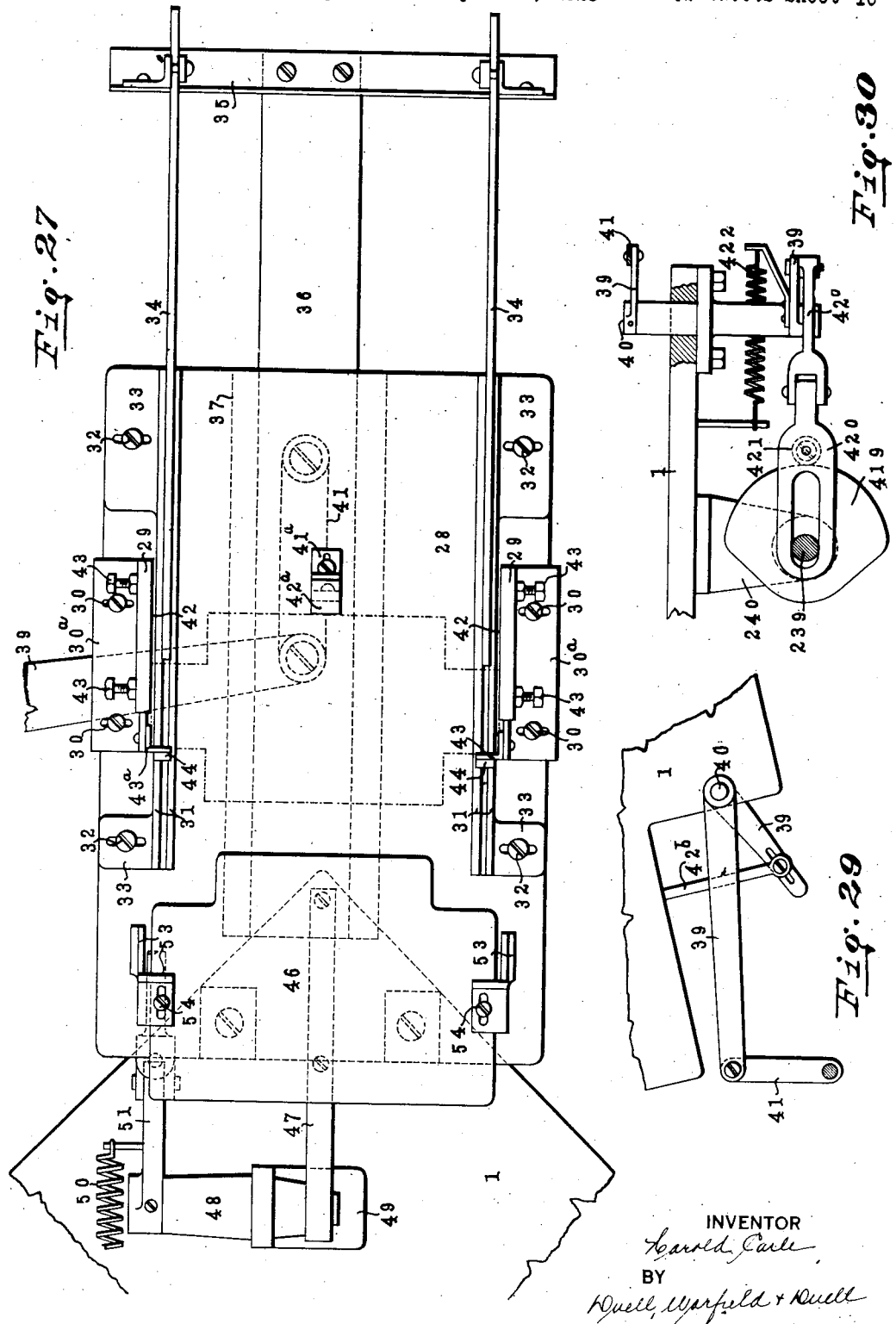

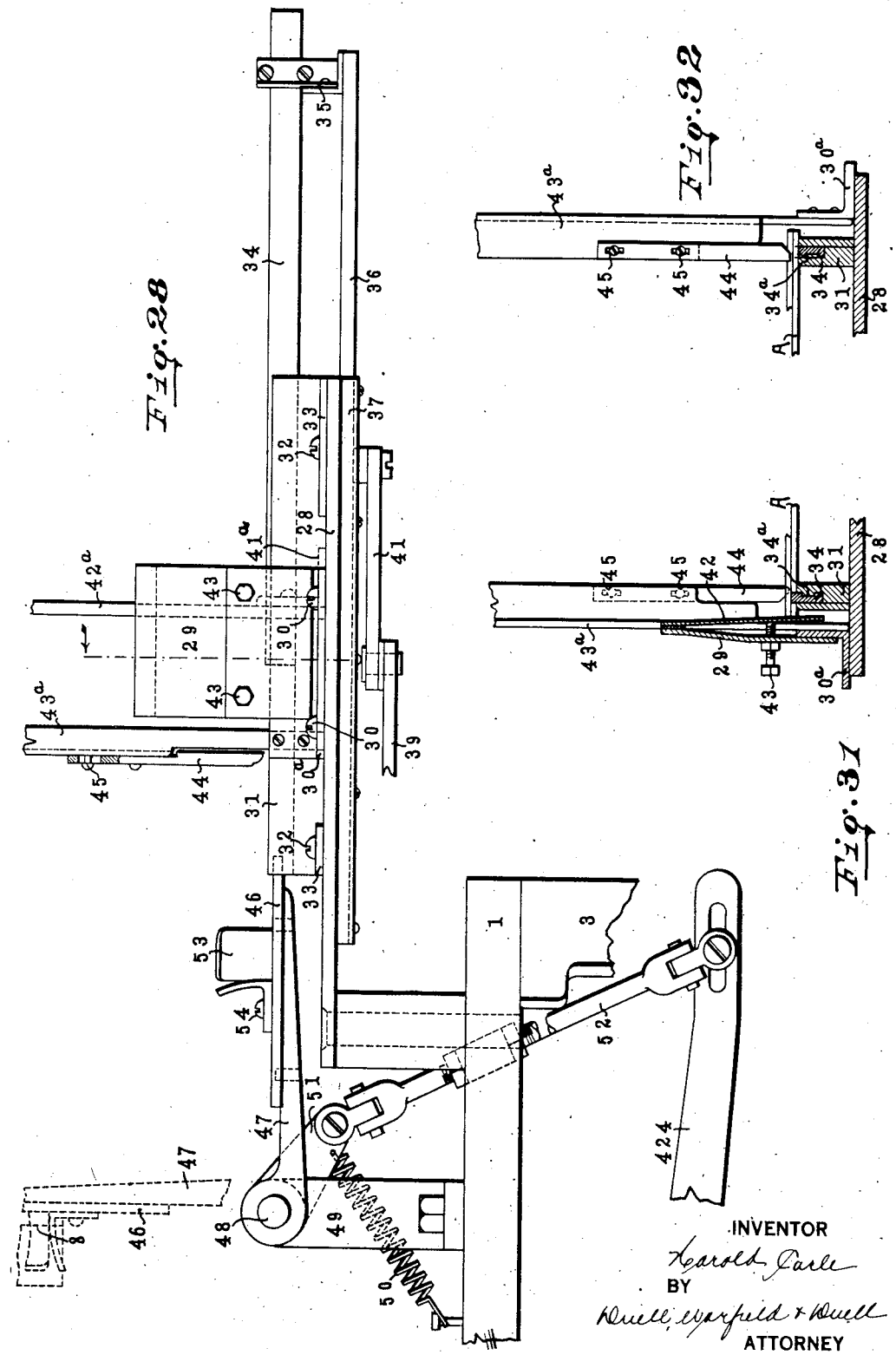

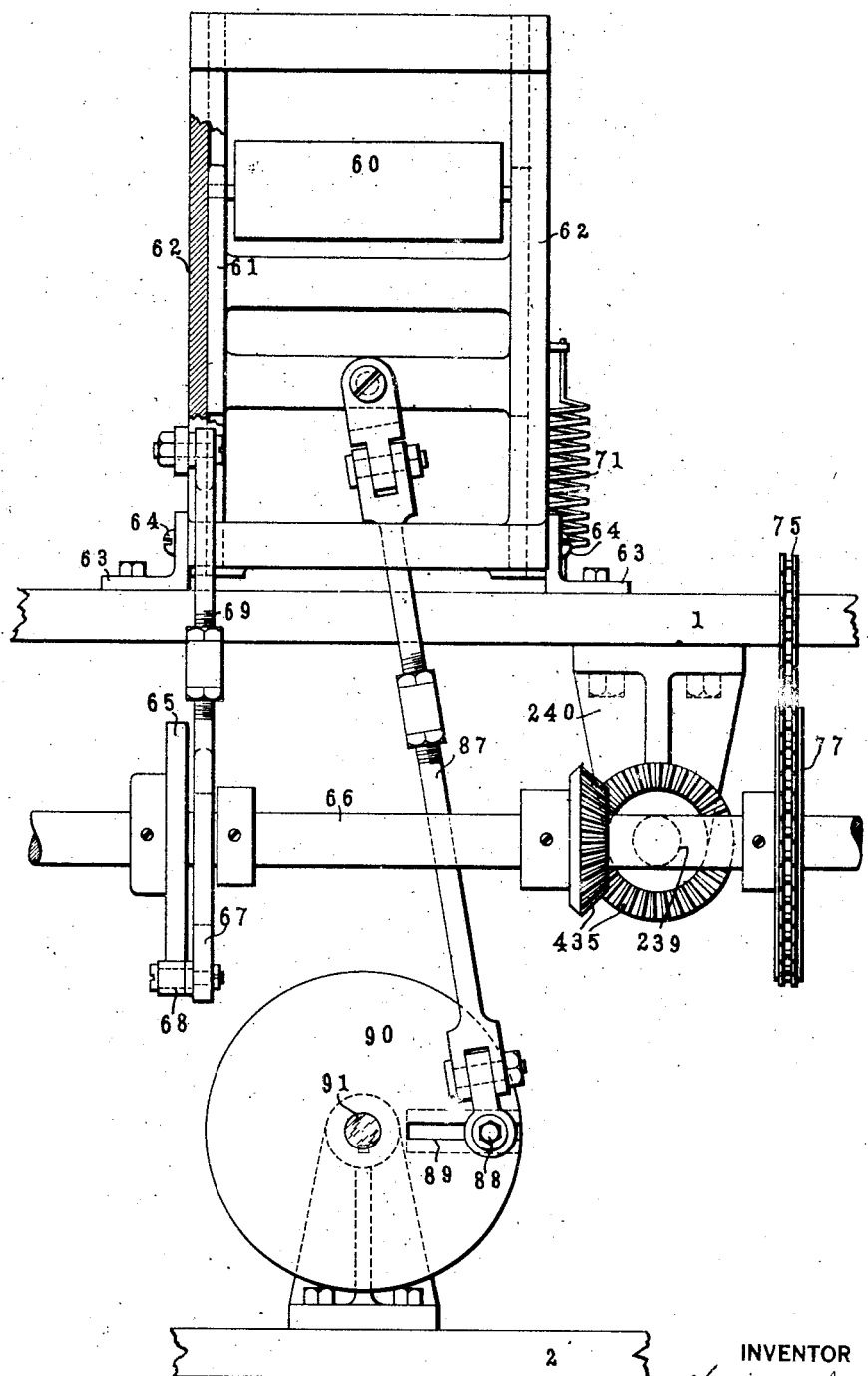

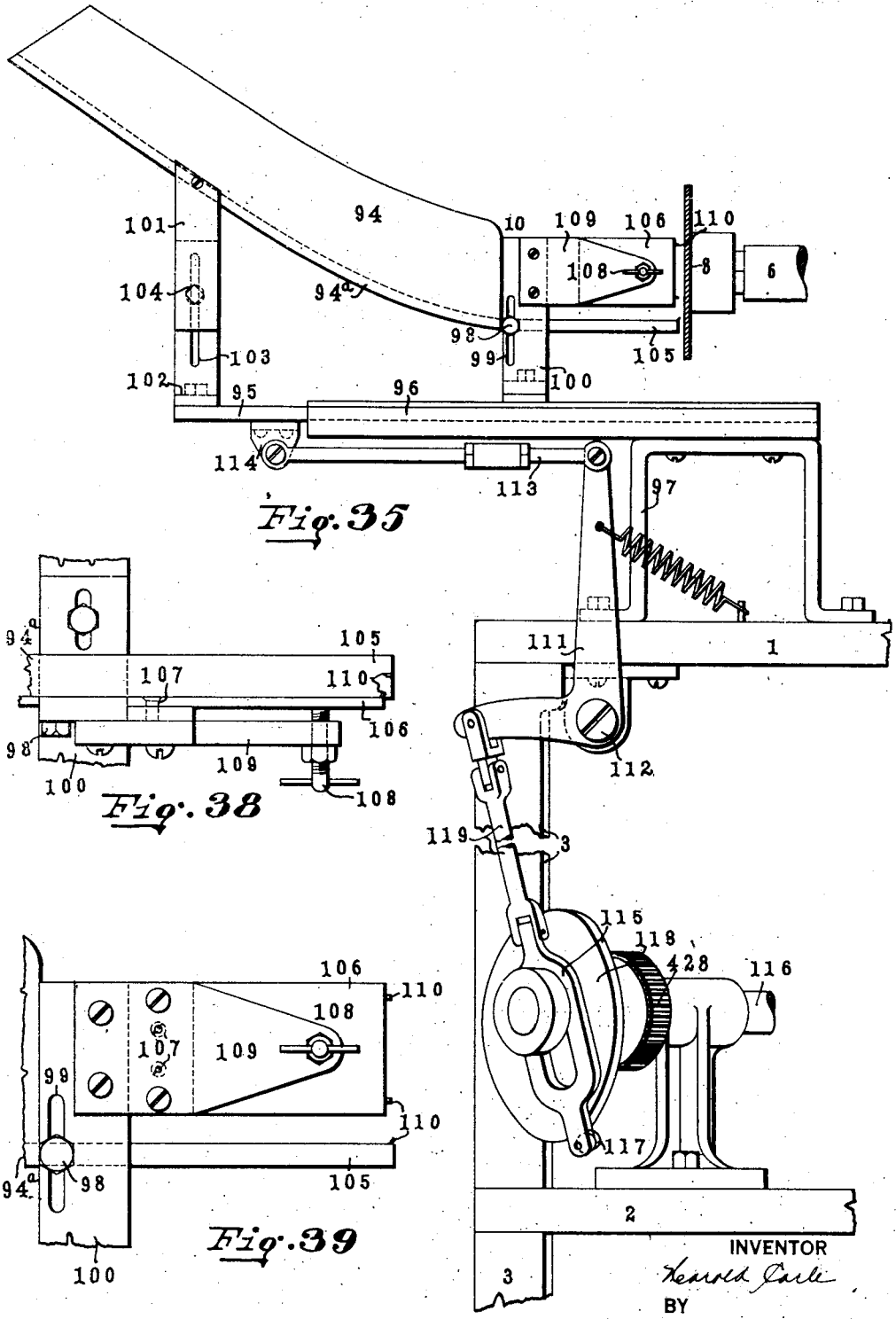

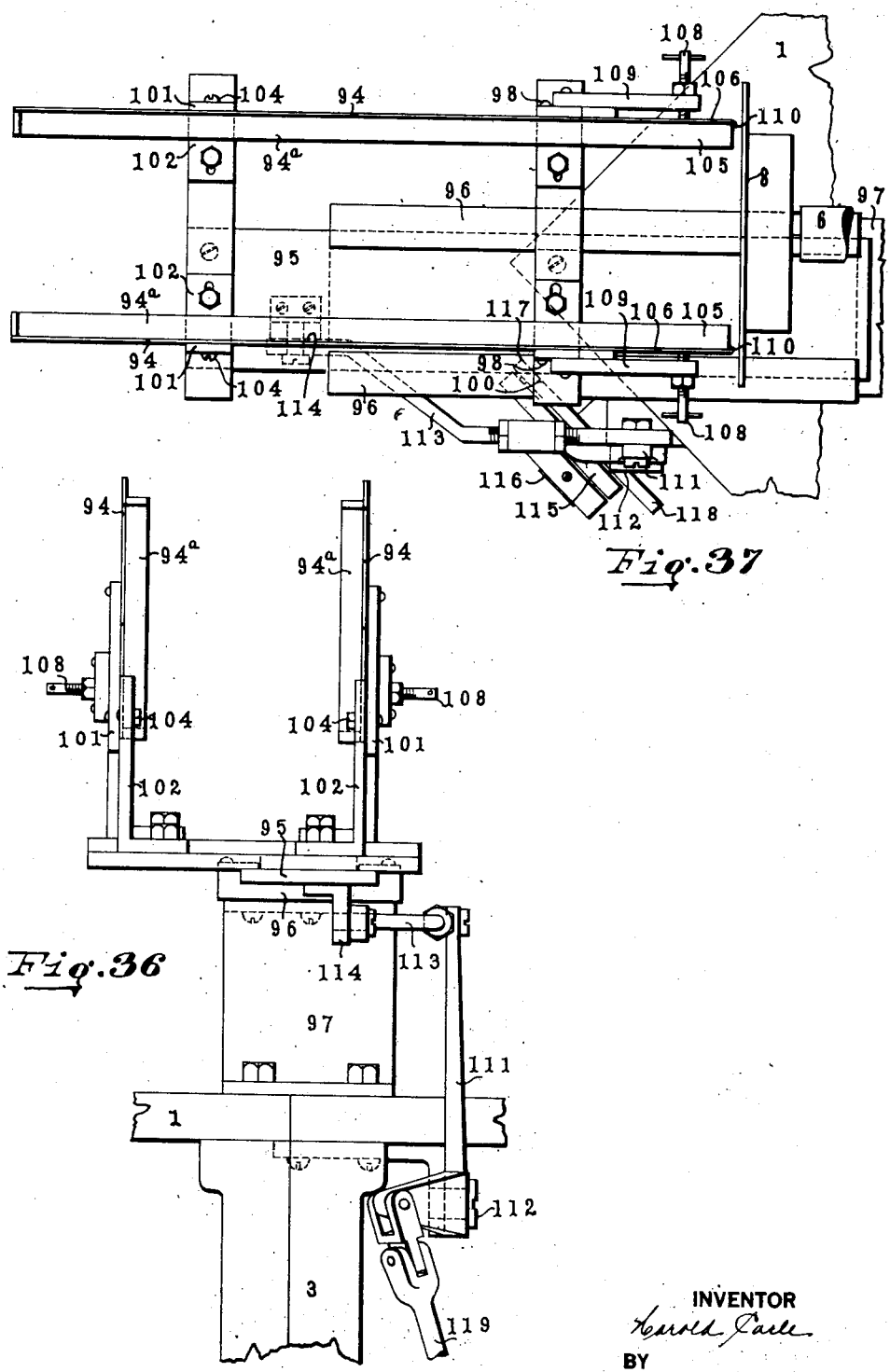

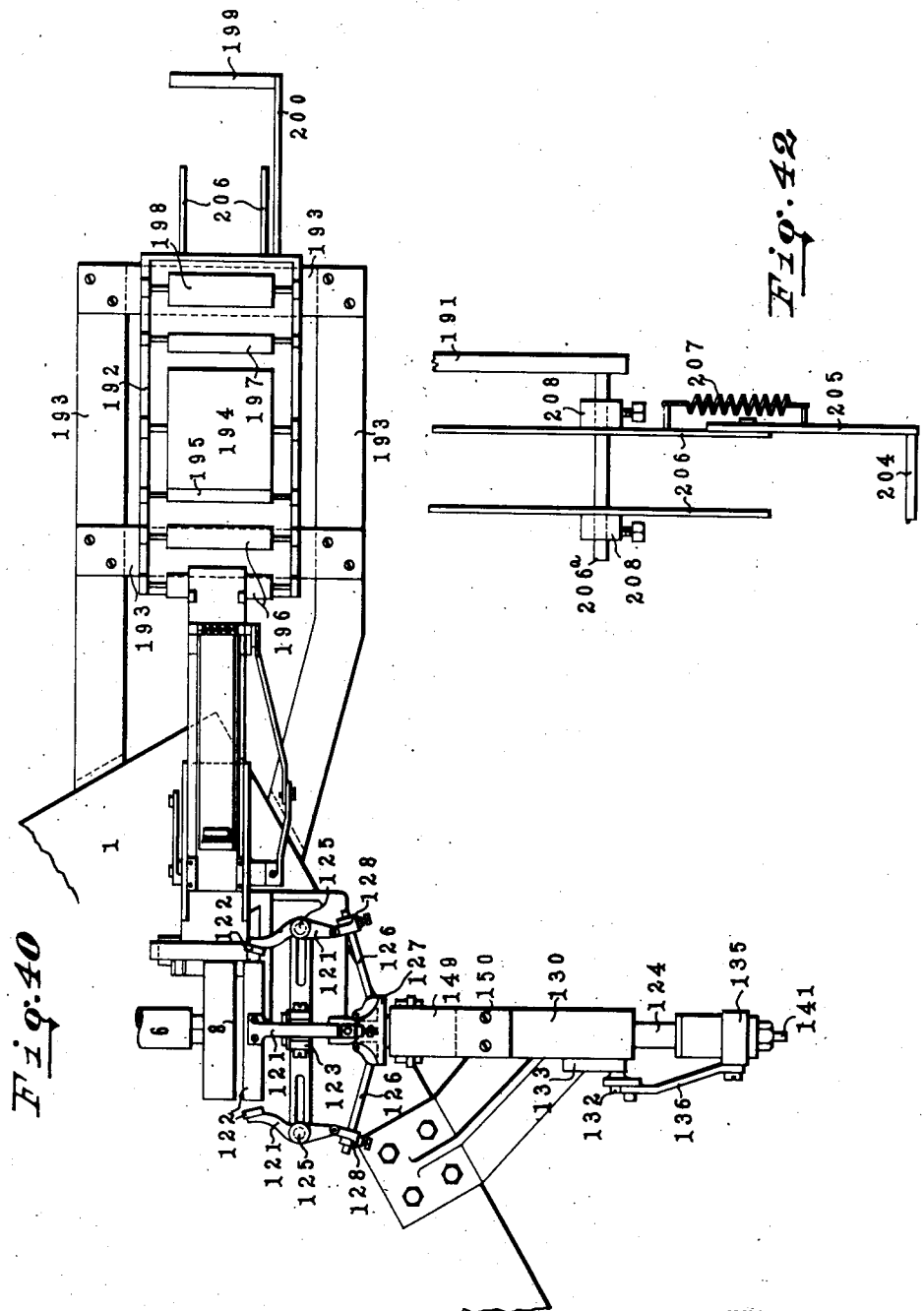

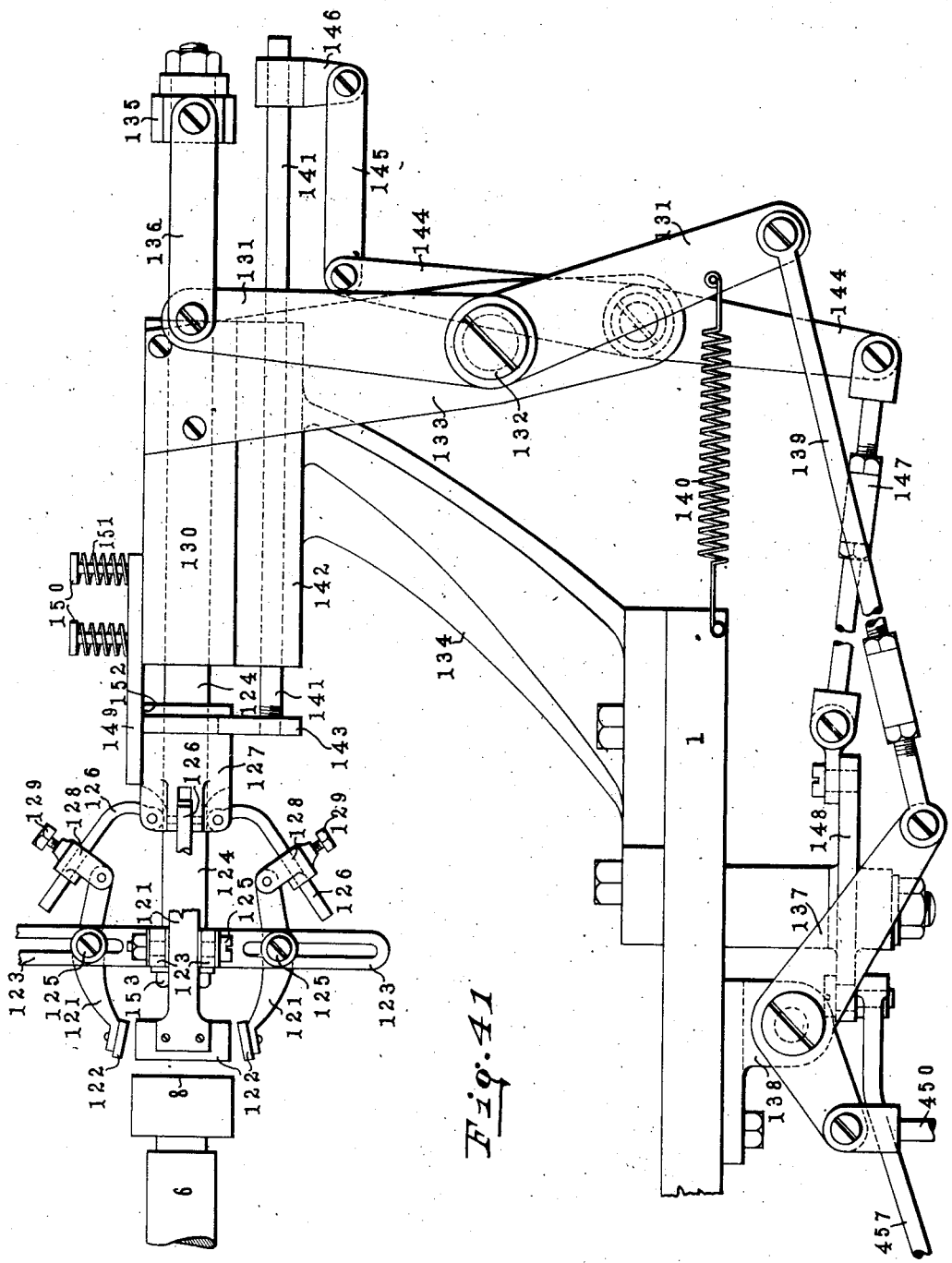

Nov. 27, 1928.  H. CARLE  1,693,136
MACHINE FOR MAKING PAPER BOXES
Original Filed April 27, 1923  32 Sheets-Sheet 18
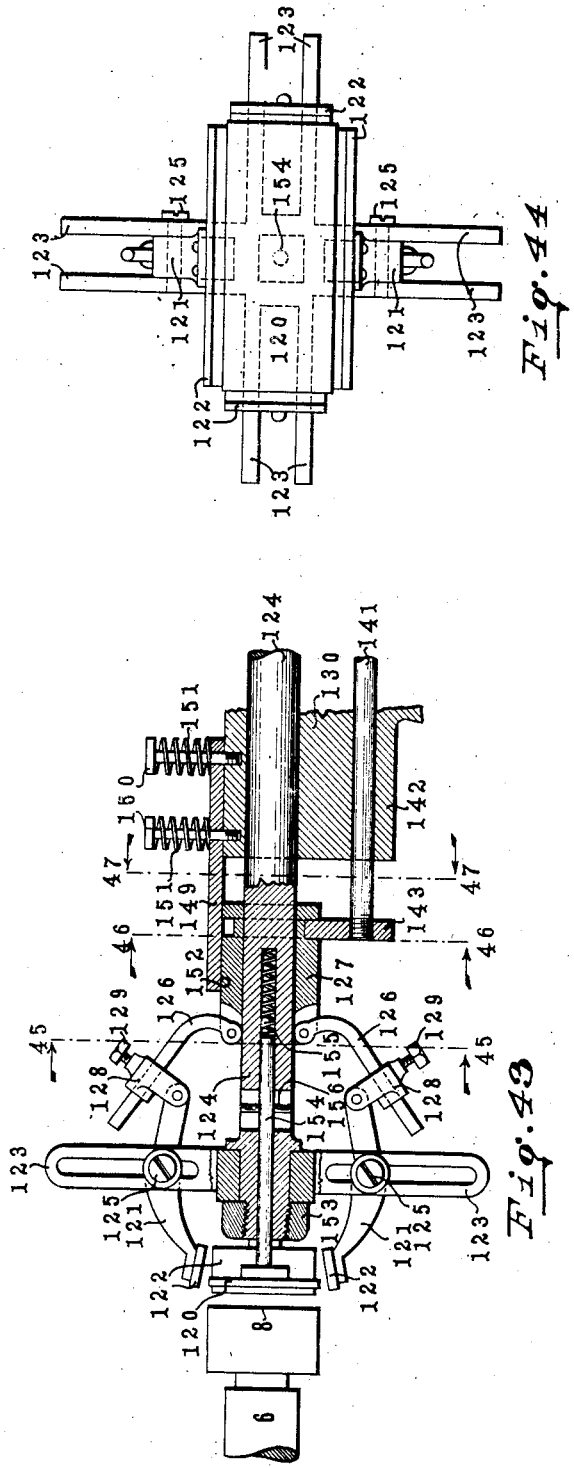
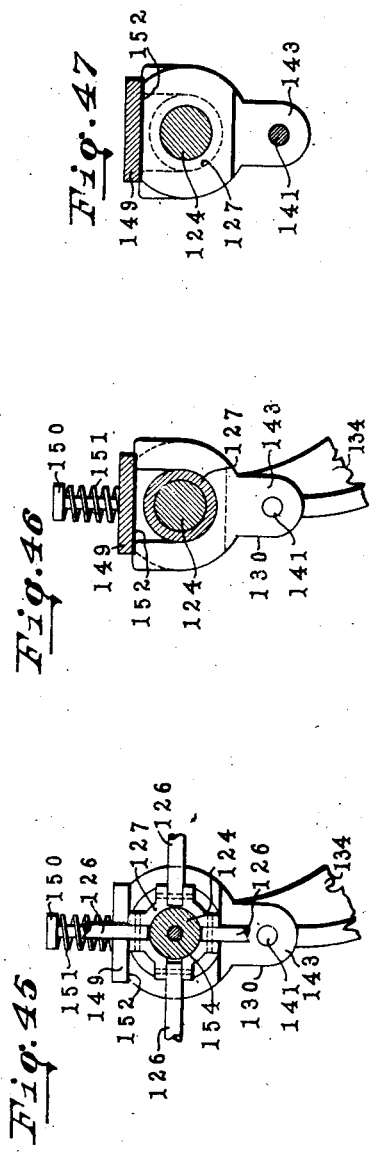
INVENTOR
Harold Carle,
BY
Duell, Warfield & Duell
ATTORNEY Nov. 27, 1928.
H. CARLE
1,693,136
MACHINE FOR MAKING PAPER BOXES
Original Filed April 27, 1923     32 Sheets-Sheet 19
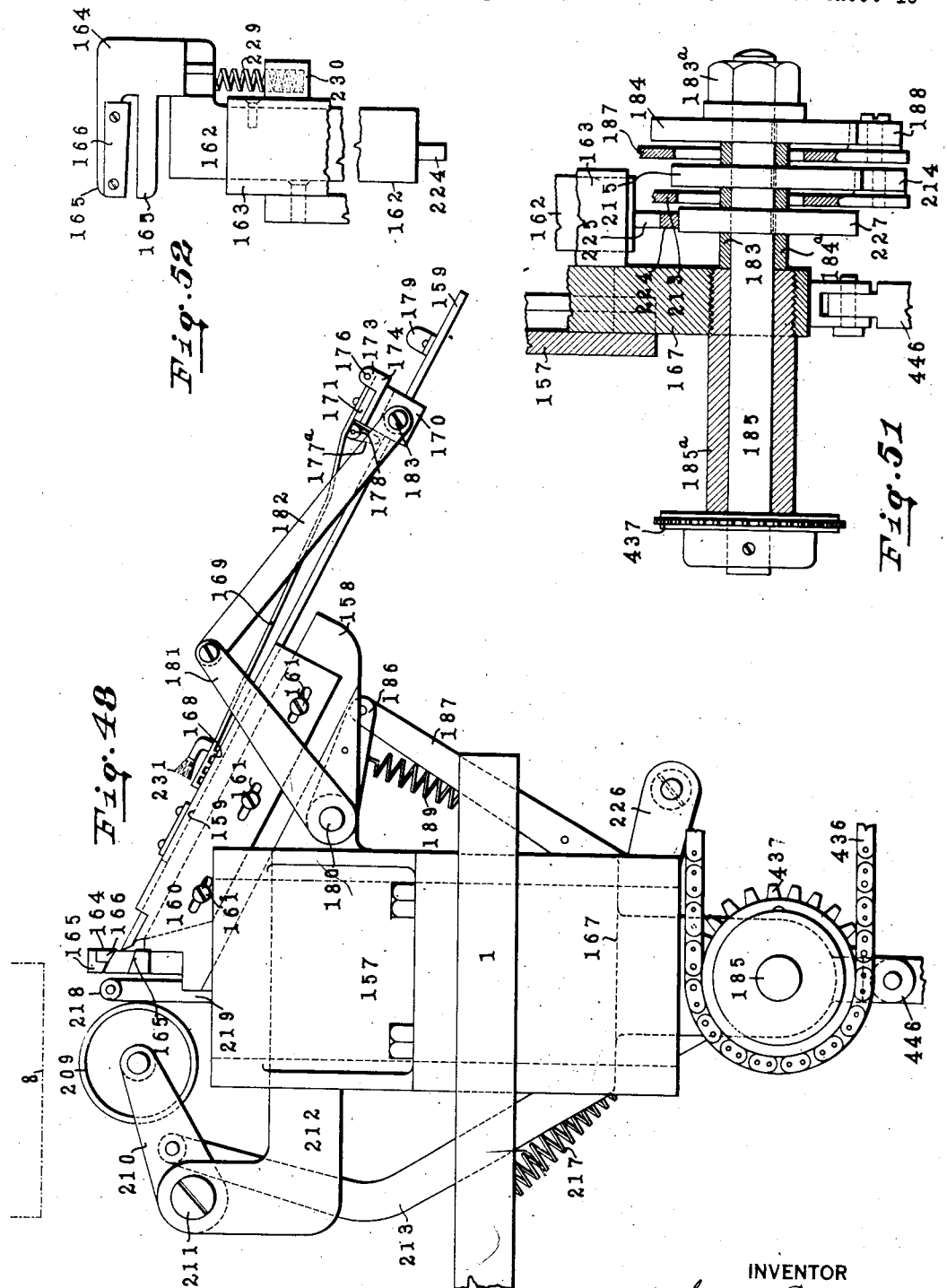
INVENTOR
Harold Carle
BY
Duell, Warfield & Duell
ATTORNEY

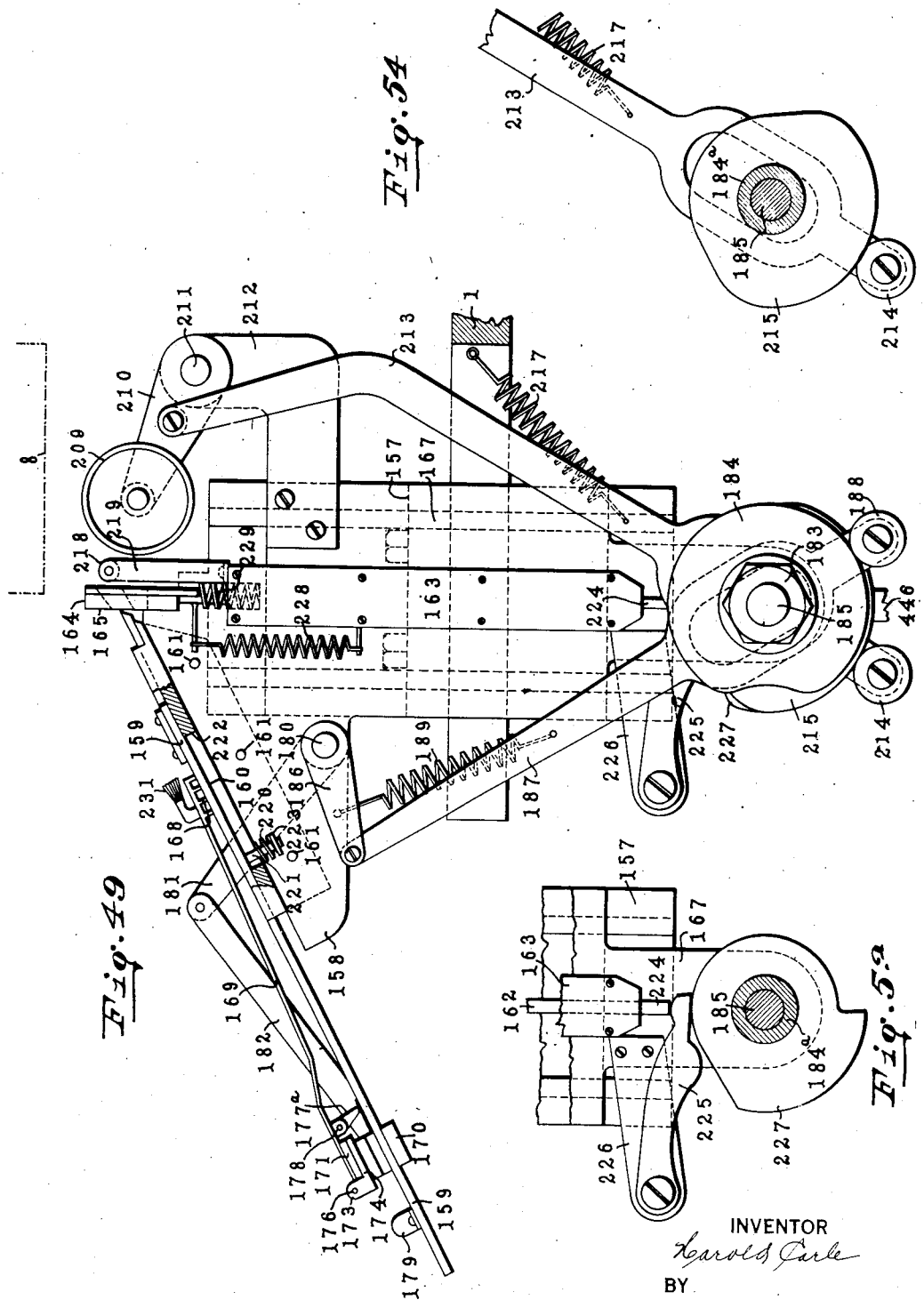

Nov. 27, 1928.                                              1,693,136
H. CARLE
MACHINE FOR MAKING PAPER BOXES
Original Filed April 27, 1923         32 Sheets-Sheet 21
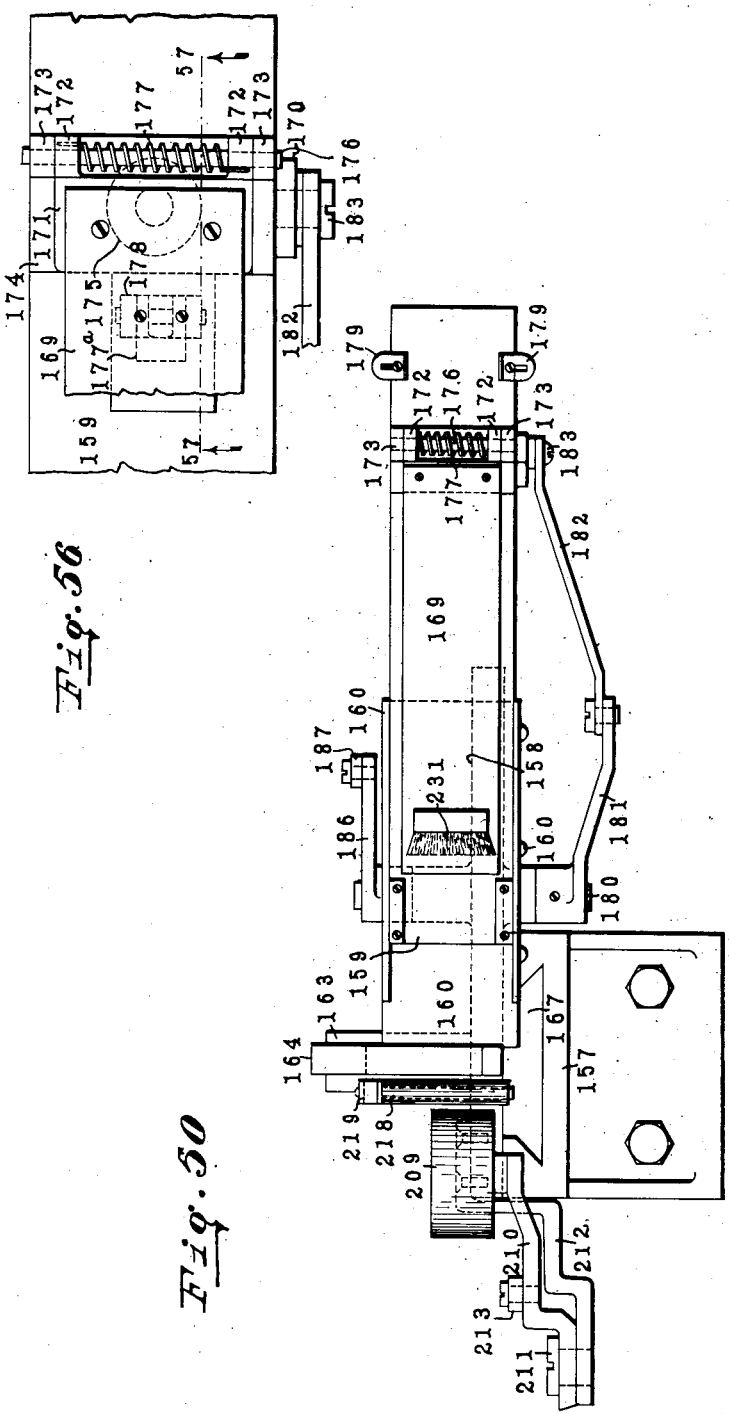
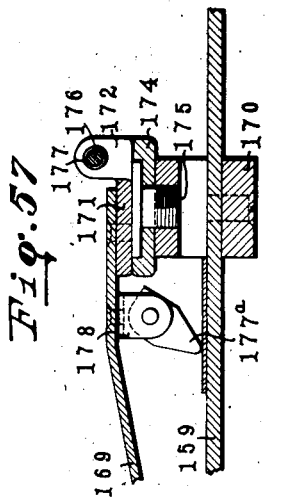
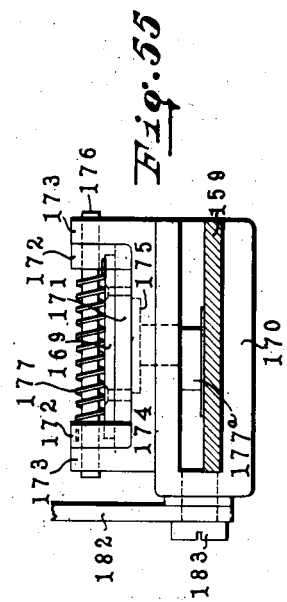
INVENTOR
Harold Carle
BY
Duell, Warfield & Duell
ATTORNEY Nov. 27, 1928.
H. CARLE
1,693,136
MACHINE FOR MAKING PAPER BOXES
Original Filed April 27, 1923
32 Sheets-Sheet 22
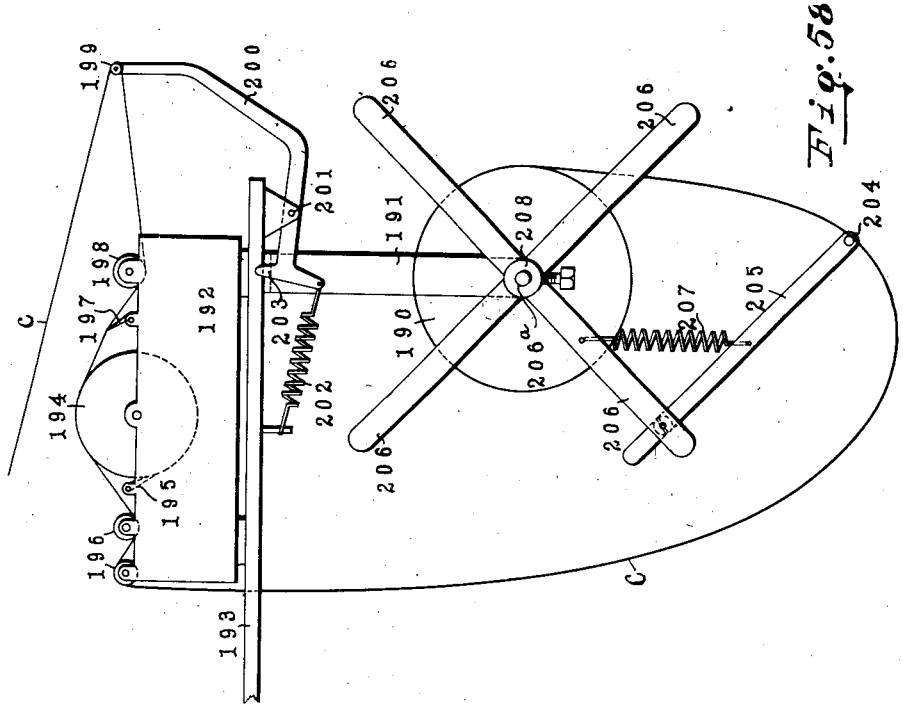
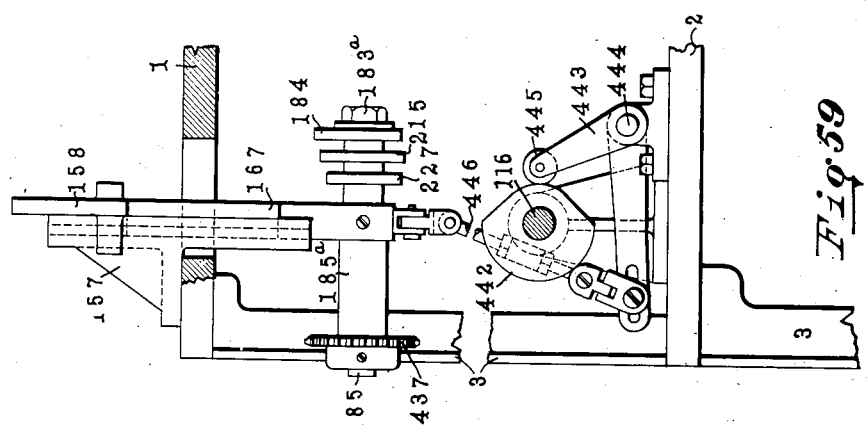
INVENTOR
Harold Carle
BY
Duell, Warfield & Duell
ATTORNEY Nov. 27, 1928.  
H. CARLE  
1,693,136  
MACHINE FOR MAKING PAPER BOXES  
Original Filed April 27, 1923   32 Sheets-Sheet 23
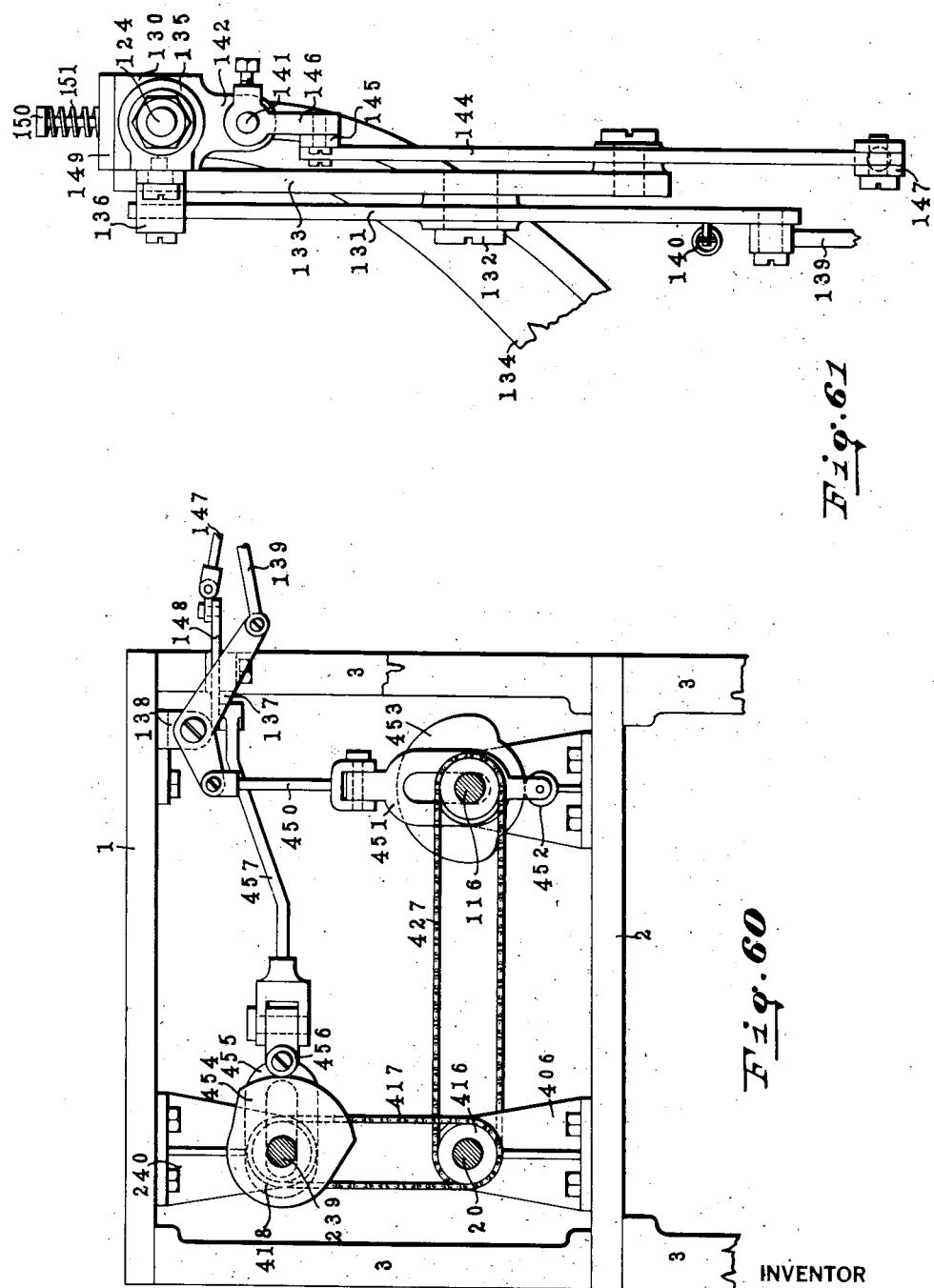

Nov. 27, 1928.  
H. CARLE  
1,693,136  
MACHINE FOR MAKING PAPER BOXES  
Original Filed April 27, 1923  32 Sheets-Sheet 24
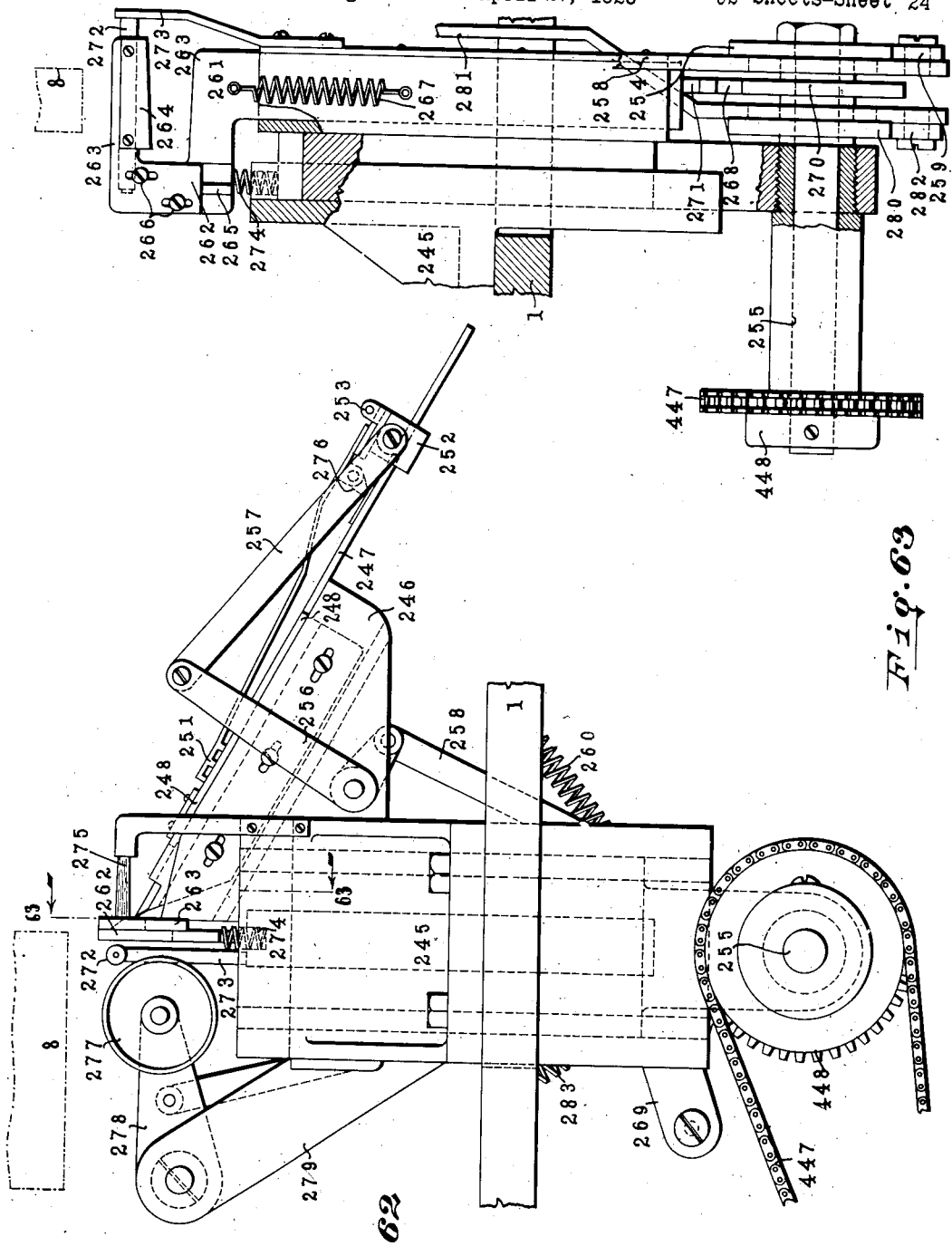
INVENTOR  
Harold Carle  
BY  
Duell, Warfield & McDuell  
ATTORNEY

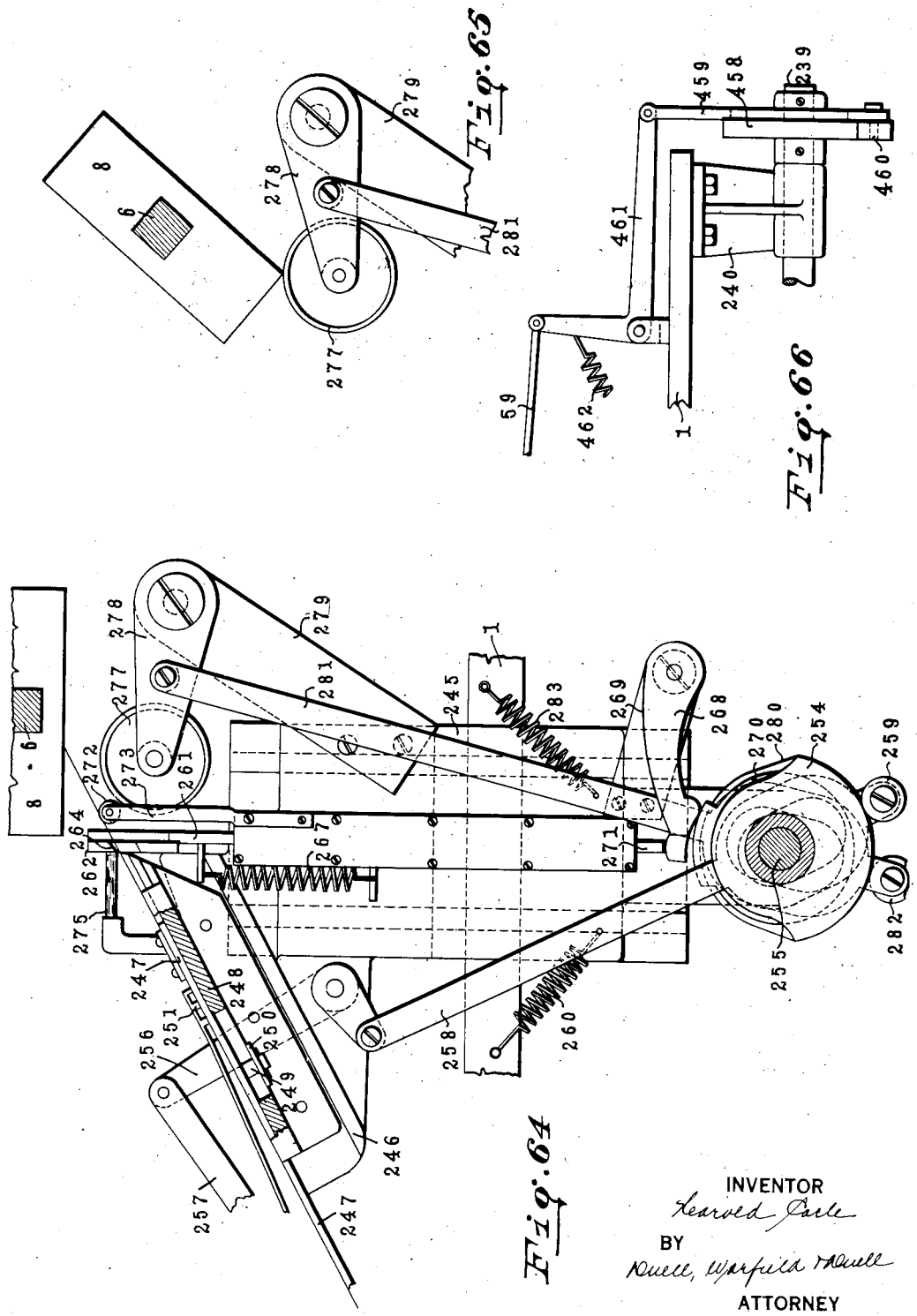

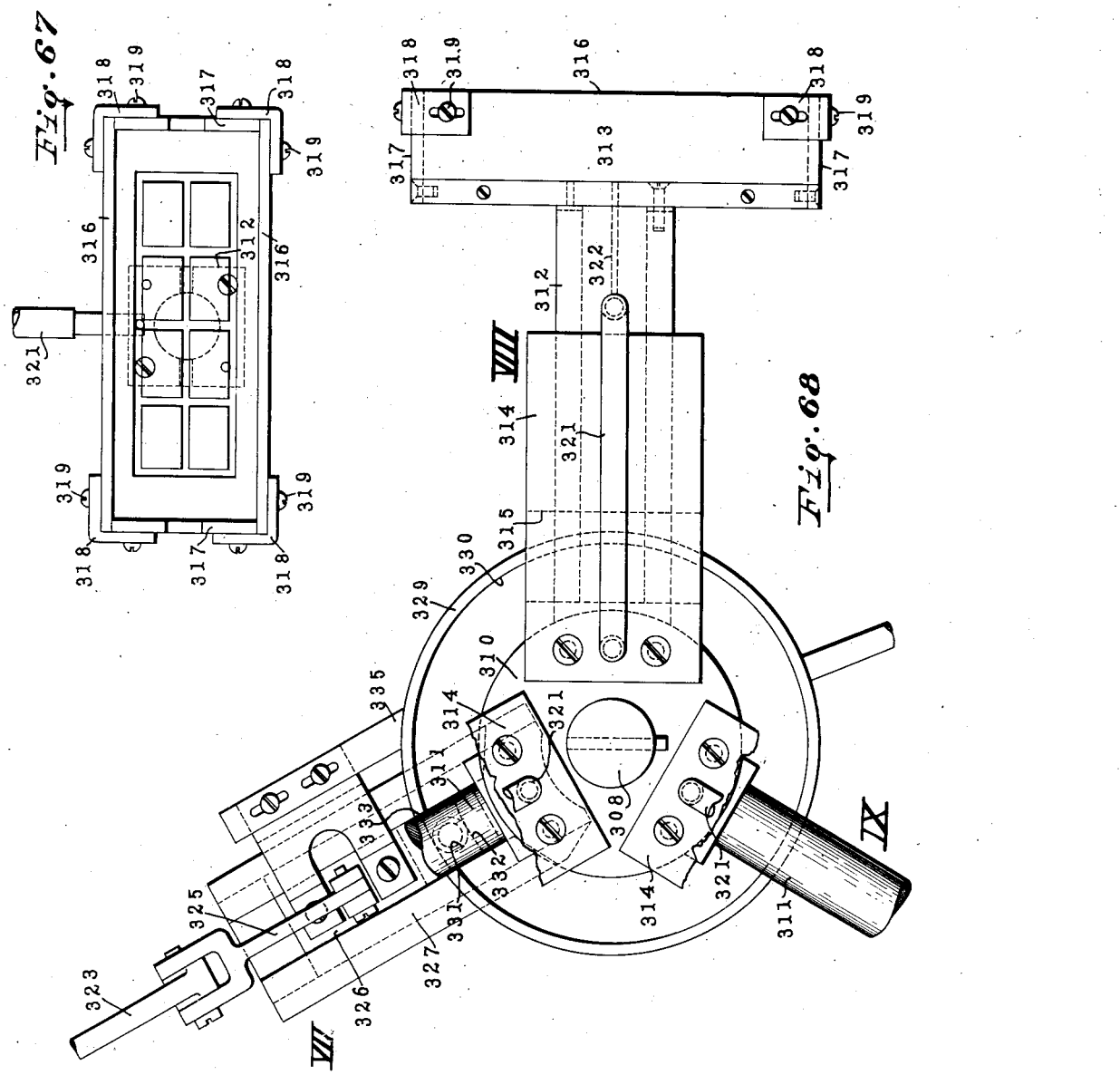

Nov. 27, 1928.
H. CARLE
1,693,136
MACHINE FOR MAKING PAPER BOXES
Original Filed April 27, 1923      32 Sheets-Sheet 27
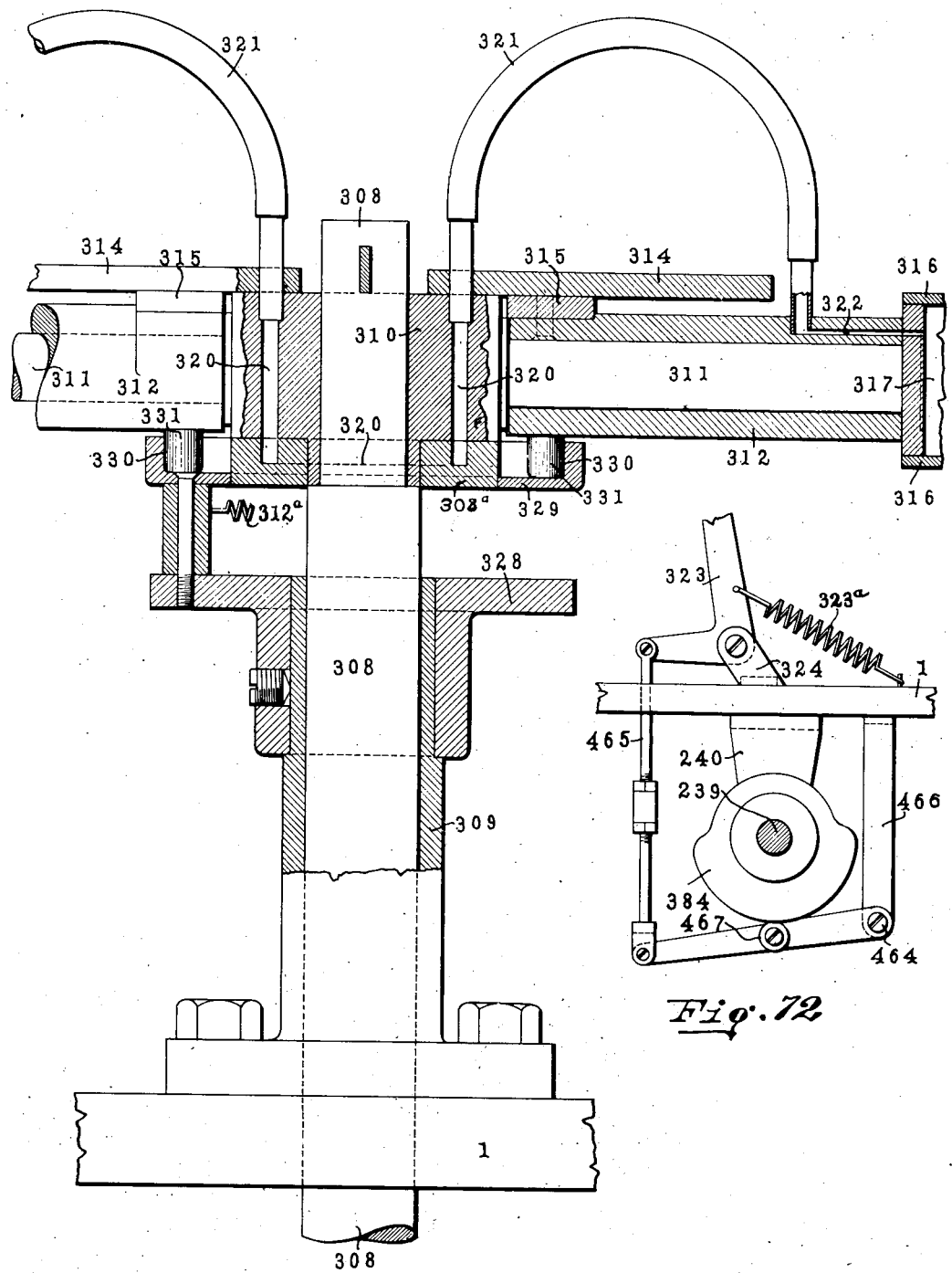

Nov. 27, 1928.

H. CARLE 1,693,136

MACHINE FOR MAKING PAPER BOXES

Original Filed April 27, 1923   32 Sheets-Sheet 28

INVENTOR
Harold Carle
BY
Duell, Warfield & Duell
ATTORNEY

Nov. 27, 1928.
H. CARLE
1,693,136
MACHINE FOR MAKING PAPER BOXES
Original Filed April 27, 1923   32 Sheets-Sheet 29
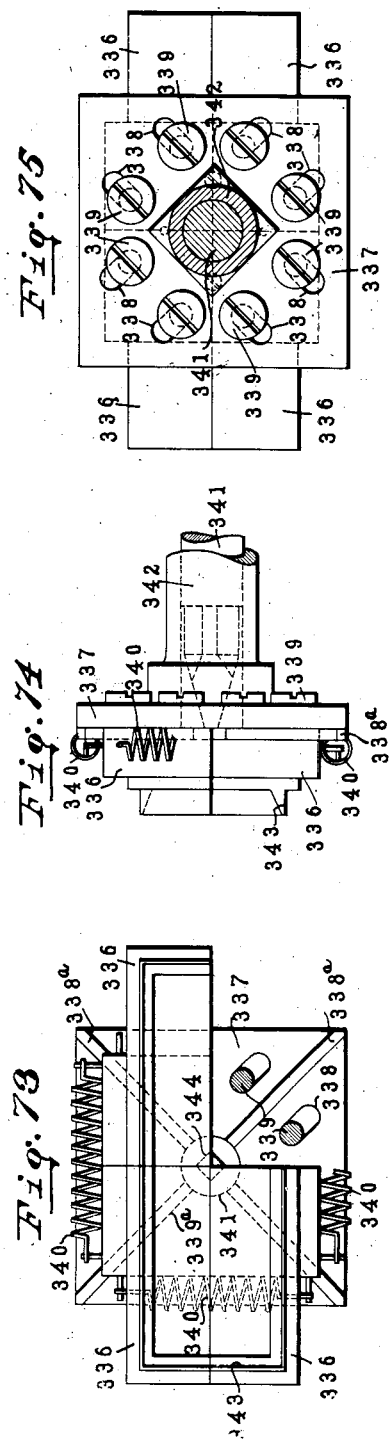
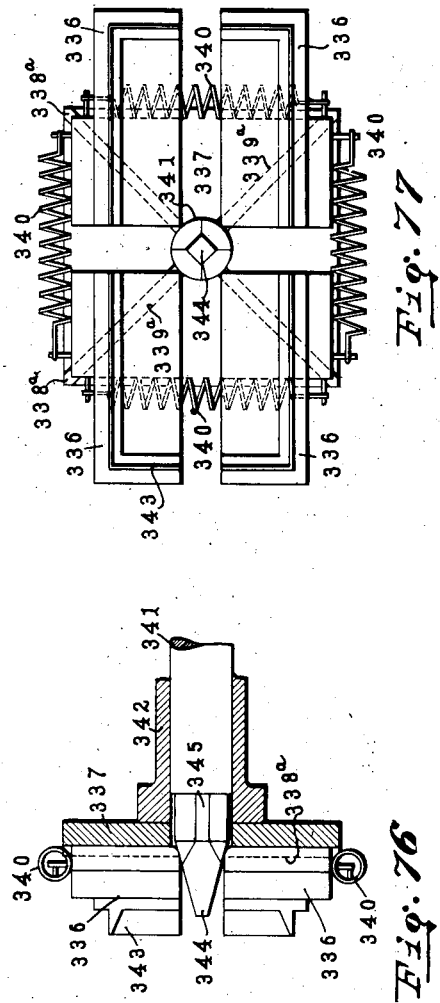
INVENTOR
Harold Carle
BY
Duell, Warfield & Duell
ATTORNEY

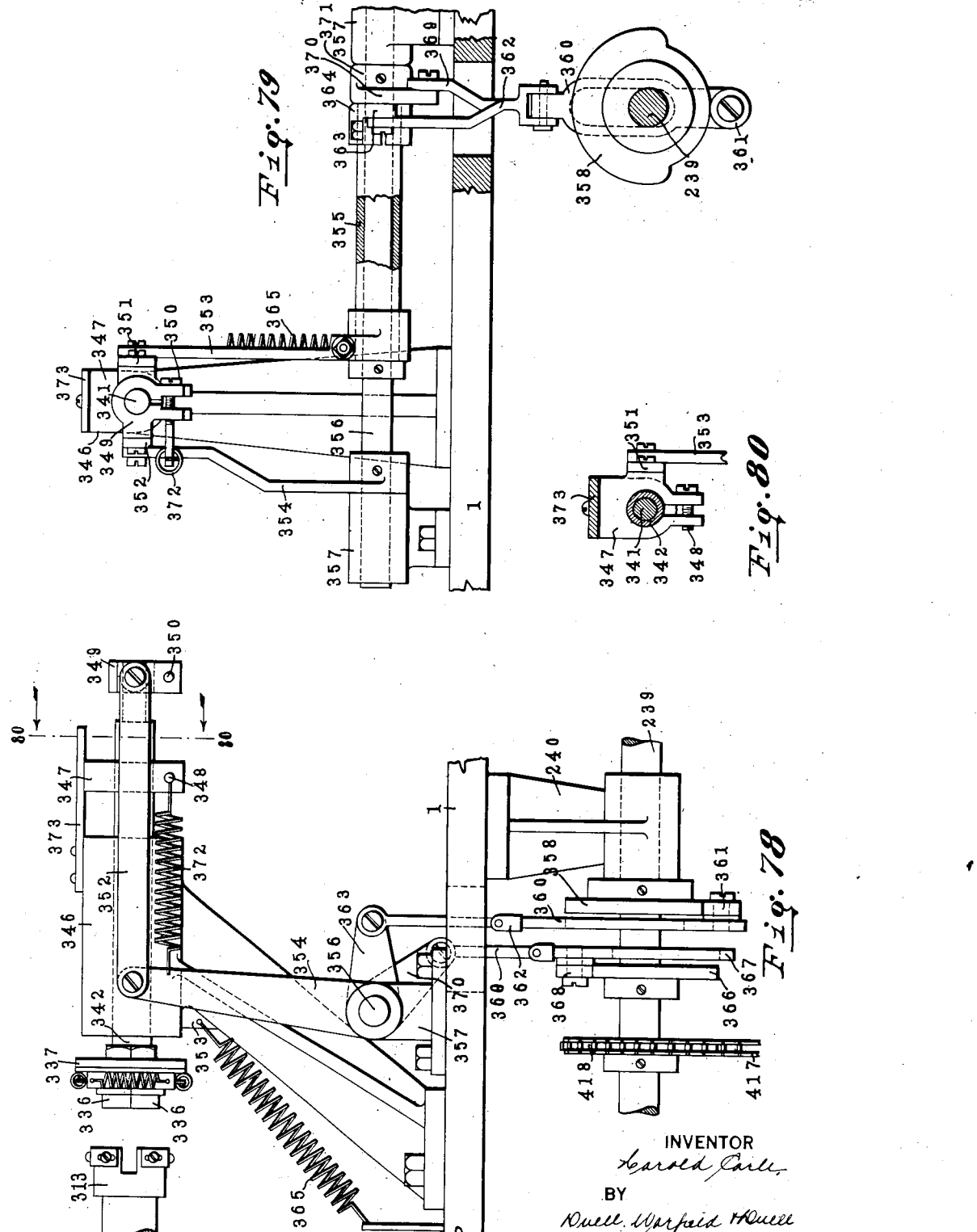

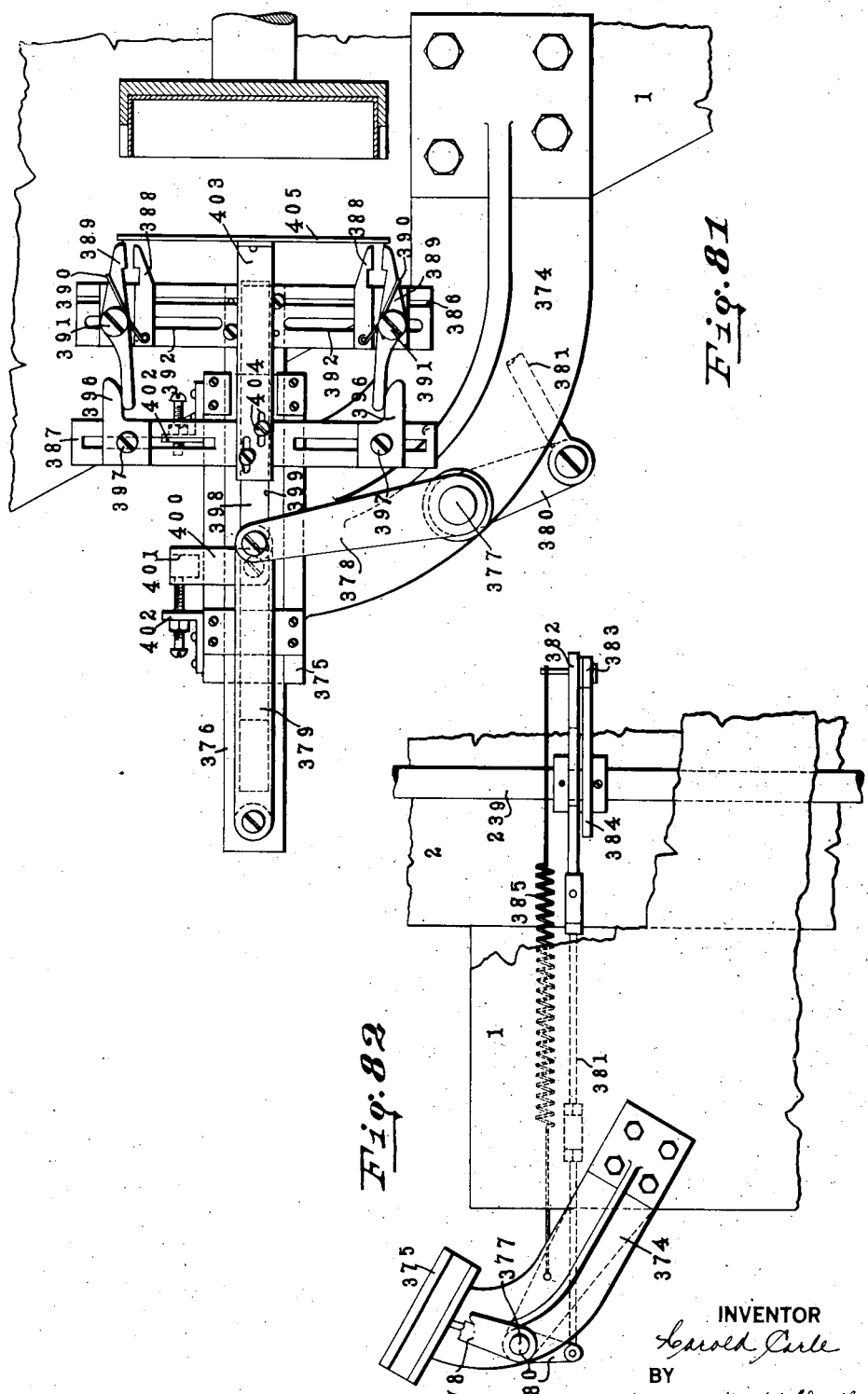

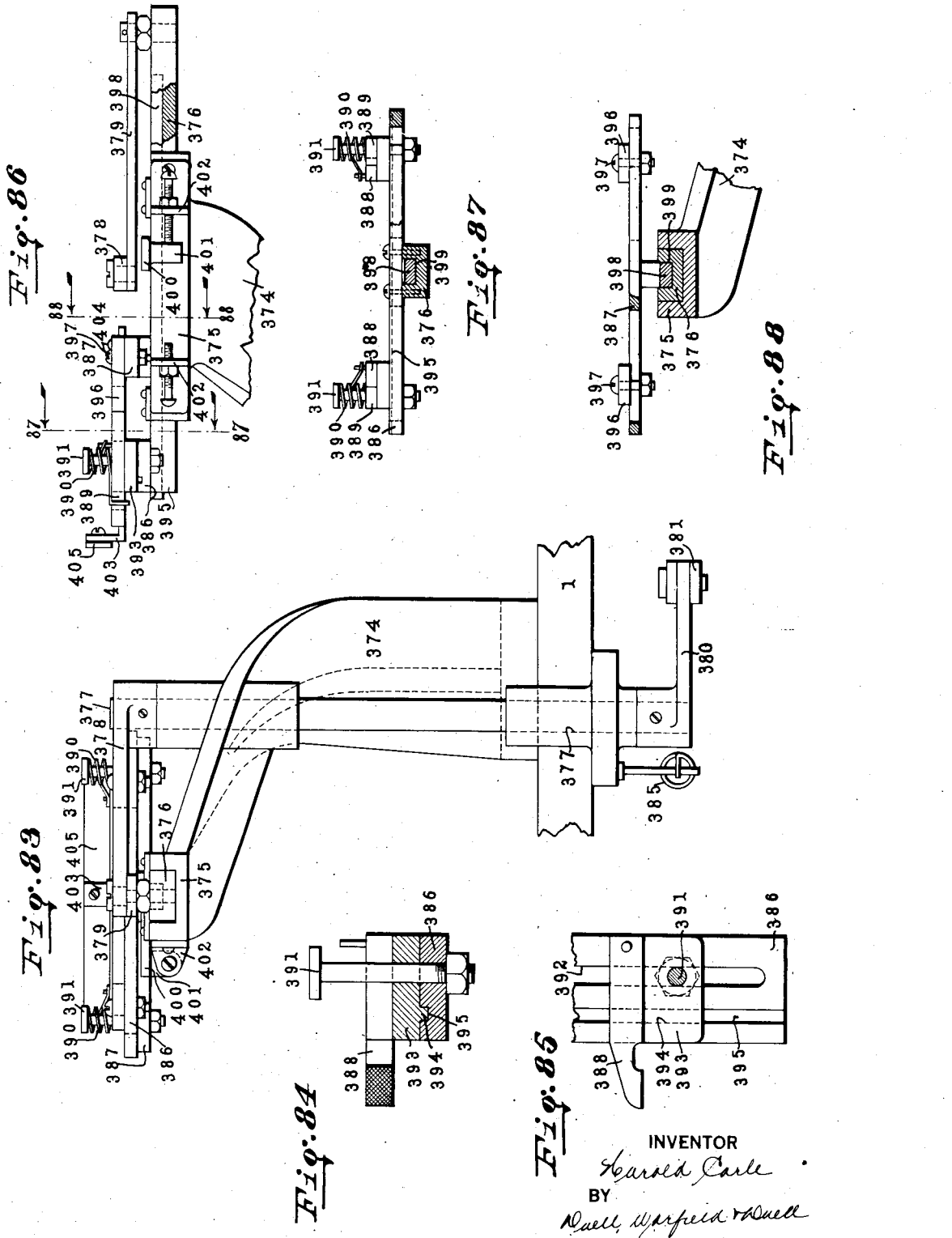

Patented Nov. 27, 1928.

1,693,136

UNITED STATES PATENT OFFICE.

HAROLD CARLE, OF BUFFALO, NEW YORK, ASSIGNOR TO F. N. BURT COMPANY, LIMITED, OF TORONTO, ONTARIO, CANADA, A CORPORATION OF ONTARIO.

MACHINE FOR MAKING PAPER BOXES.

Application filed April 27, 1923, Serial No 635,078. Renewed September 8, 1928.

This invention relates to improvements in box making machinery, and with respect to its more specific features, to machines for making trays or open boxes from pasteboard or the like especially boxes having a finished exterior surface.

One of the objects of the invention is to provide in a machine of the class described, a unitary structure, including means for supporting and moving a series of corner cut box blanks in succession over an endless path, with periods of rest at selected stations, and a plurality of mechanisms for performing the various operations of folding, finishing and discharging the box, arranged at the several stations, and synchronously operated, thereby to complete the formation of a box from a blank, during its travel over the endless path.

Another object is to provide a construction wherein the blanks are supported in a plurality of series, the supports of one series engaging the blanks in such manner that they may be folded about the said means, and will be held with the exterior of the box accessible to the several mechanisms for operating thereon, while in the second series of supports the blanks will be held with the interior exposed, and accessible to the several mechanisms for finishing the interior of the box.

Another object of the invention is to provide mechanism for progressing the supports of the two series intermittently, and in synchronism, so that the supports of the first series will come in succession into register with succeeding supports of the second series to permit the transfer of the box from a support of the one series to a support of the other series, and wherein mechanism is provided for transferring the blank when the supports are in register.

Another object is to provide mechanism for feeding corner cut blanks in succession from the bottom of a superposed pile, in such manner that but a single blank will be removed, and wherein the position of the blank is definitely established as it leaves the pile.

Another object of the invention is to provide mechanism arranged between the blank feeding means and the supports therefor for changing the plane of the blank as it is passed from the feeding means to the support.

Another object is to provide mechanism for applying a film of adhesive to the body portion of the blank, and to adjacent portions of the flaps, while the blank is held on the supporting means, wherein the adhesive applying means is normally withdrawn from the supporting means for the blank, and is moved into and out of engagement with the blank, and is also moved longitudinally thereof while in engagement therewith to apply the adhesive over a definite area of the blank.

Another object is to provide mechanism for applying a covering sheet to the gummed portion of the blank, in such manner as to exclude the formation of air bubbles.

Another object is to provide mechanism for folding the blank into the form of a box or tray, while it is on the supporting means, wherein the folding means engages only those portions of the flaps adjacent to the bottom of the box, thereby leaving the remaining portions of the flaps free for the subsequent application of a stay strip to hold the flaps in place.

Another object is to provide mechanism at the station where the blank is folded, for attaching one end of a gummed stay strip, of paper or the like, to the free portions of the flaps, while the blank is still engaged by the folding means, and normally out of operative position during the folding of the blank.

Another object is to provide mechanism at a succeeding station for attaching the end of a finishing strip to the blank after it has been released by the folding means, in such manner that the strip covers the full area of the flaps, and extends beyond the free edges thereof, to provide an edging for the free edges.

Another object is to provide mechanism normally out of operative position, and moved into operative position at the stations where the stay strip and finishing strip are attached, for rotating the supports at the said stations, thereby to wind the stay strip and the finishing strip on the blank, and wherein other mechanisms are provided at each station for smoothly applying the strip to the blank, and for severing the applied portion from the body of the strip, controlled to operate in sequence with the strip attaching means.

Another object is to provide mechanism in connection with each blank supporting means for normally holding the same from rotation, and controlled to release position when the blank is at the stations where the stay strip and the finishing strip are applied.

Another object is to provide mechanism cooperating with the supports of the second series for first turning in the extended edge of the finishing strip over the free edges of the flaps and for afterwards securing said extended edge to the inner faces of the flaps, thereby to complete the formation of the box.

Another object is to provide mechanism also cooperating with the supports of the second series, for stripping the completed box from a support as it comes into register with the said means.

Another object is to provide means for operating all of the said several mechanisms in synchronism, so that operations are performed on the blanks of the several supports at each intermission in the step by step progression thereof.

Another object is to provide a new and improved construction of box.

Another object is to provide a machine for making a stiff box of paper or similar material.

Another object is to provide a machine for making a stiff box of polygonal cross-section, preferably rectangular.

Another object is to provide a machine for making a stiff paper box of polygonal cross-section composed of stiff body material covered with material of a finishing or ornamenting character, and one in which the faces of the box especially the exterior are smooth and even throughout, and free from blisters, puckers, lines and in general free from blemish.

Other objects will be in part obvious and in part pointed out hereinafter.

The invention accordingly consists in the features of construction, combinations of elements and arrangement of parts which will be exemplified in the construction hereinafter set forth, and the scope of the application of which will be indicated in the following claims.

Figure 4:
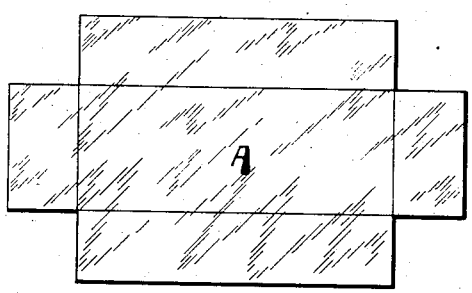
Figure 5:
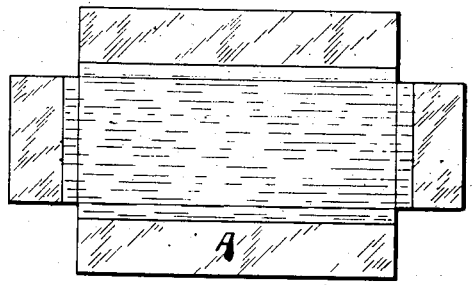
Figure 6:
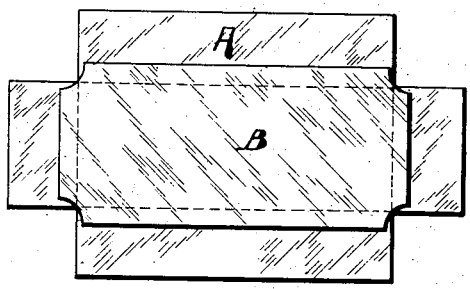
Figure 7:
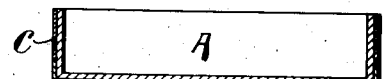
Figure 8:
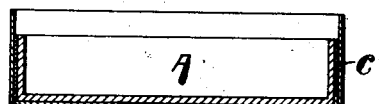
Figure 9:
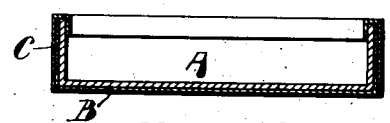
Figure 10:
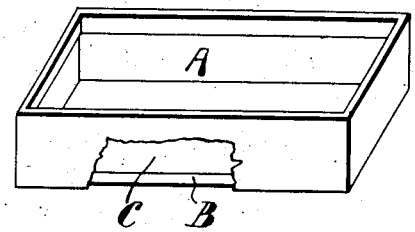
Figure 23:
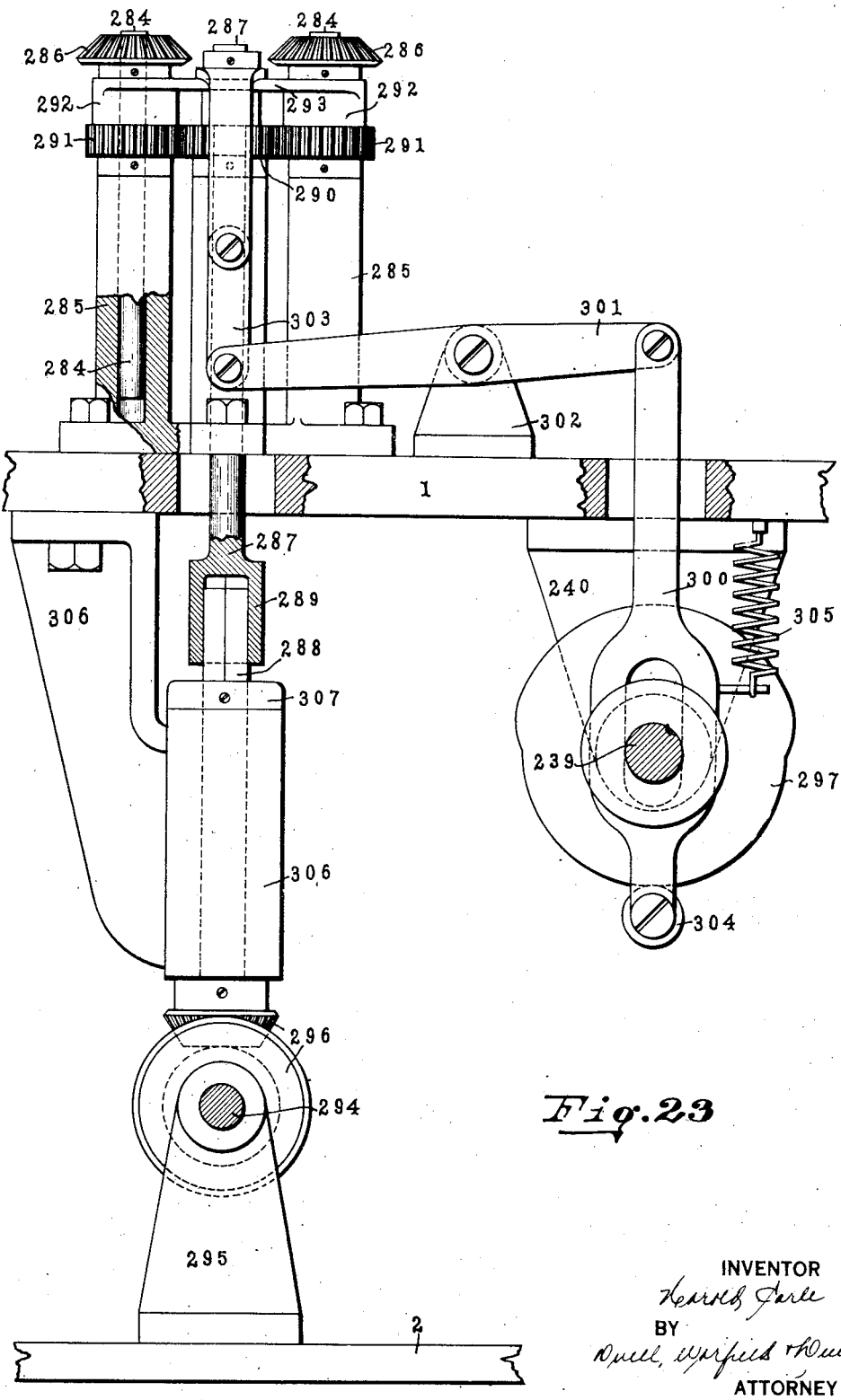
Figure 24:
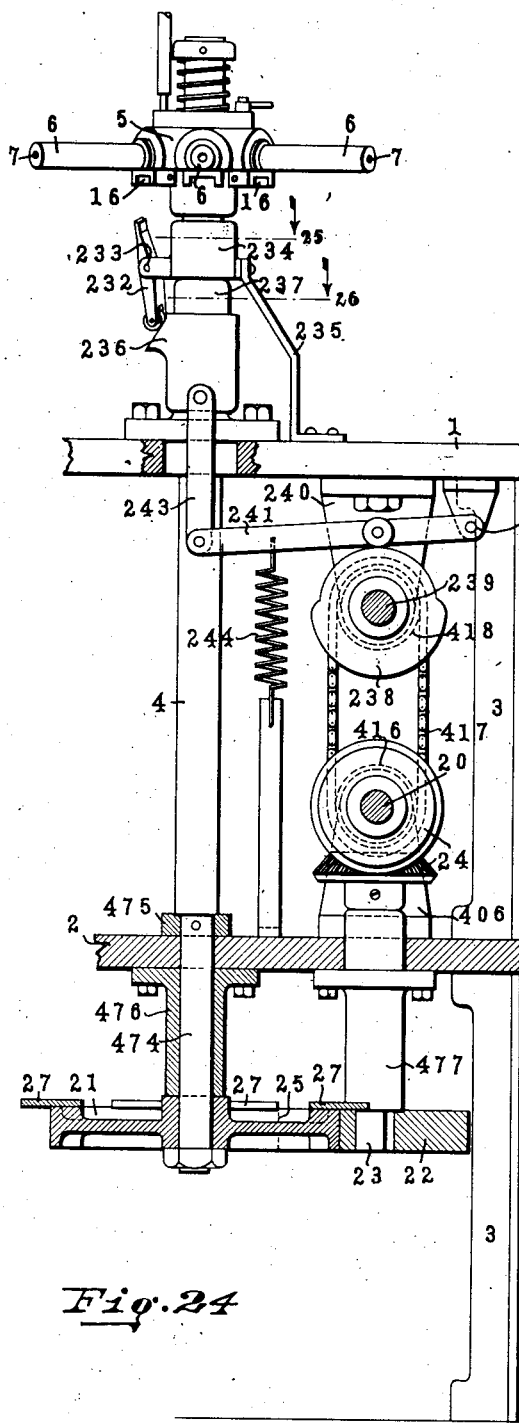
Figure 25:
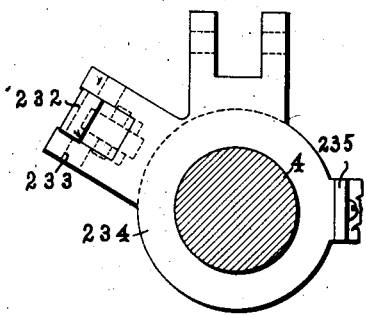
Figure 26:
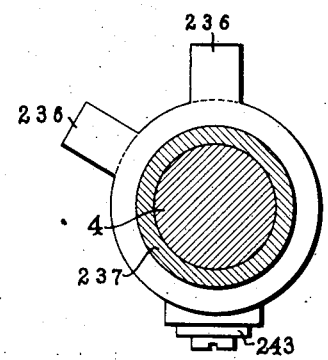
Figure 33:
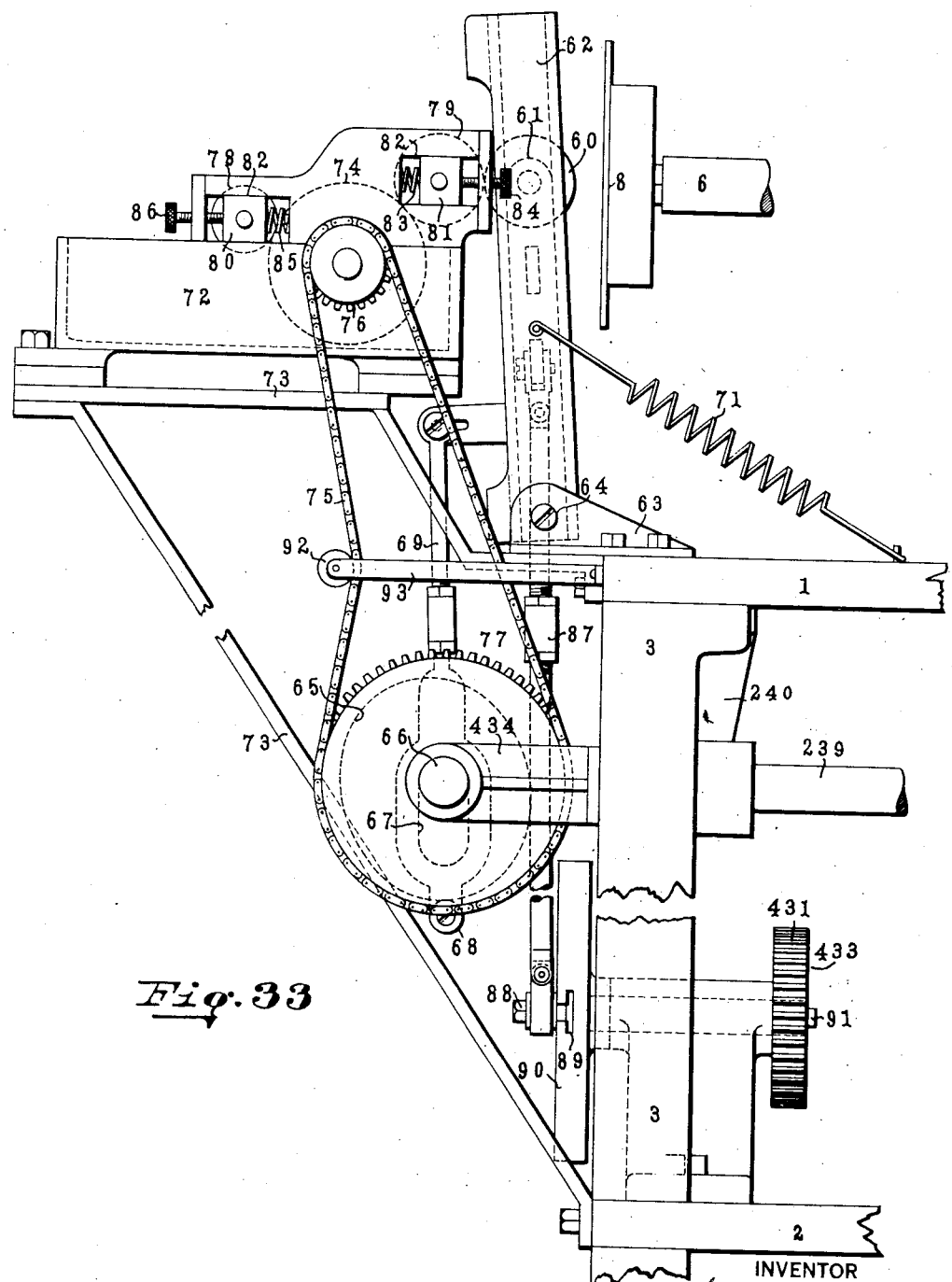
Figure 70:
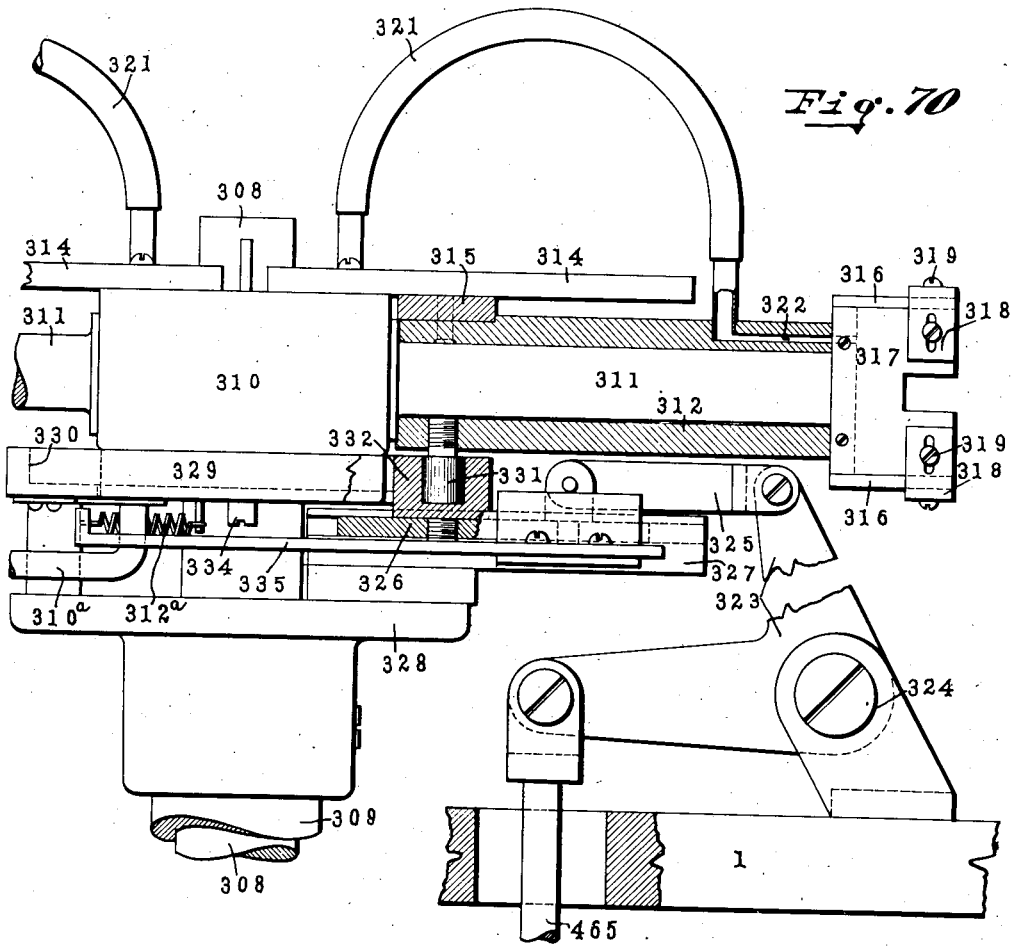
Figure 71:
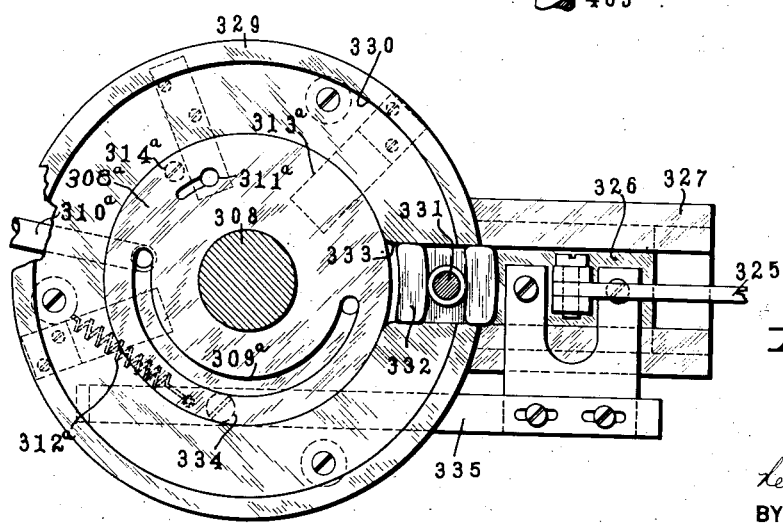

In the accompanying drawings forming a part of this specification wherein similar reference characters refer to similar parts throughout the several views, Figure 1 is a plan view of the improved machine, Figs. 2 and 3 are transverse vertical sections taken substantially on the lines 2—2 and 3—3, respectively, of Figure 11, Fig. 4 is a plan view of the blank forming the base or body of the box, Fig. 5 shows the first step in the operation, namely the application of the film of adhesive, Fig. 6 is a similar view showing the covering sheet applied, Fig. 7 is a longitudinal section of the shaped blank with the covering sheet and the stay strip in place, Fig. 8 is a similar view showing the finishing strip in place, Fig. 9 is a view similar to Fig. 8 showing the edge of the finishing strip turned in, Fig. 10 is a perspective view of the completed box with a part of the finishing strip broken away, Fig. 11 is a plan view with the upper table removed, Fig. 12 is a side elevation of the cam shaft, Fig. 13 is a plan view of the cross shaft and its connections, Fig. 14 is a top plan view with parts in section of the suction control for the mandrels, Fig. 15 is a section on the line 15—15 of Fig. 14, Fig. 16 is a vertical section of the mandrel locking member, Fig. 17 is a section on the line 17—17 of Fig. 15, Fig. 18 is a diagrammatic view of the Geneva movement for the first turret, Figure 19 is a similar view of the movement for the second turret, Figure 20 is a partial front view of one of the mandrels, Figure 21 is an end view of a mandrel arm, Figure 22 is a detail of the cam mechanism for operating the swinging table, Figure 23 is a detail view looking from the right of Figure 15 showing the mechanism for intermittently rotating the mandrels, Figure 24 is a detail of the first turret, its supporting shaft, and the mechanisms cooperating therewith, Figures 25 and 26 are sections on the lines 25—25 and 26—26 of Figure 24, Figure 27 is a detail in plan of the blank feeding means, Figure 28 is a side view of the same, Figure 29 is a detail of the rock shaft for operating the blank feed and its connections, Figure 30 is a detail at right angles to Figure 29 showing the cam and its connections for controlling the rock shaft, Figure 31 is a vertical section on the dotted arrow line of Figure 28, Figure 32 is a front view of the retaining finger, Figure 33 is a detail in side view of the adhesive applying mechanism, Figure 34 is a rear view of the same, Figure 35 is a detail side view of the covering sheet feeding mechanism, Figure 36 is a rear view of the outlet end of the covering sheet magazine, Figure 37 is a plan view of the magazine, Figure 38 is an enlarged detail in plan of a portion of the magazine outlet, Figure 39 is a side view of Figure 38, Figure 40 is a detail in plan of the stay strip applying means, and folding device, Figure 41 is a detail in side elevation of the blank folding mechanism, Figure 42 is a view looking from the turret of the strip supporting reel and connected parts, Figure 43 is a vertical section through the operating means for the folding mechanism, Figure 44 is a front view of the holding plunger and folding arms, showing the relation of the arms to the plunger, Figures 45, 46 and 47 are sections on the lines 45—45, 46—46 and 47—47, respectively, of Figure 43, Figure 48 is an enlarged detail in side elevation of the stay strip applying means, Figure 49 is a view looking at the opposite side from Figure 48, and with parts in section, Figure 50 is a detail in plan of the said mechanism, Figure 51 is a vertical section through the operating shaft for the said mechanism, Figure 52 is a detail in front elevation of the cutter for the strip, Figure 53 is a sectional detail showing the cutter operating mechanism, Figure 54 is a similar detail showing the cam for operating the applying roller, Figure 55 is an end view of Figure 56, Figure 56 is a detail in plan of the strip checking mechanism, Figure 57 is a section on the line 57—57 of Figure 56, Figure 58 is a detail in side view of the adhesive applying mechanism for the strip, Figure 59 is a detail in front elevation of the slide carrying the strip attaching means and its operating mechanism, Figure 60 is a detail in end elevation with parts in section of the operating mechanism for the folding means, Figure 61 is a view looking toward the turret of the folding mechanism, Figure 62 is a detail in side elevation of the finishing strip applying means, Figure 63 is a section taken substantially on the line 63—63 of Figure 62, Figure 64 is a view similar to Figure 62 looking at the opposite side, Figure 65 is a detail in side elevation of the strip pressing roller, Figure 66 is a detail in front elevation of the valve ring cam and its operating mechanism, Figure 67 is a front elevation of one of the mandrels of the second turret, Figure 68 is a partial plan view of the second turret, Figure 69 is a partial side view of the second turret with parts in section, Figure 70 is a view similar to Figure 69 at another station, Figure 71 is a horizontal section at the shifting track for extending the mandrels, Figure 72 is a detail in side elevation of the track shift operating mechanism, Figure 73 is a front view of one of the mandrels, contracted, of the second turret with a section removed, Figure 74 is a side view, Figure 75 is a rear view, Figure 76 is a vertical section, Figure 77 is a front view of the mandrel expanded.

Figure 78 is a detail in side elevation of the mechanism for turning in the edge of the finishing strip, Figure 79 is a view of Figure 78 looking from the right, Figure 80 is a section on the line 80—80 of Figure 78, Figure 81 is a plan view of the stripping mechanism for removing the box from the mandrel, Figure 82 is a top plan view of the slide support, and the adjacent portion of the table, a part thereof being broken away to show the operating mechanism for the slide, Figure 83 is a rear view of the box stripping mechanism, Figure 84 is a vertical section through the gripping jaws, Figure 85 is a plan view with the movable jaw detached, Figure 86 is a partial side view of the guide, showing the stop mechanism, and Figures 87 and 88 are sections on the lines 87—87 and 88—88, of Figure 86.

In the improved machine exemplifying the invention two turrets are used, to each of which is imparted a step by step motion, in order that the mandrels which are carried by the turrets may be brought in succession to the several stations, where the various operations are performed. The first turret carries six mandrels, and there are six stations, past which these mandrels are moved in succession into and out of operative relation with several devices hereinafter described. At the first station a blank is fed against the mandrel. At the second station the bottom of the blank is provided with a film of adhesive, the film extending also for a slight distance along the flaps. At the third station a covering sheet is applied to the bottom, and at the fourth station the flaps are folded, and a stay strip is wound about the folded box on the mandrel. At the fifth station a finishing strip is wound about the box on the mandrel, with the free edge of the strip extending beyond the edges of the sides and ends, and at the sixth station the box is transferred from a mandrel of the first turret, to a mandrel of the second turret. The mandrels are rotated in synchronism in an endless path, so that at each sixth of a rotation of the first mandrel, and each third of a rotation of the second mandrel, there will be a mandrel of one turret in register with a mandrel of the other turret. The second mandrel moves through three stations, receiving the box at the first station thereof. At the second station thereof the edges of the finishing strip are turned inwardly and secured to the inner faces of the sides and ends, and at the third station thereof the completed box is removed from the mandrel.

In the present embodiment of the invention a suitable supporting frame is provided, comprising upper and lower tables 1 and 2 and supporting legs 3 for the tables. Two turrets are mounted on the frame, and the said turrets are distinguished as the first and second. The first turret comprises a shaft 4 having pinned to the upper end thereof a hub 5, which has radial arms 6, and the arms are bored axially to provide passages 7 for a purpose to be presently set forth. A box mandrel or former is supported by each arm, and in the present instance there are six arms, so that the turret carries six mandrels or formers. Each mandrel comprises a body or base 8, sides 9 and ends 10 connected to the base or body, the sides, ends and body forming a rectangular box shaped structure, arranged with its open side toward the shaft 4. The body 8 is rotatably held to the corresponding arm by a hollow screw 11, and the hollow screw registers with the passage 7 of the arm. The outer face of the body of each mandrel is grooved longitudinally and transversely as shown at 12 in Figure 20, the grooves intersecting, and all communicating with the passage 7 so as to provide the mandrels with pneumatic gripper faces for holding the body blanks thereon. The mandrel is rotatable on the screw 11, and it is rigidly connected with a sleeve 13 journaled on the arm, and provided at its inner end with a bevel gear 14, the bevel gear having a threaded connection with the sleeve. Normally the sleeves are held from rotation, and in fixed position with respect to the arms, by means of locking levers 15. These levers as shown more particularly in Figures 15 to 17 inclusive, are elbow levers, and each is pivoted between the sides of a channel shaped bracket 16 on the underside of the arm adjacent to the hub. The upper end of each lever has a yoke 17, whose arms are adapted to engage in notches 18 in the hub of the bevel gear 14, to prevent rotation of the sleeve and mandrel. As shown in Figure 17, each lever engages two notches, and the notches are arranged at angles of 90 degrees with respect to each other. The levers 15 are normally held in engagement with the bevel gears, by means of coil springs 19, arranged between the lower arms of the levers and the hub of the turret. Each lever 15 constitutes a lock which normally holds the adjacent sleeve and mandrel from rotation, and in a fixed position with respect to the table.

A step by step movement is imparted to the first turret from a counter shaft 20, which in turn is driven in a manner to be presently described, through a Geneva stop movement. This movement comprises a gear wheel 21, keyed to the shaft 4, and a mutilated gear 22 secured to a vertical shaft 23 and driven through a bevel gear connection 24 from the counter shaft 20. The gear wheel 21 (Figures 11 and 18) which is also a mutilated gear has six series of teeth and between each series there is a concave portion indicated at 25. The mutilated gear 22 has one series of teeth, and at each end of the series a rib 26 is secured radially of the face of the gear. The wheel 21 has six radial arms 27, extending beyond the periphery of the gear wheel, and adapted to engage the ribs 26, which are within the periphery of the gear 22. The arms 27 are at the concave surfaces 25 of the wheel 21, and when that portion of the gear 22 not provided with teeth is in engagement with a concave surface, the wheel 21 is locked from rotation. The ribs 26 are starters, which engage the arms 27, to start the gear 21, when the teeth of the gear 22 come into engagement with a series of teeth on the gear 21. Thus an intermittent movement with periods of rest is imparted to the gear wheel 21, and to the mandrel shaft 4.

At station I, a body blank is fed or supplied to the mandrel, by the mechanism or device shown more particularly in Figs. 27 to 32 inclusive. The said mechanism comprises a magazine, including a plate 28 which constitutes the bottom of the magazine, and side walls 29. The side walls are connected to the bottom for adjustment toward and from each other by means of screws 30, which pass through slots in angle plates 30$^a$ to which the side walls are secured, into engagement with the plate 28. A pair of rails 31 is arranged at each side of the plate, and each pair is connected to the plate for adjustment toward and from the other pair by screws 32 passing through slots in outwardly extending feet 33 on the outermost rail of the pair. A pusher bar 34 is mounted to move between the members of each pair of rails, and the bars are connected at the end remote from the turret, by means of a crosshead 35. The crosshead is connected to a slide 36, mounted to move in a guideway 37 on the underside of the plate 28, and at the center thereof. The inner members of the pairs of rails are rabbetted on their outer faces and at their upper edges, to receive the bars 34, and the inner wall of the rabbet has a longitudinally extending rib 34$^a$ engaging a similarly shaped groove in the adjacent bar, thereby to guide the bar. The corner-cut blanks A which are cut to shape, each comprising a rectangular body and side and end flaps, adapted to be folded to provide an open rectangular box or tray, rest in a pile upon the rails 31, and they are held in position in the magazine, by a gauge bar 42$^a$ on the table 28, and by spring plates 42 on the side walls. The gauge bar 42$^a$ is adjustably connected with the table, by a screw and slot connection indicated at 41$^a$, and the spring plates 42 are adjusted toward and from each other, by means of set screws 43 threaded through the side walls 29, and provided with locking nuts for holding them in adjusted position. The spring plates 42 are connected to the side walls at their upper edges, their lower edges being free and by turning the set screws 43, the alinement of the blanks with respect to the transferring mechanism to be later described, may be assured. The end flaps of the blanks rest on the rails, and the spring plates 42 engage the free edges of the said flaps. The gauge bar 42ª engages back of the pile of superposed blanks, as shown in Figure 27. The pusher bars 34 extend above the rails 31, a distance corresponding to the thickness of a blank, so that when the pusher bars are moved toward the turret, they will engage the lowermost blank of the pile, and push it out from beneath the pile.

Retaining fingers 44 are arranged at the front of the magazine, for preventing the passage of more than a single blank. As shown in Figures 31 and 32, the retaining fingers are adjustably connected to angle plates 43ª supported by the side walls. Each finger is adjustably connected with the adjacent angle plate, by a screw and slot connection 45, and the lower ends thereof are spaced above the rails, just far enough to permit the passage of one blank. The lower outer corner of the fingers are beveled, and by loosening the screws, the fingers may be adjusted vertically, in accordance with the thickness of the blank.

The slide 36 is operated by a rock arm 39 pivoted at 40 to the table 1 and having one arm connected by a link 41 with the slide. The other arm of the rock shaft is connected by a link 42ᵇ (Figure 29) with operating mechanism to be later described.

The blanks are fed from the magazine onto a swinging table 46. This table is secured to one of the arms 47 of a rock shaft 48 journaled in bearing brackets 49 on the table 1, and it is normally spring held in lowered horizontal position, by means of a coil spring 50 arranged between another arm 51 on the rock shaft, and a stop on the table. The arm 51 is connected by means of an adjustable link 52 with operating mechanism to be later described.

At regular intervals, the table is swung upwardly into the dotted line position of Figure 28 by the operating mechanism connected with the link 52, to present a blank against the outer face of a mandrel which at this time is in alinement with the magazine and swinging table. The swinging table has stops 53 adjustably connected therewith by screw and slot connections 54, and each stop 53 has a portion for engaging the end of the end flap, and a portion for engaging the forward edge of the same.

When the swinging table presents a blank to a mandrel, the grooves 12 of the mandrel are connected with suitable exhausting mechanism by means of the passage 7, and the body of the blank is held against the mandrel by suction, the flaps of the blank projecting beyond the sides and ends of the mandrel. The mechanism for connecting the passage 7 with a suitable suction apparatus so as to energize and de-energize the grooves 12 is shown more particularly in Figures 14 and 15. This mechanism comprises a valve ring 55 mounted to oscillate on the upper end of the hub 5. The ring has on its under face an arc shaped passage 56, with which communicates a hose 57 from suitable continuously operating exhausting apparatus. When the ring is in the position of Figure 14, the mandrel from which a box has just been removed, and the mandrel which is in position for the removal of a box, are cut off from the exhausting apparatus, so that there is no suction on the box, to interfere with its removal. As soon as a box blank is pushed against the mandrel at station I, the ring is oscillated to connect the passage 7 of the mandrel at station I with the groove 56 of the ring, and with the source of fluid pressure. The blank is now held tightly against the mandrel, and the pressure is continued until the box reaches station VI, when the passage 7 passes out of register with the groove 56, and the pressure is cut off. The ring is oscillated by means of a link 59, pivotally connecting the ring with operating mechanism to be later described. The ring 55 encircles a boss 5ª on the hub, and is held tightly against the upper end of the hub by a coil spring 4ª arranged between the stop collar 4ᵇ and the hub. The stop is adjustable, to vary the tension of the spring.

The turret now advances the mandrel and blank to the second station, where glue or other suitable adhesive is applied to the body and the immediately adjacent portions of the flaps while the blank is held on the mandrel. The adhesive applying mechanism, Figs. 33 and 34, includes a glue applying roller 60 journaled transversely of a substantially rectangular carriage 61. The carriage is vertically slidable in a frame 62, the sides of the carriage having guided movement in the sides of the frame. The frame is pivoted to brackets 63 on the table 1, as indicated at 64, and a cam 65 is provided for swinging the frame. The cam is secured to a shaft 66 journaled on the frame between the tables, and a follower 67 connected to the frame embraces the shaft, and has a roller 68 engaging the cam. A coil spring 71 arranged between the swinging frame and the table acts normally to swing the frame toward the mandrel. A pan 72 for adhesive is supported on the opposite side of the frame from the turret by means of a bracket 73, and a roller 74 is journaled transversely of the pan, the roller dipping into the adhesive. A chain 75 connects sprocket wheels 76 and 77 on the roller and the shaft 66 before mentioned. A doctor roll 78 is journaled at the opposite side of the roller 74 from the swinging frame, and an applying roller 79 has rolling contact with the roller 74, between it and the swinging frame. The rollers 74, 78 and 79 are geared together by gearing 70 to rotate at the same surface speed. The applying roller 79 is in position to be engaged by the roller 60 when the swinging frame is at the end of its movement away from the turret. The rollers 78 and 79 are journaled in blocks 80 and 81 respectively, which are mounted to slide in guide slots 82 in the superstructure of the pan. The blocks 81 are normally pressed toward the roller 60 by coil springs 83, and set screws 84 are provided for moving the blocks away from the roller 60. Similar springs 85 are arranged between the blocks 80 and the inner ends of the guideways, and similar set screws 86 press the blocks toward the roller 74. It will be noticed that each of the rolls 78 and 79 is positively adjusted toward the roller 74, and is normally spring pressed away from the said roller. The carriage 61 is reciprocated in the swinging frame, by means of a link 87, which is connected at one end to the carriage, and at the other to a pin 88, which is adjustable in a radial slot 89 in a disc 90 secured to a shaft 91, journaled in bearings on the lower table. The pin 88 may be moved radially of the shaft 91, to vary the stroke of the pin, and the extent of movement of the carriage. It will be noted that the link 87 is connected to both table and pin by a universal joint, and that a turn buckle is interposed in the length of the link, to permit variation in the length thereof.

The operation of the above described mechanism is as follows:

When a mandrel reaches station II, with the parts in the position of Figure 33, and with a blank on the mandrel, the swinging carriage is moved toward the turret, the roller 60 engaging the blank on the mandrel. The carriage is now reciprocated, and a film of adhesive is applied to the face of the blank, the length of the roller and the extent of its movement being such that the film of adhesive extends for a slight distance beyond the body of the blank and onto the flaps. The swinging frame then moves away from the mandrel, and the roller 60 engages the roll 79, which moves continuously in contact with the roller 74. The roller 74 has always a film of adhesive of a predetermined thickness, and this film is transferred to the roll 79. The chain 75 is tensioned by a tension roller 92 which is journaled in a bracket 93 extending from the upper table.

The turret now moves to bring the mandrel carrying the blank, to which adhesive has been applied, to station III, where the covering sheet B is attached. The mechanism for attaching the covering sheet, which is shown in Figures 35 to 39 inclusive, includes a cover sheet supply magazine of substantially trough or U-shape in cross-section, and composed of side walls 94, each having an inwardly extending flange 94$^a$ constituting the bottom of the magazine. The side walls are supported by a carriage or slide 95, which is mounted to reciprocate in a guide 96, supported above the table 1 by a bracket 97. The magazine, which is a chute, is supported in inclined position, and it is connected to the slide in such manner that it may be adjusted toward and from the slide. The lowermost end of the chute has threaded stems 98, which extend outwardly through vertical slots 99, in a bracket 100 on the slide. Near the other end, the chute has depending plates 101, slidably connected to brackets 102 on the slide. Each bracket 102 has a vertical slot 103 which is engaged by a bolt 104 connected with the adjacent plate 101. When the nuts of the bolts and stems are loosened, the entire magazine may be adjusted vertically, and the sides of the magazine are independently adjustable.

The flanges forming the bottom of the magazine are extended beyond the side walls, at the lower end of the chute, as indicated at 105, and adjustable side plates 106 are supported by the brackets 100 before mentioned, the side plates forming continuations of the side walls of the magazine. The plates which are of resilient material are fixed to the bracket 100 at their inner ends, as indicated at 107. The outer or free ends are engaged by set screws 108 which are threaded through bracket plates 109 secured to the bracket 100. By means of the set screws the free ends of the plates may be moved toward each other, to exactly center the covering sheets, which rest on the rails 105 forming the bottom. The free ends of the plates 106, and the ends of the rails 105, having inwardly extending spurs 110, which hold the lowermost covering sheets from being pushed out of the chute by the weight of those above, and this pressure holds the outermost sheet slightly bulged, so that when the slide 95 is moved toward the blank on the mandrel, in a manner to be presently described, the outermost covering sheet will engage the blank at the center thereof first, afterwards contacting throughout the extent thereof to prevent the inclusion of air bubbles between the sheet and the blank. The slide is moved toward and from the turret by means of a bell crank 111 pivoted at 112 to the table 1. One arm of the bell crank is connected to the slide, by means of a link 113, pivoted at one end to the bell crank arm and at the other to a depending lug 114 on the slide. The outer arm of the bell crank is connected to a follower 115, embracing a shaft 116 journaled in bearings on the lower table. The follower has a roller 117 which engages the edge of a cam 118 secured to the shaft, and it is connected to the bell crank arm by a link 119, having a universal joint connection with the bell crank, and a pivotal connection with the follower. The link 113 is adjustable in length, by a turn buckle. When a mandrel carrying a gummed blank is at the third station as shown in Figure 35, the slide or carriage 95 is moved toward the blank. The bulging center of the outermost covering sheet contacts first with the gummed face of the blank, and the sheet progressively contacts with the blank from its center toward its ends. As the slide moves away from the turret, the outermost sheet is left in place on the blank, and the mandrel is moved by the turret to the succeeding or fourth station.

At the fourth station as shown in Figures 40 to 47 inclusive, the flaps of the blank and the covering sheet are folded onto the sides and ends of the mandrel, and a stay strip C is wound about the folded flaps to hold them in place, the stay strip being previously provided with adhesive. This strip has its lower or inner edge abutted against the edges of the covering sheet, and does not lap upon the edges of the said sheet. The mechanism includes a holding plunger and blank presser plate of substantially the area of the body blank 120 which engages the blank on the mandrel, pressing the covering sheet closely in place, and forming a support for the body of the blank while the flaps are folded, so that the body is prevented from outward bulging away from the mandrel during the folding. A series of four folding arms 121 is provided one arm for each flap, and each arm carries a plate 122 for engaging the flap over a limited area, to fold the same toward the periphery formed by the sides and ends of the mandrel. Each arm is pivoted between a pair of lugs 123 extending radially from a stem 124, to which the plunger 120 is connected. Each of the arms 121 is adjustable toward and from the stem, that is toward and from the axis of the mandrel to provide for boxes of different size. The members of each pair of lugs are radially slotted and the pivot bolt 125 of the arm passes through the slots, so that by loosening the bolt the arms may be moved toward and from the stem.

The arms 121 are operated simultaneously, by means of hinged rods 126. Each of these rods is hinged to a head 127 mounted to slide longitudinally of the stem, and each rod passes through a sleeve 128 pivoted to the adjacent arm. Each sleeve is held in adjusted position on the rod by means of a set screw 129. The plunger 120 and the arms are moved toward and from the mandrel, and the head 127 moves therewith, and also has relative movement with respect to the stem, so that as the plunger engages the blank, the arms move against the flaps to fold the latter.

The stem 124 is slidable in a bearing 130, and it is moved toward and from the turret by means of an elbow lever 131 pivoted at 132 to an extension 133 from the stem 124 which supports the bearing 130. One arm of the elbow lever is connected to a collar 135 on the stem, by means of a link 136, and the other arm of the elbow lever is connected to one of the arms of a second elbow lever 137 pivoted to a bracket 138 on the table 1 by means of a link 139. Operating mechanism to be later described in detail, is connected with the other arm of the second elbow lever, and a coil spring 140 is arranged between the elbow lever 131 and the table, the spring acting normally to retract the stem 124.

The head 127 is operated by somewhat similar mechanism connected to a rod 141 slidable in a bearing 142 supported by the bracket 134, and connected to a plate 143 rotatably connected with the head. A lever 144 is pivoted to the extension 133 before mentioned, and a link 145 connects the upper end of the lever with a collar 146 on the rod. A link 147 connects the other end of the lever with a second lever 148 journaled below the table, and operating mechanism to be later described is connected with the second lever. The links 139 and 147 are variable in length, having turn buckles in connection therewith.

The stem 124 is rotatable in the bearing 130 in order that the plunger may rotate with the mandrel, when the stay strip is wound thereon. Also the head 127 and the folding arms move with the mandrel. The plunger and the folding arms occupy a predetermined position with respect to the mandrel, when the mandrel moves into the fourth station, and a resiliently acting check mechanism is provided for insuring that the plunger and the folding arms will come to rest after their rotation with the head in this predetermined position. This mechanism comprises a latch plate 149 yieldingly connected with the bearing 130, by means of headed pins 150 and coil springs 151 arranged between the plate and the heads of the pins. The head 127 has oppositely arranged flattened faces 152, as shown more particularly in Figures 45 to 47 inclusive, and the latch plate 149 is adapted to engage these flattened surfaces. It is obvious that if the plunger and folding arms stop a little short, or little beyond the predetermined rotative position, the pressure of the latch will correct the slight displacement, and since the plunger and the arms are in engagement with the mandrel throughout its rotation, the displacement can never be but slight. The plate 143 has a fork as shown in Figure 46, which engages an annular groove in the head, thus rotatably connecting the plate to the head.

Referring to Figure 43 it will be seen that the lugs 123 are on a hub which fits on a spindle on the end of the stem 124, and the hub is held in place by a nut 153 which engages the reduced threaded end of the spindle. The plunger is carried by a rod 154 which is slidable in an axial opening in the stem, and it is normally spring pressed outwardly by a coil spring 155 arranged within the opening. The movement of the rod with respect to the stem is limited however, by a cross-pin 156 on the rod, which moves in a slot in the stem.

When a mandrel carrying a blank, to which the covering sheet has been attached, arrives at station IV, the stem 124, together with the set of folding plates 122 move toward the turret. The plunger first engages the body of the covered body blank which will eventually become the bottom of the box, and presses it firmly against the end face of the mandrel, so that there can be no bulging when the folding of the flaps takes place. At the same time the folding arms are moving toward the turret, and the head is moving with respect to the stem toward the turret, so that the folding plates 122 turn the flaps down upon the sides of the mandrel, with a wiping movement, engaging the flaps at the corners of the mandrels, and folding toward the free edges of the flaps from the corners. This folding of the flaps with the adhesively attached ends of the cover strip tends to tension the cover sheet across the body of the body blank and to assist in giving smooth effect to the cover sheet. The folding plates enclose the adjacent end of the mandrel and there engage only those portions of the flaps which are covered by the covering sheet, leaving uncovered those portions of the flaps not covered by the covering sheet, to receive the stay strip. The plates 122 are of substantially the width of the flaps but of less effective length so as to expose a portion of the faces of each of the folded flaps. While the flaps are held in place by the folding arms, the stay strip is applied. One end of the strip is applied to the box or folded blank on the mandrel, and the mandrel is rotated to wind the stay strip thereon on the exterior of the assemblage of flaps across the joints between the flaps, the said strip being provided with adhesive, so that it is firmly attached to the flaps and secures them together.

The mechanism for attaching the stay strip, as shown in Figures 48 to 61, is supported by a bracket 157 mounted on the table 1 at the fourth station. When the blank moves into the fourth station, the side and end flaps of the blank are not folded, and in order that the stay strip attaching mechanism may not interfere with the folding of the blank, the said mechanism is arranged to move vertically, into and out of operative position. The said mechanism is in lowered position until the flaps are folded, after which it is moved into operative position, and attaches the stay strip, to those parts of the flaps which are not covered by the covering sheet. The bracket 157 has a vertical guideway, in which moves a slide 167, and the slide carries the attaching mechanism. The slide has an inclined extension at one side of its top, and a guideway 160 is adjustably connected to the extension, by a screw and slot connection 161. A carriage 159 is mounted to moved on the guideway, and the upper end of the carriage is beveled as shown in Figs. 48 and 49, to form the ledger blade for a cutter to be described. The cutter includes a slide 162 having guided movement in a vertical direction in a guide 163 on the bracket 167 before mentioned. At its upper end the slide 162 has a laterally arranged head 164, from which extends a pair of vertically spaced jaws 165, the jaws extending above the slide. A cutting blade 166 is secured to the upper jaw, and this blade cooperates with the beveled end of the guide-way 160 as a ledger blade, to cut the stay strip, when the slide 162 moves downward. The stay strip indicated at C passes over the carriage 159, from adhesive applying mechanism to be later described, to and between the jaws 165. The strip is held to the upper face of the carriage during the movement of the same, by means of a comb 168, on one end of a resilient plate 169, which is supported at the other end on the upper arm of a substantially U shaped member 170 which is secured to the carriage. One arm of the member is below the carriage, and the other is above and spaced apart from the upper face of the carriage.

The end of the plate remote from the comb is connected to the U shaped member 170 in the manner shown in Figures 55 to 57. The said end of the plate is riveted to a hinge leaf 171, which has at its outer end upstanding perforated ears or lugs 172, received between another pair of ears or lugs 173 on a leaf 174 secured to the upper arm of the member 170 by a screw 175. A pintle pin 176 pivotally connects the two pairs of lugs, and a coil spring 177 encircles the pin between the lugs 172. The ends of the spring are so connected, as shown in Figure 56, that the tension of the spring is exerted to hold the plate 169 with the comb pressed against the strip of paper. The comb, however, may yield on the rearward movement of the carriage, to prevent movement of the strip therewith. A holding pawl 177ª is supported by the plate 169 near the hinge connection, the pawl being pivoted to a bracket 178 on the under face of the plate. The arrangement of the pawl is such that it prevents rearward or outward movement of the strip with respect to the carriage, but permits the free forward movement of the strip. When traction is made on the strip rearwardly or outwardly, that is away from the mandrel, the pawl tends to take a vertical position, clamping the strip to the carriage, and the pawl is of considerable width as shown in Figure 55, to prevent injury to the strip. The strip is guided on the carriage between gauge plates 179 adjustably connected therewith, at the end remote from the mandrel, and the carriage is reciprocated by means of a shaft 180 pivoted on the extension 158, and having a radial arm 181, connected to the carriage by a link 182. The link is connected to the body of the U shaped member 170 by means of a screw 183, and the shaft 180 is rocked at suitable intervals, to reciprocate the carriage by a cam 184 secured to a shaft 185 to be later described. The shaft 180 before mentioned has a second radial arm 186, to which is connected one end of a follower 187 embracing the shaft 185, and provided with a friction roller 188 engaging the edge of the cam 184. The roller 188 is held in contact with the cam edge by means of a spring 189 arranged between the arm 186 and the follower 187.

The shaft 185 before mentioned is journaled in a sleeve 185$^a$ which has threaded connection at one end with the slide 167 which supports the attaching mechanism, and the shaft, together with the operating cams 185, 215 and 227 before mentioned reciprocate with the slide. The cams are held on the shaft, on the opposite side from the sleeve 185$^a$ in spaced relation, by means of spacing collars 184$^a$ and a nut and washer 183$^a$. The slide is reciprocated, and the shaft is rotated, by mechanism to be later described in detail.

The strip of paper which is supported on a reel 190 is supplied with a coating of adhesive before it passes onto the carriage, and the adhesive is on the upper face of the strip. The reel 190 is supported in brackets 191 depending from a receptacle 192 for adhesive, which in turn is supported by an extension 193 from the guideway 158. From the reel the strip passes over an adhesive applying roller 194, which is journaled in the receptacle or pan 192, and rotates in the adhesive, and the film of glue on the roller is regulated by a scraper or doctor 195, hinged to the pan, and engaging the periphery of the roller. The strip is guided to the roller 194 by guide rollers 196, and as it leaves the adhesive applying roller, the face having the adhesive thereon is engaged by a scraper 197, similar to the scraper 195. This scraper removes the excess adhesive from the strip, which then passes beneath a guide roller 198 on the pan, and around a roller 199 journaled in the end of an arm 200 pivoted to the frame 193 at 201. A coil spring 202 arranged between the arm and the frame 193 normally tends to swing the roller 199 away from the pan, that is in a direction to tension the strip. The movement of the roller away from the pan is limited, however, by a lug 203 thereon, which engages the frame 193. The roller 199 may yield toward the carriage, when the carriage moves toward the mandrel, to prevent injury to the strip, but as soon as the tension on the strip is relaxed, the spring swings the roller to its normal position.

In order to prevent injury to the strip by the pull on the reel, and to start the reel by the pull of the strip, thereby to provide slack in the strip between the reel and the adhesive applying means, a roller 204 is provided, which engages the strip adjacent to the reel. This roller is supported by links 205, which are pivoted to one pair of arms 206 of the reel, the reel as shown having a cross at each end. A spring 207 is arranged between the arms and the links, and the links are so connected to the arms of the cross that they normally hold the position shown in Figure 58, but may yield to permit the roller 204 to move away from the reel. With this arrangement when tension comes upon the strip, the levers 205 are first swung by the taut strip, and the levers react against the cross arms, thus imparting a movement of rotation to the reel, in a direction to unwind the strip. Each of the crosses 206 which, together with the shaft 206$^a$, constitutes the reel, is adjustably mounted on the shaft. Referring to Figure 42 it will be noticed that the shaft 206$^a$ extends laterally from the bracket 191, and the crosses have hubs 208 which are adjustably held on the shaft by means of set screws. By loosening the screws, the hubs may be moved toward and from each other, to provide for different widths of strip.

When a mandrel comes into register with the stay strip applying means, and after the flaps have been folded, and while the folding arms and the plunger are still engaged with the blank, the slide 167 is moved upward into operative position. The slide is moved into operative position by mechanism to be later described. When in operative position, the carriage 159 is moved toward the mandrel, in a line perpendicular to the axis of the supporting arms, and the free end of the gummed strip is projected above a laying and pressing roller 209, which applies it to the box on the mandrel. This roller is supported by a lever 210, pivoted at 211 to an extension 212 from the slide 167. This roller is normally swung toward the mandrel by a coil spring 217, arranged between the table 1, and a follower 213 on the shaft 185. The follower has a friction roller 214 engaging the edge of a cam 215, and the cam acts to move the follower and the roller 209 away from the mandrel.

As the end of the stay strip passes between the arms 165 of the fork, it is engaged and supported by a roller 218, journaled in an extension 219 from the slide 167. The roller 218 prevents the end of the strip from dropping down between the roller 209 and the cutter. The carriage is yieldingly held to the guide by means of springs 220, which encircle the guide pins 221 depending from the carriage, and passing through longitudinally extending slots 222 in the extension in the guide. Stops 223 are provided on the pins and the springs are arranged between the stops and the guides. The connection permits a limited movement of the carriage with respect to the guide.

As soon as the end of the strip contacts with the box, it is engaged by the roller 209, and the mandrel is rotated by mechanism to be later described. The strip is wound on the box, the roller 209 holding it firmly against the box. The roller may move downwardly to pass the corners of the box on the mandrel, but it is held firmly against the box by the spring, so that the strip is smoothly laid. Just before the mandrel completes its rotation the strip is severed by blade 166 of the cutter. The slide 162 of the cutter has guided movement vertically in the bracket 157 and a lug 224 depends from the lower end thereof. A lever 225 is pivoted to an extension 226 from the lower end of the slide 167, and the free end of this lever rests upon a cam 227, secured to the shaft 185, and the lower end of the lug 224 engages the lever in line with the axis of the shaft. This arrangement insures a straight upward lift for the lug and the cutter slide, eliminating any tendency to lateral distortion of the lug such as would occur did the lug engage the cam directly. The cutter slide is pulled downward by a coil spring 228 arranged between the slide and the bracket 157. A second spring 229 is arranged between the head 164, and a laterally extending lug 230 from the guide, the spring 229 acting to cushion the downward movement of the slide. Since the cutting blade engages the gummed face of the strip, a portion of the gum may be transferred thereto, and mechanism is provided on the carriage, for engaging the blade, to clean the same. This mechanism is a brush 231 connected with the carriage, the body of the brush being secured to the carriage, with the bristles extending toward the cutter slide. When the strip moving carriage reaches the end of its movement toward the mandrel, the bristles of the brush engage the cutter blade and remove any gum that may have become attached thereto.

As previously stated, the mandrels are normally held from rotation, being locked by the mechanism shown in Figures 15 to 17 inclusive. When the mandrels reach stations IV and V, however, this mechanism is released, and other mechanism is engaged with the mandrels to rotate the same. The releasing mechanism comprises a lever 232 pivoted at 233 to a lug extending radially from a collar 234, journaled on the turret and held from rotation therewith by means of a stay 235. Levers 232 are arranged at stations IV and V, so that when a mandrel reaches either station, the locking lever 15 thereof will be in position to be engaged by the upper end of a lever 232. The lower end of the lever has a friction roller engaging a cam collar 236 mounted on the bearing 237 for the turret shaft, and movable vertically by means of a cam 238 secured on a shaft 239 journaled in brackets 240 depending from the table 1. The edge of the cam engages a friction roller intermediate the ends of a lever 241. One end of the lever is pivoted at 242 to the table 1, and the other end is connected by a link 243 with the cam collar. The roller is held in contact with the cam 238 by a coil spring 244, arranged between the lever and the lower table 2. When the end of the gummed strip is applied to the box on the mandrel, the cam collar 236 is moved upwardly, the lower end of the lever 232 is swung outward, and the upper end operates the locking lever 15 of the adjacent mandrel to release the mandrel (Figures 15 and 24). Means is then engaged with the mandrel to rotate the same, but since the said means is precisely the same as that provided at station V for rotating the mandrel, and is controlled and operated simultaneously therewith, the said means will be described in connection with the operations at station V.

At station V a finishing strip is placed upon the box, the strip being fed to the mandrel in substantially the same manner as the stay strip is fed, and by mechanism substantially similar to that for feeding the stay strip. The said mechanism, as shown in Figs. 62 to 65, is supported by a bracket 245 secured to the table 1. The mechanism includes a guide 248 adjustably connected with an inclined extension 246 on the bracket in the same manner as the guide 160 is connected to the extension 158. A carriage 247 is movable on the guide, and it is held to the guide by means of a pin 249, passing through a longitudinal-slot in the guide, and having a pin held washer 250 below the guide. A comb 251 is provided in connection with the carriage, and the comb is mounted on a substantially U-shaped member 252, in the same manner as the comb is mounted in the construction of Figs. 50 to 57, the mounting being indicated generally at 253. The carriage is operated by a cam 254, secured to a shaft 255 journaled below the table. A rock shaft 256 is pivoted to the bracket, and one arm is connected by a link 257 with the carriage. The other arm is connected to a follower 258 embracing the shaft 255. A friction roller 259, on the follower, engages the edge of the cam, and the roller is held against the cam by a spring 260. The cutter comprises a slide 261 having guided movement in the bracket 245, and the upper end of the slide is provided with a head 262 having upper and lower jaws 263. The paper strip passes between the jaws, and the upper jaw has a cutting blade 264. The upper jaw 263 in the present instance is adjustably connected with the lower jaw. The lower jaw has a rib 265, and the upper jaw a groove which engages the rib, and the parts are held in adjusted position by screw and slot connections indicated at 130

266. It will be obvious that by loosening the screws, the upper jaw may be moved toward or from the lower jaw.

The slide 263 is normally pulled down by a spring 267, and it is moved upward by a lever 268, pivoted to an extension 269 from the bracket 254, and engaging the edge of a cam 270 secured to the shaft 255. The slide has a depending lug 271, which rests at its lower end on the lever, the arrangement being substantially the same as that at station IV. The free end of the finishing strip of paper passes between the jaws of the cutter, when the carriage moves upward, and the said free end is supported by a roller 272 on an upright 273 on the bracket. A spring 274 is provided for cushioning the downward movement of the cutter, and a cleaning brush 275 is supported by the bracket, the bristles of the brush engaging the blade 264 to clean the same, in the same manner as the brush 231 engages the cutter at station IV. A holding pawl 276 is provided, in connection with the comb support, operating in precisely the same manner as the pawl 177$^a$.

The strip is laid by means of a laying roller 277 on one end of a lever 278 pivoted to an extension 279 from the bracket, and the roller is moved toward and from the mandrel by means of a cam 280 on the shaft 255. A follower 281 embraces the shaft at the cam, one end being connected with the lever 278, while the other has a friction roller 282 engaging the cam edge. The roller is retained in engagement with the cam by a spring 283, arranged between the frame and the follower. The operation of the above described mechanism is substantially the same as that of the mechanism for applying the stay strip.

When the end of the finishing strip is engaged with the box on the mandrel, the mandrel is rotated a complete rotation, to wind the strip on the box. Mechanism similar to that shown in Figure 15 for releasing the locking lever 15 of the mandrel at station IV, is provided at station V, to also release the mandrel at such station. Other means is provided for simultaneously engaging and rotating the mandrels at stations IV and V, where the stay strip and finishing strip are simultaneously applied to boxes on successive mandrels. The means for simultaneously rotating the two mandrels is shown in Figures 15 and 23. The said mechanism comprises a pair of similar shafts 284 journaled in upright bearings 285 on table 1. Each shaft has secured to the upper end thereof a bevel gear 286. A third shaft is arranged between the bearings 285, and the said shaft consists of upper and lower sections so connected together that they may move longitudinally with respect to each other, but are constrained to rotate together. The section 287 has a socket 289 for receiving the upper end of the section 288, and the socket and the said upper end are polygonal in cross-section. The section 287 is provided at its upper end with a pinion 290, which meshes with similar pinions 291 secured to the shafts 284 near their upper ends.

Each shaft 284 is encircled by a collar 292 above the adjacent pinion, and the collars are connected by a cross-plate 293. The shafts 284 are slidable in the bearings 285, and when the plate 293 is lifted, the shafts are lifted to simultaneously engage the bevel gears 286 thereof with the bevel gears 14 of the mandrels at stations IV and V. The shaft 287—288 is driven from a shaft 294 journaled in bearings 295 on the lower table 2, through a bevel gear connection 296, and the plate 293 is raised and lowered by a cam 297 on a shaft 239 journaled in bearings 240 depending from the upper table. A follower 300 embraces the shaft, and one end thereof is connected to one end of a lever 301 pivoted at 302 to the table. The other end of the lever is connected by a link 303 with the plate 293. The follower 301 carries at the end remote from the lever a friction roller 304 which engages the edge of the cam, and which is retained in engagement with the said edge by a spring 305 arranged between the follower and the table 1. The section 288 of the shaft 287—288 is supported by a bearing arm 306 depending from the table 1, and a thrust collar 307 is secured to the shaft above the bearing arm, to limit the downward movement thereof. When the ends of the stay and finishing strips have been applied to the boxes on the mandrels at stations IV and V, the cam 297 lifts the shafts 284, to engage the bevel gears 286 and 14, and the mandrels are rotated to wind up the respective strips.

The finishing strip is placed on the box with its one edge flush with the bottom, and with its other edge extending beyond the free edges of the flaps. To give fine finish to the box, this edge is turned in onto the inner faces of the flaps, and this operation is performed on the second turret, the box being transferred at station VI from the first to the second turret, so that the mandrels of the first turret provide a box supply mechanism for the die or hollow mandrel of the second turret.

The second turret comprises a shaft 308, (Figs. 68 and 69) journaled in a vertical bearing 309 on the table 1, and carrying at its upper end a hub 310. The hub is provided with three radial arms, and each arm is extensible and contractible, comprising an inner cylindrical member 311 connected with the hub, and an outer tubular member 312 slidable on the inner member. The outer member 312 of each arm carries at its outer end a hollow mandrel, former, die, or box shaping receptacle, indicated generally at 313 rotatable in an endless path. The outer member is held from rotation on the inner member, by key plates 314 which are secured to the hub, and extend above the arms. Each outer member has a cross plate 315 secured to the inner end thereof and on the upper face, and these plates cooperate with the key plates to prevent turning of the outer member.

Each of the mandrels is composed of a bottom, which has intersecting longitudinal and cross pneumatic gripper channels on its outer face, and side and end walls 316 and 317 respectively. The side and end walls form with the bottom an open rectangular receptacle, of a size to receive the box from mandrel 8 with the open end of the box outward. The side and end walls are adjustably connected, by means of angle plates 318 having screws and slot connections 319 with the sides and ends. The hub 310 of the turret is provided with an arc shaped channel 320 which is connected by hose 321, with passages 322 near the outer ends of the outer members 312. This passage 322 connects with the intersecting grooves on the face of the mandrel, and pressure is thus transmitted from the source of supply, to the face of the mandrel, to hold the box in place in the mandrel by suction.

In order to transfer a box from a mandrel of the first turret to a registering mandrel of the second turret, the mandrels are moved together, and mechanism is provided for moving that mandrel of the second turret which is at station VII toward the mandrel of the first turret which is at station VI. The said mechanism includes a bell crank 323, which is pivoted at 324 to the table 1. A link 325 connects one arm of the bell crank with a slide 326 movable in a guide 327 extending radially from a flanged collar 328 held on the upper end of the bearing 309. A ring 329 is supported by the flange of the collar just below the hub, and this ring is provided in its upper face with an annular groove 330, forming a trackway, in which rotate rollers 331 journaled on the outer members 312 of the mandrel arms. The engagement of the rollers with the annular groove prevents outward movement of the members 312 of the arms, except when a mandrel is at station VII. At this point a switch plate 332 is interposed in the trackway 330, being arranged in a radial recess 333 in the disc. The switch plate is secured to the slide 326 and moves therewith, and it has a groove in its upper face concentric with the shaft 308, for receiving the roller 331 of that mandrel arm which is at station VII.

When a mandrel of the first turret is at station VI, the mandrel of the second turret which registers therewith is moved radially toward the mandrel of the first turret. The mandrels 8 and 313 are of such relative size that the hollow mandrel or die 313 may surround the periphery of mandrel 8 and leave a space between said periphery and the die so that the mandrel 313 will fit over the formed box on the mandrel of the first turret. At this moment the suction is cut off from the mandrel at station VI of the first turret, by mechanism previously described, and turned on to the mandrel at station VII of the second turret. A valve 308ª in the form of a disc is mounted to oscillate in the hub 310 of the turret, the peripheral edge of the disc forming the inner wall of the annular groove 330. The valve has an arc shaped groove or passage 309ª, substantially 180 degrees in length, and adapted to place the hose 321 of that mandrel which is at station VII in communication with a supply pipe 310ª from the suction apparatus, and to retain said parts in communication until the mandrels pass station VIII. When the valve is in the position of Fig. 11, the adjacent end of the passage 309ª is just out of register with the hose 321 of the mandrel at station VII. When the mandrel at this station is moved toward the mandrel at station VI of the first turret, and just before the mandrel 313 reaches the end of its outward movement, an upstanding lug on an arm 335 adjustably secured to the slide 326 engages a depending pin 334 on the valve, and shifts the valve far enough to connect the passage 309ª with the hose 321 of the mandrel at station VII. Suction is now exerted to hold the box in the mandrel, and the suction is maintained until after the box has passed station VIII. At station IX the suction is released, the inner end of the hose 321 coming into register with a port 311ª communicating with the atmosphere. The valve is returned to normal position by a coil spring 312ª arranged between the valve and the ring. The valve is held in position within the ring 329 by plate springs 313ª, which are secured radially of the ring and engage beneath the valve. The valve is limited in its return movement by a depending pin 314ª which engages one of the spring plates 313ª. After the mandrel 313 has engaged outside the box at station VI of mandrel 1, and the suction is turned on, the mandrel is withdrawn, carrying with it the box or article, which has been shaped on the first turret. The second turret is now rotated a third of a turn, to bring the box to station VIII where the edges of the finishing strip are turned in.

The edges of the finishing strip are turned down upon the inner faces of the flaps by the mechanism shown in Figures 73 to 80, inclusive. The said mechanism consists of a sectional collapsible plunger normally collapsed to enter the box, and capable of being expanded before and after it has entered the box thereby to turn in and secure the edges of the finishing strip to the box. The plunger is composed of four similar sections, indicated at 336 supported by a substantially rectangular head 337, and movable radially of the head to expand and contract the plunger. The head has pairs of slots 338 extending parallel with diagonals of the head, and screws 339 are passed through the slots into engagement with the plunger sections. The head has diagonal ribs 338ª, and the sections have grooves 339ª fitting the grooves, thereby to guide the sections in their expanding and collapsing movement. The arrangement is such that the four sections of the plunger may simultaneously move away from each other or in the reverse direction. They are normally drawn together by springs 340 arranged between adjacent sections, and they are expanded by means of an expander bar 341, which is slidable through a sleeve 342 to which the head 337 is connected. The operative face of the plunger, that is the face which is adjacent to the box, is provided with a forwardly projecting rib 343 of a size to fit within the box when the plunger is collapsed. The operative end of the expander bar is tapering as indicated at 344, to facilitate its entrance between the plunger sections, and the inner corners of the sections are beveled at the face adjacent to the bar, as indicated in Figure 76. Adjacent to the tapering point, the expander bar has a reduced portion 345 polygonal in cross-section.

The sleeve 342 is mounted to slide in a bearing 346 on the table 1, and a split collar 347 is clamped on the bearing at the end remote from the head by means of a screw 348. Another split collar 249 is clamped on the end of the expander bar remote from the head, by means of a screw 350. Links 351 and 352 connect the collars with radial arms 353 and 354, respectively, on a sleeve 355 and a shaft 356 respectively. The sleeve is journaled on the shaft, and the shaft is journaled in bearings 357 on the table 1. The sleeve is operated by a cam 358 on a shaft 239 journaled in bearings depending from the table 1. A follower 360 embraces the shaft adjacent to the cam, and the follower has a friction roller 361 engaging the cam. A link 362 connects the follower with a radial arm 363 on a collar 364 secured to the sleeve. A coil spring 365 is arranged between the table 1 and the arm 353 and acts normally to hold the friction roller in engagement with the cam. The expander bar is operated by a cam 366 on the shaft 239 before mentioned. A follower 367 embraces the shaft, and has a friction roller 368 engaging the cam. A link 369 connects the follower with a radial arm 370 on a collar 371 secured to the shaft 356. A coil spring 372 is arranged between the arm 354 before mentioned and the split collar 347, and acts normally to move the plunger toward the second turret. The sleeve 342 is prevented from rotation in the bearing 346 by means of a latch plate 373 secured to the bearing shaft and extending above the collar 347. The upper side of the collar is enlarged and flattened to engage the latch plate, and the sleeve is thus held from rotation.

The operation of the parts just described is as follows:

When a mandrel of the second turret comes into register with the plunger, the expander bar is moved toward the mandrel, and the plunger is expanded. At the same time the plunger is moving toward the mandrel, and it is sufficiently expanded so that the ribs 343 of the sections engage outside of the extended edge of the finishing strip. The extent of movement of the plunger toward the mandrel is greater than that of the expander bar, so that as the ribs 343 come into engagement with the extended edge of the finishing strip the plunger begins to collapse, and the extended edges are swept inwardly over the edges of the flaps. Continued movement of the plunger toward the mandrel forces the plunger and the edges of the finishing strip into the box, pressing the inturned edge of the finishing strip tightly against the inner faces of the flaps by further inward movement of the expander bar. It will be noted that the rib 343 by its opposite faces, provides a combined finishing strip folder and presser for each section, and that the rib of each section is rectangular in exterior outline so as nicely to fit the corners of the box in the die and press the finishing strip nicely into said corners. The inner face of said rib is shown inclining outwardly in the direction from its inner toward its outer edge to facilitate engagement with the finishing strip and camming of said edge transversely across the edge of the assemblage of flaps of the body blank. By this construction, in usual operation, the edge of the finishing strip will be deflected inwardly by the inclined face of the rib as the rib approaches the die or hollow receptacle, when in expanded position, complete inward deflection of said edge being accomplished by movement of the sections transverse to the forward movement of the rib. After the edge of the strip has been turned in and pressed, the box is completed, and there only remains the removal or discharge of the box from the mandrel. This is accomplished at station IX, after the retreat of the collapsible plunger.

This mechanism as shown in Figs. 81 to 88 inclusive, is supported by a curved bracket 374 from the table 1. The said mechanism comprises a guide 375 mounted on the bracket, and a slide 376 is mounted to move in the guide toward and from the second turret. This slide is operated from a shaft 377 journaled in the bracket, the shaft having a radial arm 378 at its upper end, which is connected by a link 379 with the slide. A second arm 380 secured to the lower end of the shaft, is connected by a link 381, with a follower 382 embracing the shaft 239. The follower has a friction roller 383 cooperating with a cam 384 secured to the shaft. A spring 385 is arranged between the bracket and the follower, to hold the friction roller in engagement with the cam. A pair of cross-heads 386 and 387 is arranged transversely of the slide at the end adjacent to the second turret, the one being secured to the slide, while the other is mounted to move longitudinally thereof, in a manner to be described. The crosshead 386 carries a plurality of pairs of gripping jaws. Each pair comprises a jaw 388 fixed to the crosshead but adjustable with respect thereto, and a jaw 389 pivotally connected with the crosshead, and normally pressed toward the fixed jaw 388 by a spring 390. Each pair of jaws is connected to the crosshead by a screw bolt 391, the screw bolt passing through the movable jaw, through a lateral extension 393 from the fixed jaw, upon which the movable jaw rests, and through a longitudinal slot 392 in the crosshead. The extension 393 has a rib 394 on its under face, which engages a longitudinally extending groove 395 in the crosshead. The spring 390 encircles the bolt 391, one end being connected to the fixed jaw and the other to the movable jaw. The movable jaws are normally pressed toward the fixed jaws by the springs, and they are controlled in their movement away from the fixed jaws by cam plates 396 on the crosshead 387. Each of these cam plates is adjustably connected to the crosshead by a screw bolt and slot connection 397, and the crosshead 387 is rigidly connected to an extension plate 398, which is mounted to move longitudinally of the slide, in a groove 399 in the upper face thereof. A plate 400 extends laterally from the extension plate 398, and this plate has a depending block 401, which is adapted to engage adjustable stops 402 near the end of the travel of the slide in each direction, thereby to shift the extension plate with respect to the slide. The stops are in the form of screws threaded through angle plates secured to the guide 375, and each screw is held by a lock nut. An arm 403 extends forwardly from the extension plate 398, being adjustably connected thereto by screw and slot connections 404, and this arm carries at its forward end a crosshead 405.

The operation of the above described mechanism is as follows:

When a mandrel is in register with the discharging mechanism, as shown in Figure 81, and with the edges of the box extending beyond the mandrel, the slide 376 is moved toward the mandrel. When the lug 401 engages the stop 402 adjacent to the mandrel, the ends of the box are between the members of the pairs, the said stop being so located that it will engage the crosshead 387 at this time. The movement of the crosshead and the extension plate 398 is checked, and the cam plates 396 release the movable jaws which grip the end walls of the box. The slide 376 is now moved rearward, that is away from the mandrel, and near the end of its rearward movement, the lug 401 engages the stop 402 remote from the mandrel. The crosshead 387 is again shifted, this time toward the pairs of gripping jaws, and the cam plates engage and open the movable jaws releasing the box, which is positively ejected from between the jaws by the crosshead 405.

The driving mechanism for the several operative parts, is shown more particularly in Figs. 11, 12 and 13. The shaft 20 before mentioned is journaled in bearing brackets 406 on the lower table, and it is driven from a motor 407 mounted on the table 2. The shaft of the motor has a wide pinion 408, which meshes with a pinion 409 on the shaft of a suitable exhauster 410, for controlling the suction of the turrets, and with a gear wheel 411 at the opposite side from the pinion 409. The gear wheel 411 is journaled on the frame, and carries a pinion 412 which meshes with a gear wheel 413 on the shaft 20. The gear wheel is loosely mounted on the shaft, and clutch mechanism indicated at 414 is provided for connecting the gear wheel with the shaft. The clutch is operated by mechanism indicated at 415. Shaft 20 has a sprocket wheel 416, connected by a chain 417 with a sprocket 418 on the shaft 239. On the shaft 239 the cams 238, 297, 384, 358 and 366 are located. The shaft also carries a cam 419 which operates the means for feeding a blank from the magazine. The shaft 239 at the cam 419, is embraced by a slotted slide or follower 420, having a friction roller 421 engaging the cam edge. The link 42$^b$ before mentioned connects the follower with one of the arms of the rock shaft 40 before mentioned, and a spring 422 arranged between the rock shaft, and the table, acts to hold the friction roller in engagement with the cam.

The rock shaft 48 is operated to swing the blank fed onto the table 46 into engagement with the mandrel, by means of a cam 423 secured on the shaft 20 (Figure 22). A lever 424 is pivoted to a support 425 adjacent to the cam, and is provided intermediate its ends with a friction roller 426 engaging the edge of the cam. The link 52 has a slidable and universal joint connection with the lever.

The mechanism at station II for applying the adhesive which is operated by shafts 66 and 91, is likewise controlled from the shaft 20. The shaft 20 is connected by a sprocket chain 427 with the shaft 116 before mentioned, the sprocket chain engaging registering sprocket wheels on the shafts. Through a gear connection indicated at 428, the shaft 116 drives an intermediate shaft 429, which through a Geneva stop movement drives the shaft 91 controlling the movement of the carriage of the adhesive applying roller, intermittently. This movement, which is shown more particularly in Figure 3 is arranged to turn the shaft 91 a complete rotation for every third of a rotation of the shaft 429. The stop movement comprises mutilated gears 430 and 431 on the shafts 429 and 91 respectively, and the gear wheels have stops 432 and 433 respectively for insuring the meshing of the gears. The cam 65 which controls the swinging of the frame, in which the carriage is slidable, is as before stated secured to a shaft 66, and the said shaft is journaled in bearings 434 at the end of the frame remote from the motor. The shaft 66 is driven from the shaft 239 by a bevel gear connection 435. The shaft 185 which controls the operation of the stay strip attaching means at station IV, is driven by a sprocket chain 436. This chain connects a sprocket wheel 437 on the shaft 185 before mentioned, with a sprocket wheel 438 on a shaft 439, which is journaled in a bracket arm 440 on the frame, and is driven through a bevel gear connection 441 from the shaft 66 (Figure 13). The slide 167 carrying the stay strip attaching mechanism is moved vertically by means of a cam 442 on the shaft 116 before mentioned. A bell crank 443 is pivoted at 444 to the lower table, and one arm of the bell crank has a friction roller 445 engaging the edge of the cam. The other arm is connected to the lower end of the slide 167 by a link 446. The link 446 is adjustable in length, by means of a turn buckle, and is connected to the slide and to the bell crank with universal joint connections. In addition the connection between the link and the bell crank is an adjustable connection as shown in Figure 59. It will be understood that the sprocket chain 436 is loose enough to permit the vertical movement of the slide 167, being taut when the slide is elevated into operative position. Since the shaft 185 is adjusted vertically with the parts which it operates, there is no disturbance of the relation between the said parts and the shaft, during the vertical movement of the slide. The folding mechanism at station IV is controlled from the shafts 116 and 239. The bell crank 137 which controls the movement of the plunger and folding arms is connected by a link 450 with a slotted slide or follower 451 embracing the shaft 116, and the follower has a friction roller 452 engaging the edge of a cam 453 on the shaft. The bell crank 148 which operates the head 127, is controlled by a cam 454 on the shaft 239. A slotted slide or follower 455 embraces the shaft, and has a friction roller 456 for engaging the edge of the cam. The slide is connected to the bell crank 148 by a link 457.

At station V the finishing strip attaching mechanism is controlled by the shaft 255. Since the flaps are already folded at this station, it is not necessary that there be any movement of the attaching mechanism as a whole, the said mechanism remaining in a relatively fixed position at all times. The shaft 255 is driven by a sprocket chain 447, which connects a wheel 448 on the shaft 255 with a wheel 449 on the shaft 239. The movement of the valve ring 55 is controlled from the shaft 239. A cam 458 is secured to the shaft outside the frame, and a follower or slotted slide 459 embraces the shaft at the cam, and has a friction roller 460 engaging the edge of the cam. A bell crank 461 is pivoted on the table 1, and one of the arms of the bell crank is connected to the follower. The other arm is connected with the link 59 before mentioned. When the bell crank is rocked, the ring is moved angularly, to connect and disconnect the passages 7 and the suction device 410 by means of the pipe 57. A spring 462 acts to hold the roller 460 in engagement with the cam, being arranged between the table 1 and the bell crank.

The arms of the second turret are normally pressed outwardly by a spring 323$^a$ arranged between the table 1 and a bell crank 323 pivoted at 324 to the table 1, and having one arm connected by a link 325 with the slide 326. A link 465 having a turn buckle interposed in its length, connects the other arm of the bell crank with a lever 464, pivoted to a support 466 depending from the table. The lever 464 has a roller 467 intermediate its ends, which engages the edge of the cam 384. The spring 323$^a$ acts at all times to move the slide outwardly, but the slide is held from movement by the high part of the cam 384.

The fluid pressure in connection with the second turret is supplied to the annular passage 320 by a pipe 321 from the exhausting apparatus 410, and intermittent movement of the turret is controlled by a Geneva stop movement, shown more particularly in Figures 11 and 19, somewhat similar to that shown for the first turret, and comprising a mutilated gear 468 secured to a vertical shaft 469 journaled in the frame, and a mutilated gear 470 secured to the shaft 308 of the turret. The gear wheel 470 has plain concave surfaces 471 arranged at angular intervals of 120 degrees on the edge thereof, and at each of these surfaces a stop 472 extends radially from the gear wheel. The wheel 468 has radial stops 473 at the ends of the teeth, and the engagement of the stops 472 with the stops 473 insures the meshing of the teeth of the wheel 468 with those of the wheel 470. For every complete rotation of the gear wheel 468 a third of a revolution is given to the wheel 470, and to the turret shaft, to bring the mandrels to the successive stations. The lower end of the turret shaft 4 is reduced, as shown at 474 in Figure 24, and a thrust collar 475 encircles the shaft above the table 2, and below the annular shoulder formed between the reduced portion and the body of the shaft. A bearing hub 476 is secured to the table 2, and the reduced portion of the shaft is journaled in the hub. A similar mounting is provided for the shaft 23, the bearing being indicated at 477.

The mandrels, at stations IV and V, are given a complete rotation, and are stopped in precisely the same position from which they start, in order that the registry be exact at station VI, and at the succeeding stations. Hence the mandrel arms are rotated one complete rotation, by the shafts 284, and a Geneva stop movement is provided for rotating the shaft 287—288. The said movement as shown in Figure 2, comprises a mutilated gear wheel 478 on the shaft 116, engaging a mutilated gear 479 on the shaft 294, which operates the shaft 287—288. The wheel 479 has a concave surface with which the plain edge of the wheel 478 locks, to hold the wheel 479 from rotation, and stops 480 and 481 are provided on the wheels 478 and 479 for insuring the meshing of the gear teeth when the wheel 478 moves out of locking position with the wheel 479. The stops 480 and 481 are radial to the wheels, and the stop 481 extends beyond the wheel 479 to engage the stops 480. With this arrangement the wheel 478 which rotates continuously will engage the wheel 479 to rotate the same, during a period sufficient to turn the shaft 287—288 a complete rotation at the proper time.

Manually operated mechanism is provided for moving the shaft 20, to properly position the parts at the starting of the machine. The said mechanism as shown in Figure 11 comprises a lever 482, which is journaled on the extended end of the shaft 20, and which has a pawl 483 for engaging a ratchet wheel 484 on the shaft. The ratchet wheel is secured to the shaft, and by swinging the lever, the shaft may be moved angularly, to properly position the parts before the machine is started.

The operation of the machine as a whole, will be readily understood from the description of the operation of the several mechanisms. A corner cut blank is applied to each mandrel as it passes the first station, and as it passes the succeeding stations, all of the operations to complete the exterior of the box are performed, the box being so held that the exterior thereof is accessible to the several mechanisms. The box with the outside finished is then transferred to a mandrel of the second turret, in reversed position, that is with the interior of the box exposed and accessible for the operation of the mechanisms which finish the interior. At the last station the completed box is discharged from the machine. All of the mechanisms are operated in synchronism, so that operations are simultaneously performed at all of the stations.

It will be noted that in the present machine, the covering sheet is put on the blank prior to the folding of the flaps, so that the covering sheet holds the box material at the bottom of the side walls under compression, being put upon the stretch by the folding of the flaps. A single mechanism is provided for finishing the edge of the box, that is the free edges of the folded flaps. This mechanism which is in effect a hollow rectangle, the rib forming the outline of the rectangle, not only sweeps the edge of the finishing strip inwardly over the free edges of the flaps, but pushes it into the box, and also presses it against the inner face of the side wall. The advance of the rectangle toward the box, and the action of the expander bar, cause the rectangle to be operated in this manner.

The combs at station IV and V, cooperating with the carriages to advance the strips are hinged to the carriages, and are also arranged to be turned angularly with respect to the long axis of the carriage, to facilitate cleaning. The combs swing directly away from the carriage on the hinge connection, and they are rotatable on the screws which connect them to their respective carriages. Thus every part of each carriage is accessible.

Referring to Fig. 1, it will be noticed that the blank A which is a corner cut blank, is scored between the apices of adjacent corner angles, to outline the body of the head of the blank. The adhesive, Fig. 5, is applied to the face of the blank having the scores as is also the cover sheet B, Fig. 6. The flaps of the blank which are then folded away from the cover sheet, put the sheet under tension across the scores.

As many changes could be made in the above construction, and many apparently widely different embodiments of this invention could be made without departing from the scope thereof, it is intended that all matter contained in the above description or shown in the accompanying drawing shall be interpreted as illustrative and not in a limiting sense.

It is also to be understood that the language used in the following claims is intended to cover all of the generic and specific features of the invention herein described, and all statements of the scope of the invention which, as a matter of language, might be said to fall therebetween.

Having now described my invention, what I claim as new and desire to secure by Letters Patent is:—

1. In a machine of the class described, in combination, a mandrel having means for holding a blank thereon while it is being folded, a second mandrel having means for holding the folded blank thereon, means for moving the mandrels synchronously to cause them to register after a predetermined movement, and means for transferring the folded blank from the first to the second mandrel when they are in register.

2. In a machine of the class described, in combination, a mandrel, means in connection with the mandrel for holding a blank thereon, means cooperating with the mandrel for folding the blank into a box, a second mandrel, means in connection with the second mandrel for holding a box thereon, and other means in connection therewith for transferring the box from the first to the second mandrel.

3. In a machine of the class described, in combination, a mandrel, means in connection with the mandrel for holding a blank thereon, means cooperating with the mandrel for folding the blank into a box, a second mandrel, means in connection with the second mandrel for holding a box thereon, other means in connection therewith for transferring the box from the first to the second mandrel, and means cooperating with the second mandrel for finishing the box.

4. In a machine of the class described, in combination, a plurality of mandrel supports, means for imparting to the supports a step by step movement, and in synchronism to cause the mandrels of the first support to register in succession with successive mandrels of the second support, means cooperating with the mandrels of the first support for finishing the exterior of a box, means in connection with the second support for transferring the partially finished box from the mandrels of the first support to those of the second support as they come into register therewith, and means cooperating with the mandrels of the second support, for finishing the boxes and for ejecting them from the mandrels.

5. In a machine of the class described, in combination, a plurality of mandrels, means for moving the mandrels in succession over an endless path with stops at predetermined stations, and means disposed at the several stations for feeding blanks to the mandrels, for gumming the blanks, for applying covering sheets to the gummed blanks, for folding and staying the flaps, for attaching a finishing strip to the box, and means for turning in the edge of the strip.

6. In a machine of the class described, in combination, a plurality of box supporting means, mechanism cooperating with one of said means for finishing the exterior of a box while held thereon, mechanism cooperating with the other of said means for finishing the interior of the box while supported thereon, and means for transferring the partially finished boxes from the first to the second of the said means.

7. In a machine of the class described, in combination, a plurality of mandrel supports, the mandrels of the first support engaging within the box, and those of the second support engaging outside the box, means cooperating with the mandrels of the first support for finishing the exterior of the box, means cooperating with the mandrels of the other support for finishing the interior of the box, and means for transferring the partially finished boxes from the mandrels of the first support to those of the second support.

8. In a machine of the class described, in combination, a mandrel having means for holding a blank thereon while it is being folded, a second mandrel having means for holding the folded blank thereon, and means for transferring the folded blank from the first to the second mandrel.

9. In a machine of the class described, in combination, a mandrel having means for holding a blank thereon while it is being folded, a second mandrel having means for holding the folded blank thereon, means for moving the mandrels along converging paths, and means controlling the holding means of the mandrels for releasing that of the first mandrel and operating that of the second when the paths converge.

10. In a machine of the class described, in combination, a turret rotating about a vertical axis and carrying mandrels, means for feeding blanks toward the mandrels with their planes horizontal, and means for swinging the blanks in vertical planes to apply them to the mandrels.

11. In a machine of the class described, in combination, a turret rotating about a vertical axis and carrying mandrels, means for feeding blanks toward the mandrels with their planes horizontal, means for swinging the blanks in vertical planes to apply them to the mandrels, and means in connection with the mandrels for gripping the blanks as they are applied thereto.

12. In a machine of the class described, in combination, a turret rotating about a vertical axis and carrying mandrels, means for feeding blanks toward the mandrels with their planes horizontal, means for swinging the blanks in vertical planes to apply them to the mandrels, each mandrel having vacuum ports for gripping the blanks as they are applied thereto, and means for energizing and de-energizing the ports.

13. In a machine of the class described, in combination, a turret rotating about a vertical axis and carrying mandrels, means for feeding blanks toward the mandrels with their planes horizontal, and means for swinging the blanks in vertical planes to apply them to the mandrels, said means comprising a table onto which the blanks are fed having stops adjustable with respect thereto for establishing the position of the blanks on the table.

14. In a machine of the class described, in combination, a mandrel for holding an unfolded corner cut blank, means for applying adhesive to the body of the blank and portions of the flaps adjacent thereto, and means for attaching a covering sheet to those portions of the blank provided with the adhesive.

15. In a machine of the class described, in combination, a mandrel for holding an unfolded corner cut blank, and means for attaching a covering sheet to the body of the blank and portions of the flaps adjacent thereto, comprising means for applying adhesive to the blank, and means for pressing a covering sheet into contact with the gummed surface.

16. In a machine of the class described, in combination, a mandrel for supporting an unfolded blank, means for applying adhesive to the body of the blank and portions of the flaps adjacent thereto, and a magazine for covering sheets mounted to move toward and from the blanks supported by the mandrel to contact the covering sheets in succession with the blanks.

17. In a machine of the class described, in combination, a mandrel for supporting an unfolded blank, means for applying adhesive to the body of the blank and portions of the flaps adjacent thereto, a magazine for covering sheets mounted to move toward and from the blanks supported by the mandrel to contact the covering sheets in succession with the blanks, the magazine holding the sheets with their planes substantially vertical, and being inclined downwardly toward the mandrel to feed the sheets by gravity.

18. In a machine of the class described, in combination, a mandrel for supporting an unfolded blank, means for applying adhesive to the body of the blank and portions of the flaps adjacent thereto, a magazine for covering sheets mounted to move toward and from the blanks supported by the mandrel to contact the covering sheets in succession with the blanks, the magazine being inclined and supporting the sheets in edgewise relation, and means at the delivery end of the magazine and adjustable laterally thereof for establishing the position of the sheets as they are delivered.

19. In a machine of the class described, in combination, a mandrel for supporting an unfolded blank, means for applying adhesive to the body of the blank and portions of the flaps adjacent thereto, a magazine for covering sheets mounted to move toward and from the blanks supported by the mandrel to contact the covering sheets in succession with the blanks, the sheets being supported in edgewise relation, and being free intermediate their ends thereby to permit the central portion of the sheets to bulge to first engage the blank.

20. In a machine of the class described, in combination, a mandrel for supporting an unfolded blank, means for applying adhesive to the body of the blank and portions of the flaps adjacent thereto, a magazine for covering sheets mounted to move toward and from the blanks supported by the mandrel to contact the covering sheets in succession with the blanks, the sheets being supported in edgewise relation, and being free intermediate their ends thereby to permit the central portion of the sheets to bulge to first engage the blank, and means for adjusting the magazine vertically.

21. In a machine of the class described, in combination, an inclined magazine for supporting covering sheets in edgewise relation to feed by gravity, the magazine having means for engaging beneath the ends of the sheets to leave the central portions thereof free, a mandrel for supporting a blank, and means for reciprocating the magazine toward and from the blank to contact the outermost sheet with the blank.

22. In a machine of the class described, in combination, an inclined magazine for supporting covering sheets in edgewise relation to feed by gravity, comprising laterally spaced side walls having retaining flanges for engaging beneath the ends of the sheets to leave the central portions free, a mandrel for supporting a blank, and means for reciprocating the magazine toward and from the blank to contact the outermost sheet with the blank.

23. In a machine of the class described, in combination, a mandrel for holding a blank with the flaps extending beyond the mandrel, means for attaching a covering sheet to the body of the blank and the portions of the flaps adjacent thereto, means for folding the flaps with the covering sheet in place, and means for staying the flaps while they are held folded.

24. In a machine of the class described, in combination, a mandrel for holding a blank with the flaps extending beyond the mandrel, means for folding the blank about the mandrel, comprising a plunger for engaging the body of the blank, and folding arms for engaging the flaps to fold the same, and means for moving the plunger and the folding arms toward and from the mandrel, the plunger being mounted to yield with respect to the folding arms.

25. In a machine of the class described, in combination, means for attaching a covering sheet to the body of the blank and to the adjacent portions of the flaps, means engaging that portion of the blank provided with the covering sheet for folding the blank, and means for applying a stay strip to the folded blank to hold the flaps folded.

26. In a machine of the class described, in combination, a mandrel having a suction gripper face for holding the body of a blank with the flaps extending beyond the mandrel, means for folding the flaps against the mandrel and for holding them folded, and means for winding a stay strip about the flaps while so held to secure them in place.

27. In a machine of the class described, in combination, a mandrel having a suction gripper face for holding a blank with the flaps extending beyond the mandrel, means for engaging the body of the blank and the adjacent portions of the flaps to fold said flaps about the mandrel while the body is held against said face, means for rotating the mandrel while the blank is so held, and means for attaching the end of a gummed stay strip to the blank thereby to wind the strip about the blank when the mandrel is rotated.

28. In a machine of the class described, in combination, a mandrel having means for holding a blank with the flaps extending beyond the mandrel, means for attaching a covering sheet to the body of the blank and the portions of the flaps adjacent thereto, means engaging the body of the blank and adjacent portions of the flaps to fold said flaps about the mandrel, means for rotating the mandrel while the blank is so held, and means for attaching the end of a gummed stay strip to the free portion of the blank thereby to wind the strip about the blank when the mandrel is rotated.

29. In a machine of the class described, in combination, a mandrel, means for applying a blank thereto, means for applying adhesive to the body of the blank and to portions of the flaps adjacent thereto, means for attaching a covering sheet to the gummed surface, means engaging the sheet for folding the blank and for holding it folded, means for attaching the end of a stay strip to the blank beyond the covering sheet, and means for rotating the mandrel while the blank is so held thereby to wind the stay strip thereon.

30. In a machine of the class described, in combination, a mandrel having vacuum ports for gripping a folded corner cut box blank, means for energizing and de-energizing the vacuum ports, means for holding the blank folded rotatable with the mandrel, and means for attaching the end of a gummed strip of paper or the like to the blank while on the mandrel, thereby to wind the strip on the blank when the mandrel is rotated.

31. In a machine of the class described, in combination, means for supporting a box, and means movable toward and from the box and controlled by the advance thereof to fold the edge of a finishing strip into the box and to press the said edge against the inner face of the box, said means including a reciprocal plunger having a plurality of combined folding and pressing sections movable toward and from the other transversely of the open end of the box and into and out of the box.

32. In a machine of the class described, in combination, means for folding the extended edge of a finishing strip into a box element, comprising an expansible and contractible plunger having a folding rib for engaging the extended edge, and movable toward and from the box element, and means controlled by the advance of the plunger for first expanding the plunger to cause the rib to engage outside the edge, and then contracting the plunger to turn the edge into the box, and for afterwards expanding the plunger to press the edge against the box.

33. In a machine of the class described, in combination, means for stripping a box from a mandrel, comprising pairs of grippers, means for moving the pairs toward and from the box, and means controlled by the movement of the grippers toward and from the box for actuating the grippers to grip and release the box.

34. In a machine of the class described, in combination, means for stripping a box from a mandrel, comprising pairs of grippers, means for moving the pairs toward and from the box, means controlled by the movement of the grippers toward and from the box for actuating the grippers to grip and release the box, and means for ejecting the box from the grippers controlled by the movement thereof away from the mandrel.

35. In a machine of the character described, in combination, means for holding a box blank from the interior while the box is formed and the cover strip applied, and means for holding the box from the exterior while the edges of the sides of the box are finished.

36. In a machine of the character described, in combination, a turret carrying a plurality of mandrels, and adapted to present box blanks successively to each of a plurality of stations, means for retaining said mandrels against rotation, and means for rendering said retaining means inoperative and for rotating said mandrels at certain of said stations.

37. In a machine of the character described, in combination, a turret carrying mandrels and adapted to present box blanks successively at each of a plurality of stations, means adapted to rotate said mandrels at certain of said stations including gears adapted to come into mesh, and means for holding said mandrels in exact position while said gears are out of mesh to insure the accurate meshing thereof.

38. In a machine of the character described, in combination, a turret having a plurality of box receiving mechanisms thereon, said turret being adapted to present box blanks successively to each of a plurality of stations, and means for advancing and withdrawing said box receiving mechanism at one of said stations.

39. In a machine of the character described, in combination, means for supporting a box blank, means for supporting a paper blank, said last mentioned means being adapted to cause said paper blank to bow outwardly towards the box blank, and means for bringing said bowed portion of the paper blank in contact with the box blank.

40. In a machine of the character described, in combination, a mandrel adapted to support the bodies of box blanks with flaps projecting at the sides of the mandrel, means for folding the flaps of said blanks onto the sides of the mandrel to form the side of a box, comprising folding plates movable to final folding position in contact with a portion of said flaps adjacent the fold lines, leaving portions of said flaps exposed between said plates and the ends of the flaps, said mandrel and plates being mounted for coaxial rotation, means for effecting said rotation, and means for applying a retaining strip over the exposed portion of said flaps during such rotation.

41. In a machine of the character described, in combination, means for supporting a box blank, means for folding flaps upon said box blank to form the sides of a box, comprising a plurality of folding arms, and an adjustable toggle for operating each of said arms.

42. In a machine of the character described, in combination, means for supporting a box blank, means for folding flaps upon said box blank to form the sides of a box, comprising a plurality of levers adapted to engage the sides of a box, and means for operating said levers comprising a head slidably mounted relative to said levers and adjustable links connecting said head with said levers.

43. In a machine of the character described, in combination, means for supporting a box blank, means for folding flaps upon said box blank to form the sides of a box, comprising a plurality of levers, a member upon which said levers are pivoted, means for adjusting the position of the pivot of said levers, and adjustable links for operating said levers.

44. In a machine of the character described, in combination, means for supporting a box blank, means for folding flaps upon said box blank to form the sides of a box, comprising a member reciprocatory relative to said box blank, means upon said reciprocatory member for folding flaps upon said blank to form the sides of a box, said reciprocatory member being journaled for rotation about an axis parallel to its reciprocation, and means for rotating said supporting means and said member about said axis.

45. In a machine of the character described, in combination, means for supporting a box blank, means for folding flaps upon said box blank to form the sides of a box, comprising a member reciprocatory relative to said box blank, a presser head yieldingly mounted upon said reciprocatory member, means upon said reciprocatory member for folding flaps upon said blank to form the sides of a box, said reciprocatory member being journaled for rotation about an axis parallel to its reciprocation, and means for rotating said supporting means and said member about said axis.

46. In a machine of the character described, in combination, means for supporting a box blank, means for folding flaps upon said box blank to form the sides of a box, comprising a member reciprocatory relative to said box blank, means upon said reciprocatory member for folding flaps upon said blank to form the sides of a box, said reciprocatory member being journaled for rotation about an axis parallel to its reciprocation, means for rotating said supporting means and said member about said axis, and yielding means for restraining the rotation.

47. In a machine of the character described, in combination, means for supporting a box blank, means for folding flaps upon said box blank to form the sides of a box, comprising a member reciprocatory relative to said box blank, means upon said reciprocatory member for folding flaps upon said blank to form the sides of a box, said reciprocatory member being journaled for rotation about an axis parallel to its reciprocation, means for rotating said supporting means and said member about said axis, and means for causing said reciprocatory member to stop its rotation in a predetermined position.

48. In a machine of the character described, in combination, means for supporting a box blank, said means being adapted for rotation around an axis, a member mounted for reciprocation toward and from such means along said axis, folding arms adapted to engage the sides of said means pivotally mounted upon said reciprocatory member, means for operating said pivoted arms including a head mounted for movement along said axis independent of said reciprocatory member, means for rotating said reciprocatory member and an element yieldingly engaging a portion of said head to yieldingly restrain the rotation thereof and cause it to cease rotation in a predetermined position.

49. In a machine of the character described, in combination, a box blank supporting means, and means for engaging flaps upon said box blank to hold the same in folded position, both of said means being journaled for rotation about a common axis, means for rotating one of said aforementioned means including a pair of gears, means for bringing said gears into and out of mesh, and an element for stopping the rotation of said member in a predetermined position when said gears are brought out of mesh.

50. In a machine of the character described, in combination, a box blank supporting means and means for engaging flaps upon said box blank to hold the same in folded position, both of said means being journaled for rotation about a common axis, means for rotating one of said aforementioned means including a pair of gears, means for bringing said gears into and out of mesh, an element for stopping the rotation of said member in a predetermined position when said gears are brought out of mesh, and means for simultaneously stopping the other of said members in predetermined position adapted to engage a non-circular portion of said other member.

51. In a machine of the character described, in combination, a box blank supporting means, and means for engaging flaps upon said box blank to hold the same in folded position, both of said means being journaled for rotation about a common axis, means for rotating one of said aforementioned means including a pair of gears, means for bringing said gears into and out of mesh, an element for stopping the rotation of said member in a predetermined position when said gears are brought out of mesh by coming into engagement with a non-circular portion of said member, and an element adapted to engage a non-circular portion of said other member for simultaneously stopping the other of said members in predetermined position.

52. In a machine of the character described, in combination, means adapted to support a box blank perpendicular to an axis, folding arms adapted to fold flaps on said blank, means for rotating said blank and arms about said axis, and means for operating said arms, including a member movable along said axis and rotatable thereon with said arms.

53. In a machine of the character described, in combination, a mandrel adapted to support a box blank perpendicular to an axis, said mandrel being rotatable about said axis, folding arms adapted to extend over flaps upon said blank to hold the same in folded position, means for supporting said arms for movement separate from said mandrel along said axis, and means for rotating said mandrel, whereby said arms are rotated.

54. In a machine of the character described, in combination, a mandrel adapted to support a box blank perpendicular to an axis, said mandrel being rotatable about said axis, folding arms adapted to extend over flaps upon said blank, to hold the same in folded position, and means for rotating said mandrel, whereby said arms are rotated, said rotating means including a rotating member, and means for yieldingly connecting said member with said arms.

55. In a machine of the character described, in combination, means adapted to support a box blank, and mechanism for folding flaps upon said blank to form the sides of a box, comprising a member for pressing against the bottom portion of the blank, and mechanism for folding the flaps, and means for operating said member and said mechanism to bring the member into contact with the bottom of the blank and thereafter to cause the mechanism to fold the flaps on the blank.

56. In a machine of the character described, in combination, a rotatably mounted mandrel adapted to support a box blank, folding arms, a presser plate, means for bringing said plate into contact with the bottom portion of the blank to retain the same in position, means for rotating the blank, means for operating the folding arms to fold the flaps on the blank to form the sides of a box, the operating means being adapted to retain the folding arms in contact with the base portion of the sides of the box while the box is rotated, and means for applying a retaining strip to the remaining portions of the sides of the box while it is rotating.

57. In a machine of the character described, in combination, an edge folding device comprising a hollow rectangle, and means for expanding and contracting the same.

58. In a machine of the character described, in combination, an edge folding device comprising a hollow rectangle, means for expanding and contracting the same, and means for advancing and retracting the rectangle.

59. In a machine of the character described, in combination, means for supporting a box element, an edge turner comprising a hollow rectangle, means for expanding the hollow rectangle to a size greater than the exterior of the box and contracting the same to a size smaller than the interior thereof.

60. In a machine of the character described, in combination, a folder comprising a plurality of angle members arranged to form portions of a rectangle, and spring means for holding said members together, means for guiding the members in a radial movement away from their common center, and means for moving the members away from their common center.

61. In a machine of the character described, in combination, a folder comprising a plurality of angle members arranged to form portions of a rectangle, spring means for holding the members together, means for guiding the members radially to and from their common center, and means movable along the axis through the common center for moving the members apart.

62. In a machine of the character described, in combination, means for supporting a box, a plurality of folding members, means for advancing said folding members and said box relative to each other, and means for moving said members transverse to the direction of the advancement.

63. In a machine of the character described, in combination, means for supporting a box for cover paper adapted to extend beyond the sides thereof, a plurality of folding members, a pair of reciprocating members, one of said reciprocating members being adapted to advance said folding members toward the box and the other of the said reciprocating members being adapted to move the members toward and from each other, and means for reciprocating each of said members to cause them to fold the edges of said cover paper over the box.

64. In a machine of the character described, in combination, means for holding a partially finished box having a cover paper extending over the edges of the sides thereof, a folding plunger, means for advancing said plunger and said box relative to each other, folding members upon said plunger, means for moving said members toward and from each other perpendicular to the direction of relative advancement, said means being adapted to cause said folding members to expand to a size larger than the outside of the box during the initial stages of said advancement, and until said folding members have grasped the outside of said cover paper, said means being adapted thereupon to cause said members to contract to fold the extended portion of said cover paper inwardly, said advancing means being adapted thereupon to advance said members to a position interior of the box, and said expanding means being adapted thereupon to expand said members.

65. In a machine of the class described, in combination, means to secure a covering sheet to a corner cut box blank over the body thereof and adjacent portions of the flaps, and means to attach a stay strip to the flaps with its edge in substantial abutment with the edge of the covering sheet.

66. In a machine of the class described, in combination, means to secure a covering sheet to a corner cut box blank over the body thereof and adjacent portions of the flaps, means to attach a stay strip to the flaps with its edge in substantial abutment with the edge of the covering sheet, and means to attach a finishing strip over the abutting edges of covering sheet and stay strip.

67. In a machine of the class described, in combination, means to secure a covering sheet to a corner cut box blank over the body thereof and adjacent portions of the flaps, means to attach a stay strip to the flaps with its edge in substantial abutment with the edge of the covering sheet, means to attach a finishing strip over the abutting edges of covering sheet and stay strip.

68. In a machine of the class described, in combination, means to secure a covering sheet to a corner cut box blank over the body thereof and adjacent portions of the flaps, means to fold the flaps, and means to attach a stay strip to the flaps, with the edge in substantial abutment with the edge of the covering sheet.

69. In a machine of the class described, in combination, means to secure a covering sheet to a corner cut box blank over the body thereof and adjacent portions of the flaps, means to fold the flaps, means to attach a stay strip to the flaps, with the edge in substantial abutment with the edge of the covering sheet, and means to attach a finishing strip over the abutting edges of covering sheet and stay strip.

70. In a machine of the class described, in combination means to secure a covering sheet to a corner cut box blank over the body thereof and adjacent portions of the flaps, means to fold the flaps, means to attach a stay strip to the flaps, with the edge in substantial abutment with the edge of the covering sheet, means to attach a finishing strip over the abutting edges of covering sheet and stay strip, with its edge extending beyond the free edges of the flaps, and means to turn in the extended edges onto the inner face of the box.

71. In a machine of the class described, in combination, a mandrel for supporting a corner cut box blank, means to attach a covering sheet to a blank on the mandrel, including a magazine to hold the sheets in edgewise relation with the outer face of the outermost sheet substantially free, and means to move the magazine to contact said sheet with the blank.

72. In a machine of the class described, in combination, a mandrel for supporting a corner cut box blank, means to attach a covering sheet to a blank on the mandrel, including a magazine to hold the sheets in edgewise relation with the outer face of the outermost sheet substantially free, means to move the magazine to contact said sheet with the blank, and means to apply adhesive to the blank prior to the attachment of the sheet.

73. In a machine of the class described, in combination, a mandrel for supporting a corner cut box blank, means to attach a covering sheet to a blank on the mandrel, including a magazine to hold the sheets in edgewise relation with the outer face of the outermost sheet substantially free, means to move the magazine to contact said sheet with the blank, and means for varying the extent of movement of the magazine.

74. In a machine of the class described, in combination, a mandrel to support a corner cut box blank, means to apply adhesive to a blank, and means for engaging a covering sheet with the adhesive.

75. In a machine of the class described, in combination, a mandrel to support a corner cut box blank, means to fold the blank on the mandrel, means to rotate the mandrel and the folding means, means to attach the end of a stay strip to the blank prior to its rotation, yielding means to press the strip to place, means for severing the attached portion of the strip, and a common support for the attaching, pressing and severing means movable into and out of operative position.

76. In a machine of the class described, in combination, a mandrel to support a corner cut box blank, means to fold the blank on the mandrel, means to rotate the mandrel and the folding means, means to attach the end of a stay strip to the blank prior to its rotation, yielding means to press the strip to place, a blade to sever the attached strip, and means controlled by the operation of the blade to clean the same after each cutting operation.

77. In a machine of the class described, in combination, a mandrel to support a corner cut box blank, means to fold the blank on the mandrel, means to rotate the mandrel and the folding means, means to attach the end of a stay strip to the blank prior to its rotation, thereby to wind the strip on the blank, a reel for the strip, and means controlled by the movement of the strip to impart a preliminary movement of rotation to the reel.

78. In a machine of the class described, in combination, a rotatable mandrel, releasable means to lock the mandrel from rotation, means to rotate the mandrel when it is released, and means in connection with the locking means to stop the mandrel in a predetermined position.

79. In a machine of the class described, in combination, a rotatable mandrel, releasable means to lock the mandrel from rotation, means to rotate the mandrel normally out of operative position, and means to simultaneously release the mandrel and to move the rotating means into operative position.

80. In a machine of the class described, in combination, a mandrel to hold a corner cut box blank, mechanism to fold the flaps of the blank, means to rotate the mandrel and the folding mechanism, and means to stop the movement thereof with the parts in a predetermined position, including a spring held latch plate adjacent to the folding mechanism.

81. In a machine of the class described, in combination, a mandrel to hold a corner cut box blank, mechanism to fold the flaps of the blank, means to rotate the mandrel and the folding mechanism, and means to stop the movement thereof with the parts in a predetermined positon, including a stop lever adjacent to the mandrel and spring pressed to operative position.

82. In a machine of the class described, in combination, a plurality of mandrel supporting turrets, means to move the turrets to cause the mandrels of one to register in succession with the successive mandrels of the other, means for moving each mandrel of the one turret toward and from the registering mandrel of the other turret, and means controlled by the movement of the mandrel to grip a box on the mandrel of the other turret.

83. In a machine of the class described, in combination, a plurality of mandrel supporting turrets, means to move the turrets to cause the mandrels of one to register in succession with the successive mandrels of the other, means to move each mandrel of the one turret toward and from the registering mandrel of the other turret, means controlled by the movement of the mandrel to grip a box on the mandrel of the other turret, the gripping means including vacuum ports, and means to energize the ports when the mandrels are adjacent.

84. In a machine of the class described, in combination, a plurality of mandrel supporting turrets, means to move the turrets to cause the mandrels of one to register in succession with the successive mandrels of the other, means to move each mandrel of the one turret toward and from the registering mandrel of the other turret, means in connection with the mandrels of each turret to grip a box, including vacuum ports, and means for simultaneously energizing the ports of one registering mandrel and deenergizing the ports of the other registering mandrel.

85. In a machine of the class described, in combination, means to simultaneously engage all of the extended edge of an edging strip on a box, and to sweep said edge into the box, including a hollow rectangle of a configuration to fit within the box, and means to expand and afterwards contract the rectangle.

86. In a machine of the class described, in combination, means to simultaneously engage all of the extended edge of an edging strip on a box, to sweep said edge into the box, including a hollow rectangle of a configuration to fit within the box, means to move the rectangle toward the box, and means to first expand and afterwards contract the rectangle.

87. In a machine of the class described, in combination, means to simultaneously engage all of the extended edge of an edging strip on a box, to sweep said edge into the box, including a hollow rectangle of a configuration to fit within the box, means to move the rectangle toward the box, and means to first expand and afterwards contract the rectangle controlled by the movement of the rectangle toward the box.

88. In a machine of the class described in combination, means to simultaneously engage all of the extended edge of an edging strip, and to sweep said edge into the box, including an extensible hollow rectangle of a configuration to fit within the box, an expander for the rectangle, and means to simultaneously move the rectangle and the expander to cause the expander to first expand the rectangle and to afterwards contract the same.

89. In a machine of the class described, in combination, means to simultaneously engage all of the extended edge of an edging strip on a box, and to sweep said edge into the box, including a normally contracted and expansible hollow rectangle of a configuration to fit within the box, an expander for the rectangle, and means to simultaneously move the rectangle and the expander to cause the relative movement thereof to first expand the rectangle and to afterwards permit it to contract.

90. In a machine of the character described, in combination, a translatable mandrel, and devices adapted to cooperate to apply a corner cut body blank to an end of the mandrel, fold the flaps onto the sides of the mandrel, and apply a strip to stay the flaps in folded relation.

91. In a machine of the character described, in combination, a translatable mandrel, and devices adapted to cooperate to apply a corner cut body blank to an end of the mandrel, fold the flaps onto the sides of the mandrel, and apply a strip to stay the flaps in folded relation, said devices including a swinging table for applying the body blank to said mandrel.

92. In a machine of the character described, in combination, a translatable mandrel, and devices adapted to cooperate to apply a corner cut body blank to an end of the mandrel, fold the flaps onto the sides of the mandrel, and apply a strip to stay the flaps in folded relation, said devices including a swinging table for applying the body blank to said mandrel, a body blank magazine, a reciprocal blank pusher, and rails on which the body blank slides from the magazine to the table.

93. In a machine of the character described, in combination, a translatable mandrel, and devices adapted to cooperate to apply a corner cut body blank to an end of the mandrel, fold the flaps onto the sides of the mandrel, and apply a strip to stay the flaps in folded relation, said devices including a swinging table for applying the body blank to said mandrel, an exhaust device, gripper ports in the end of the mandrel, and means adapted to control communication between the exhaust device and the ports.

94. In a machine of the character described, in combination, a translatable mandrel, and devices adapted to cooperate to apply a corner cut body blank to an end of the mandrel, fold the flaps onto the sides of the mandrel, and apply a strip to stay the flaps in folded relation, means adapted pneumatically to grip the body blank to the end of the mandrel, and means adapted to apply adhesive to the body of the body blank and to the flaps thereof while gripped to the mandrel.

95. In a machine of the character described, in combination, a translatable mandrel, and devices adapted to cooperate to apply a corner cut body blank to an end of the mandrel, fold the flaps onto the sides of the mandrel, and apply a strip to stay the flaps in folded relation, and means adapted to apply a cover sheet to the body blank on the mandrel.

96. In a machine of the character described, in combination, a translatable mandrel, and devices adapted to cooperate to apply a corner cut body blank to an end of the mandrel, fold the flaps onto the sides of the mandrel, and apply a strip to stay the flaps in folded relation, and means adapted to apply a cover sheet to the body blank on the mandrel, including a magazine in which the cover sheets are movable toward the discharge end of the magazine having retaining fingers in the path of the cover sheet, said magazine being adapted to reciprocate toward and from the end of the mandrel.

97. In a machine of the character described, in combination, a translatable mandrel, and devices adapted to cooperate to apply a corner cut body blank to an end of the mandrel, fold the flaps onto the sides of the mandrel, and apply a strip to stay the flaps in folded relation, means adapted pneumatically to grip the body blank to the end of the mandrel, means adapted to apply adhesive to the body of the body blank and to the flaps thereof while gripped to the mandrel, and means adapted to apply a cover sheet to the body blank on the mandrel, including a magazine chute in which the cover sheets are supported at their edges in a pack for gravitative movement toward the discharge end of the chute, said chute being reciprocal to apply the end sheet of the pack to the body blank on the mandrel on movement in one direction, and fingers on said sheet for engaging the margin of the end sheet of the pack to retain the end sheet in delivery position and permit it to be withdrawn on adhering to the body blank on movement of the chute in the opposite direction.

98. In a machine of the character described, in combination, a translatable mandrel, and devices adapted to cooperate to apply a corner cut body blank to an end of the mandrel, fold the flaps onto the sides of the mandrel, and apply a strip to stay the flaps in folded relation, said devices including a plunger movable to press the head or body of the body blank against the mandrel, and folding plates operative to fold the flaps of the body blank onto the sides of the mandrel while the body is pressed by the said plunger.

99. In a machine of the character described, in combination, a translatable mandrel, and devices adapted to cooperate to apply a corner cut body blank to an end of the mandrel, fold the flaps onto the sides of the mandrel, and apply a strip to stay the flaps in folded relation, said devices including a plunger movable to press the head of the body of the body blank against the mandrel, and folding plates operative to fold the flaps of the body blank onto the sides of the mandrel while the body is pressed by the said plunger, the stay strip applying device including means to rotate the mandrel to wind the stay strip about the flaps while the flaps are held folded by the plates.

100. In a machine of the character described, in combination, a translatable mandrel, and devices adapted to cooperate to apply a corner cut body blank to an end of the mandrel, fold the flaps onto the sides of the mandrel, and apply a strip to stay the flaps in folded relation, and means to apply a finishing covering strip over the stay strip.

101. In a machine of the character described, in combination, a translatable mandrel, and devices adapted to cooperate to apply a corner cut body blank to an end of the mandrel, fold the flaps onto the sides of the mandrel, and apply a strip to stay the flaps in folded relation, and means to apply a finishing covering strip over the stay strip, with its edge extending beyond the folded flaps of the body.

102. In a machine of the character described, in combination, a translatable mandrel, and devices adapted to cooperate to apply a corner cut body blank to an end of the mandrel, fold the flaps onto the sides of the mandrel, and apply a strip to stay the flaps in folded relation, and means to apply a finishing strip to the blank with its edges turned over onto the inner faces of the flaps.

103. A machine of the character described including, in combination, a plurality of box mandrels movable in an endless path, a plurality of box receptacles movable in an endless path, a device for supplying corner-cut body blanks, a strip supply device, and means adapted to operate and coordinate the operation of said mandrels, receptacles and devices and to cause body blanks from said supply to be applied to and folded, held, and stayed on said mandrels, respectively, and the folded and stayed blanks transferred to said receptacles, respectively.

104. A machine of the character described including, in combination, a plurality of box mandrels movable in an endless path, a plurality of box receptacles movable in an endless path, a body blank supply device, a strip supply device, means adapted to operate and coordinate the operation of said mandrels, receptacles and devices and to cause body blanks from said supply to be applied to and folded, held, and stayed on said mandrels, respectively, and the folded and stayed blanks transferred to said receptacles, respectively, said mandrels each having a suction gripper face, and said body blank supply device including a body blank table mounted to swing toward and from said faces, and means to deposit body blanks in succession in predetermined position on said table for transport to said faces.

105. A machine of the character described including, in combination, a plurality of box mandrels movable in an endless path, a plurality of box receptacles movable in an endless path, a body blank supply device, a strip supply device, means adapted to operate and coordinate the operation of said mandrels, receptacles and devices and to cause body blanks from said supply to be applied to and folded, held, and stayed on said mandrels, respectively, and the folded and stayed blanks transferred to said receptacles, respectively, said mandrels each having a suction gripper face, and said body blank supply device including a body blank table mounted to swing toward and from said faces, means to deposit body blanks in succession in predetermined position on said table for transport to said faces, a cover sheet supply magazine and a glue supply device alongside the path of said mandrels, a glue applying roller movable from said glue supply device toward and from the path of said mandrels and transversely of said path to apply glue to body blanks on the mandrels, means to actuate said glue roller, and means to move said magazine toward and from the path of said mandrels successively to press the endmost sheets of the pack of cover sheets to the glued faces of the body blanks to attach the cover sheets to the body blanks.

106. A machine of the character described including, in combination, a plurality of box mandrels movable in an endless path, a plurality of box receptacles movable in an endless path, a body blank supply device, a strip supply device, and means adapted to operate and coordinate the operation of said mandrels, receptacles and devices and to cause body blanks from said supply to be applied to and folded, held, and stayed on said mandrels, respectively, and the folded and stayed blanks transferred to said receptacles, respectively, said mandrels each being rotatable at times, said means including a set of spaced blank folding plates reciprocal to and from position successively enclosing the respective mandrels and toward and from the peripheries of the mandrels, a blank presser plate reciprocal between said folding plates toward and from the end face of the mandrel, said set and said presser plate being mounted for rotation coaxially with said mandrel, means adapted to effect the reciprocal movements of said folding plates and said presser plate in timed relation to each other so as to fold the margins of the body blank and press the folded margins against the periphery of the mandrel and simultaneously press the inner portion of the body blank firmly against the end of the mandrel.

107. A machine of the character described including, in combination, a plurality of box mandrels movable in an endless path, a plurality of box receptacles movable in an endless path, a body blank supply device, a strip supply device, means adapted to operate and coordinate the operation of said mandrels, receptacles and devices and to cause body blanks from said supply to be applied to and folded, held, and stayed on said mandrels, respectively, and the folded and stayed blanks transferred to said receptacles, respectively, said mandrels each being rotatable at times, said means including a set of spaced blank folding plates reciprocal to and from position successively enclosing the respective mandrels and toward and from the peripheries of the mandrels, a blank presser plate reciprocal between said folding plates toward and from the end face of the mandrel, said set and said presser plate being mounted for rotation coaxially with said mandrel, means adapted to effect the reciprocal movements of said folding plates and said presser plate in timed relation to each other so as to fold the margins of the body blank and press the folded margins against the periphery of the mandrel and simultaneously press the inner portion of the body blank firmly against the end of the mandrel, and means adapted to rotate the mandrel while the body blank is held folded and pressed by said plates.

108. A machine of the character described including, in combination, a plurality of box mandrels movable in an endless path, a plurality of box receptacles movable in an endless path, a body blank supply device, a strip supply device, means adapted to operate and coordinate the operation of said mandrels, receptacles and devices and to cause body blanks from said supply to be applied to and folded, held, and stayed on said mandrels, respectively, and the folded and stayed blanks transferred to said receptacles, respectively, said mandrels each being rotatable at times, said means including a set of spaced blank folding plates reciprocal to and from position successively enclosing the respective mandrels and toward and from the peripheries of the mandrels, a blank presser plate reciprocal between said folding plates toward and from the end face of the mandrel, said set and said presser plate being mounted for rotation coaxially with said mandrel, means adapted to effect the reciprocal movements of said folding plates and said presser plate in timed relation to each other so as to fold the margins of the body blank and press the folded margins against the periphery of the mandrel and simultaneously press the inner portion of the body blank firmly against the end of the mandrel, means adapted to rotate the mandrel while the body blank is held folded and pressed by said plates, and a resiliently acting check for arresting rotation of said folding plates in predetermined position relative to said mandrel.

109. A machine of the character described including, in combination, a plurality of box mandrels movable in an endless path, a plurality of box receptacles movable in an endless path, a body blank supply device, a strip supply device, means adapted to operate and coordinate the operation of said mandrels, receptacles and devices and to cause body blanks from said supply to be applied to and folded, held, and stayed on said mandrels, respectively, and the folded and stayed blanks transferred to said receptacles, respectively, said strip supply device including reciprocal means adapted to grip and intermittently advance the strip from a supply of strip toward the mandrels, a pressing roller between which and a mandrel the end of the strip advanced by said reciprocal means passes, a reciprocal slide on which said advancing means and said pressing roller are mounted, and means adapted to reciprocate said slide to cause said roller and advancing means to move into and out of positions to cooperate to apply and press the end of the strip to the folded blanks on the mandrels, respectively, means adapted to rotate the mandrel having the strip attached thereto so as to wind the strip on the blank crosswise of the joints between the folds of the blank.

110. A machine of the character described including, in combination, a plurality of box mandrels movable in an endless path, a plurality of box receptacles movable in an endless path, a body blank supply device, a strip supply device, means adapted to operate and coordinate the operation of said mandrels, receptacles and devices and to cause body blanks from said supply to be applied to and folded, held, and stayed on said mandrels, respectively, and the folded and stayed blanks transferred to said receptacles, respectively, said strip supply device including reciprocal means adapted to grip and intermittently advance the strip from a supply of strip toward the mandrels, a pressing roller between which and a mandrel the end of the strip advanced by said reciprocal means passes, a reciprocal slide on which said advancing means and said pressing roller are mounted, and means adapted to reciprocate said slide to cause said roller and advancing means to move into and out of positions to cooperate to apply and press the end of the strip to the folded blanks on the mandrels, respectively, means adapted to rotate the mandrel having the strip attached thereto so as to wind the strip on the blank crosswise of the joints between the folds of the blank, and means mounted on said slide adapted to sever said strip at intervals.

111. A machine of the character described including, in combination, a magazine adapted to support a pile of corner-cut rectangular body blanks, a body blank gluing device, a magazine adapted to support a pack of cover sheets of a size to cover the body of the body blank and lap onto the flaps of the body blank, a body-blank-flap folding device having folders of substantially the widths of the respective flaps but of less effective lengths, a body pressing device of substantially the area of the body, a device adapted to feed adhesive provided stay strip of a width less than the length of a flap of the body blank, a rectangular mandrel operatively movable into and out of operative relation with each of the aforesaid magazines and devices, and means adapted to operate and coordinate the operation of said magazines, devices and mandrel and to cause the body of a body blank of said supply to be applied and held on the end of said mandrel with the flaps projecting beyond the mandrel, to cause said gluing device to coat said body and the adjacent portions of the flaps of said body blank with glue while said blank is held on said mandrel, to cause said body pressing device to firmly press the body of said blank against the end of said mandrel and said flap folding device to fold said flaps and press them against the sides of said mandrel adjacent said body so as to expose a portion of the faces of each of said folded flaps and to cause the winding of stay strip on said flaps across the joints therebetween and in abutting relation to the cover sheet thereon while the blank is held by said flap folding device.

112. A machine of the character described including, in combination, a magazine adapted to support a pile of corner-cut rectangular body blanks, a body blank gluing device, a magazine adapted to support a pack of cover sheets of a size to cover the body of the body blank and lap onto the flaps of the body blank, a body-blank-flap folding device having folders of substantially the widths of the respective flaps but of less effective lengths, a body pressing device of substantially the area of the body, a device adapted to feed adhesive provided stay strip of a width less than the length of a flap of the body blank, a device adapted to feed adhesive provided finishing strip, a rectangular mandrel operatively movable into and out of operative relation with each of the aforesaid magazines and devices, and means adapted to operate and coordinate the operation of said magazines, devices and mandrel and to cause the body of a body blank of said supply to be applied and held on the end of said mandrel with the flaps projecting beyond the mandrel, to cause said gluing device to coat said body and the adjacent portions of the flaps of said body blank with glue while said blank is held on said mandrel, to cause said body pressing device to firmly press the body of said blank against the end of said mandrel and said flap folding device to fold said flaps and press them against the sides of said mandrel adjacent said body so as to expose a portion of the faces of each of said folded flaps and to cause the winding of stay strip on said flaps across the joints therebetween and in abutting relation to the cover sheet thereon while the blank is held by said flap folding device, and to cause the winding of finishing strip on the cover sheet and stay strip on said flaps so that one edge of the wound finishing strip extends beyond the ends of said flaps so as to be adapted for being folded around said ends.

113. A machine of the character described including, in combination, a magazine adapted to support a pile of corner-cut rectangular body blanks, a body blank gluing device, a magazine adapted to support a pack of cover sheets of a size to cover the body of the body blank and lap onto the flaps of the body blank, a body-blank-flap folding device having folders of substantially the widths of the respective flaps but of less effective lengths, a body pressing device of substantially the area of the body, a device adapted to feed adhesive provided stay strip of a width less than the length of a flap of the body blank, a device adapted to feed adhesive provided finishing strip, a rectangular mandred operatively movable into and out of operative relation with each of the aforesaid magazines and devices, and means adapted to operate and coordinate the operation of said magazines, devices and mandrel and to cause the body of a body blank of said supply to be applied and held on the end of said mandrel with the flaps projecting beyond the mandrel, to cause said gluing device to coat said body and the adjacent portions of the flaps of said body blank with glue while said blank is held on said mandrel, to cause said body pressing device to firmly press the body of said blank against the end of said mandrel and said flap folding device to fold said flaps and press them against the sides of said mandrel adjacent said body so as to expose a portion of the faces of each of said folded flaps and to cause the winding of stay strip on said flaps across the joints therebetween and in abutting relation to the cover sheet thereon while the blank is held by said flap folding device, and to cause the, winding of finishing strip on the cover sheet and stay strip on said flaps so that one edge of the wound finishing strip extends beyond the ends of said flaps so as to be adapted for being folded around said ends, a rigid rectangular receptacle, means for transferring the partially finished folded blank from said mandrel into said receptacle so that the open end of the folded blank is at the open end of said receptacle with the edges of the finishing strip projecting, and a combined finishing strip folder and expansible presser movable into and out of said receptacle adapted to fold said finishing around the edge of the folded blank and press said fold against the inner face thereof.

114. A machine of the character described including, in combination, a magazine adapted to support a pile of corner-cut rectangular body blanks, a body blank gluing device, a magazine adapted to support a pack of cover sheets of a size to cover the body of the body blank and lap onto the flaps of the body blank, a body-blank-flap folding device having folders of substantially the widths of the respective flaps but of less effective lengths, a body pressing device of substantially the area of the body, a device adapted to feed adhesive provided stay strip of a width less than the length of a flap of the body blank, a device adapted to feed adhesive provided finishing strip, a rectangular mandrel operatively movable into and out of operative relation with each of the aforesaid magazines and devices, and means adapted to operate and coordinate the operation of said magazines, devices and mandrel and to cause the body of a body blank of said supply to be applied and held on the end of said mandrel with the flaps projecting beyond the mandrel, to cause said gluing device to coat said body and the adjacent portions of the flaps of said body blank with glue while said blank is held on said mandrel, to cause said body pressing device to firmly press the body of said blank against the end of said mandrel and said flap folding device to fold said flaps and press them against the sides of said mandrel adjacent said body so as to expose a portion of the faces of each of said folded flaps and to cause the winding of stay strip on said flaps across the joints therebetween and in abutting relation to the cover sheet thereon while the blank is held by said flap folding device, and to cause the winding of finishing strip on the cover sheet and stay strip on said flaps so that one edge of the wound finishing strip extends beyond the ends of said flaps so as to be adapted for being folded around said ends, a rigid rectangular receptacle, means for transferring the partially finished folded blank from said mandrel into said receptacle so that the open end of the folded blank is at the open end of said receptacle with the edges of the finishing strip projecting, a reciprocal sectional plunger movable into and out of said receptacle, means adapted to move the plunger sections toward and from each other transverse to the movement of the plunger to expand and contract the plunger, each said section having a forwardly projecting folding and pressing rib.

115. A machine of the character described including, in combination, a plurality of rectangular box mandrels movable in an endless path from station to station, a plurality of rectangular box dies movable in an endless path from station to station and so that one of said mandrels registers with one of said dies at one of said stations, said dies each being of a size adapted to surround the peripheries of said mandrels, respectively, and leave a space between periphery and die, means adapted to move said mandrels and dies in said paths, means adapted to cause approaching and receding movements between the die and the mandrel in registry at said one station, a plurality of box presser sections having rectangular corners, a head on which said sections are guided and movable toward and from each other on lines inclined to each other, means for moving said sections toward and from each other at predetermined times, and means for moving said head to move said sections into and out of a die.

116. A machine of the character described including, in combination, a plurality of rectangular box mandrels movable in an endless path from station to station, a plurality of rectangular box dies movable in an endless path from station to station and so that one of said mandrels registers with one of said dies at one of said stations, said dies each being of a size adapted to surround the peripheries of said mandrels, respectively, and leave a space between periphery and die, means adapted to move said mandrels and dies in said paths, means adapted to cause approaching and receding movements between the die and the mandrel in registry at said one station, a plurality of box presser sections having rectangular corners, a head on which said sections are guided and movable toward and from each other on lines inclined to each other, means for moving said sections toward and from each other at predetermined times, and means for moving said head to move said sections into and out of a die, each presser section including a forwardly projecting rib rectangular in exterior outline, the inner face of said rib inclining outwardly in the direction toward its outer edge.

117. A machine of the character described including, in combination, a box supply mechanism, a plurality of box receptacles movable in an endless path, strip folding mechanism, box discharging mechanism, and means adapted to operate and coordinate the operation of said receptacles and mechanisms and to cause transfer of boxes from said supply mechanism to said receptacles, respectively, the folding of box finishing strips into the open ends of the boxes across the edges of the boxes and the subsequent discharge of the boxes from said receptacles.

118. A machine of the character described including, in combination, a plurality of box mandrels movable in an endless path, a plurality of box receptacles movable in an endless path alongside the path of said mandrels, means adapted to move said mandrels and receptacles in their respective paths into and out of positions wherein a mandrel registers with a receptacle, means adapted to cause approaching and receding movement between the mandrel and the receptacle in registry to dispose the mandrel within the receptacle, said mandrels and receptacles having suction grippers adapted to act on the box elements, and means automatically operative to energize and de-energize said grippers at predetermined times.

119. A machine of the character described including, in combination, a plurality of box mandrels movable in an endless path, a plurality of box receptacles movable in an endless path alongside the path of said mandrels into and out of positions wherein a mandrel registers with a receptacle, a body blank supply device, a strip supply device, strip folding mechanism, box discharging mechanism, and means adapted to operate and coordinate the operation of said mandrels, receptacles, devices and mechanisms and to cause body blanks from said supply to be applied to, folded, held and stayed on said mandrels, the folded and stayed blanks transferred from said mandrels to and held in said receptacles, the folding of strip material into the open ends of boxes in said receptacles across the edges of the boxes and the subsequent discharge of the boxes from the receptacles.

120. A machine of the character described including, in combination, a plurality of box mandrels movable in an endless path, a plurality of box receptacles movable in an endless path alongside the path of said mandrels into and out of positions wherein a mandrel registers with a receptacle, a body blank supply device, a strip supply device, strip folding mechanism, box discharging mechanism, and means adapted to operate and coordinate the operation of said mandrels, receptacles, devices and mechanisms and to cause body blanks from said supply to be applied to, folded, held and stayed on said mandrels, the folded and stayed blanks transferred from said mandrels to and held in said receptacles, the folding of strip material into the open ends of boxes in said receptacles across the edges of the boxes and the subsequent discharge of the boxes from the receptacles, said means including mechanism for causing approaching and receding movement between the mandrel and the receptacle in registry to dispose the mandrel within the receptacle.

121. A machine of the character described including, in combination, a plurality of box mandrels movable in an endless path, a plurality of box receptacles movable in an endless path alongside the path of said mandrels into and out of positions wherein a mandrel registers with a receptacle, a body blank supply device, a strip supply device, strip folding mechanism, box discharging mechanism, means adapted to operate and coordinate the operation of said mandrels, receptacles, devices and mechanisms and to cause body blanks from said supply to be applied to, folded, held and stayed on said mandrels, the folded and stayed blanks transferred from said mandrels to and held in said receptacles, the folding of strip material into the open ends of boxes in said receptacles across the edges of the boxes and the subsequent discharge of the boxes from the receptacles, said means including mechanism for causing approaching and receding movement between the mandrel and the receptacle in registry to dispose the mandrel within the receptacle, said mandrels and receptacles having suction grippers adapted to act on the box elements, and means automatically operative to energize and de-energize said grippers at predetermined times.

122. A machine of the character described including, in combination, flap folding mechanism, a box former with which said flap folding mechanism is adapted to cooperate, means adapted to supply, in position for conjoint action of said folding mechanism and former, a corner-cut body blank having a cover sheet adhesively attached to the flaps and extending across the body portion of the body blank, and means for actuating said flap folding mechanism so as to fold said flaps with the attached cover sheet onto the sides of said former and cause said folding to tension the cover sheet across the body of said body blank.

123. A machine of the character described including, in combination, flap folding mechanism, a box former with which said flap folding mechanism is adapted to cooperate, means adapted to supply, in position for conjoint action of said folding mechanism and former, a corner-cut body blank having a cover sheet adhesively attached to the flaps and extending across the body portion of the body blank, means for actuating said flap folding mechanism so as to fold said flaps with the attached cover sheet onto the sides of said former and cause said folding to tension the cover sheet across the body of said body blank, and means adapted to coact to cause strip material to be applied to said flaps to secure them together and stay them in folded relation on said former while held by said folding mechanism.

124. A machine of the character described including, in combination, flap folding mechanism, a box former with which said flap folding mechanism is adapted to cooperate, means adapted to supply, in position for conjoint action of said folding mechanism and former, a corner-cut body blank having a cover sheet adhesively attached to the flaps and extending across the body portion of the body blank, means for actuating said flap folding mechanism so as to fold said flaps with the attached cover sheet onto the sides of said former and cause said folding to tension the cover sheet across the body of said body blank, and means for pressing, supporting and preventing outward bulging of the body of said body blank during folding of said flaps.

125. A machine of the character described including, in combination, flap folding mechanism, a box former with which said flap folding mechanism is adapted to cooperate, means adapted to supply, in position for conjoint action of said folding mechanism and former, a corner-cut body blank having a cover sheet adhesively attached to the flaps and body thereof and extending across the body portion of the body blank, means for actuating said flap folding mechanism so as to fold said flaps with the attached cover sheet onto the sides of said former and cause said folding to tension the cover sheet across the body of said body blank, and means for pressing the cover sheet against the body of the body blank and, simultaneously with said pressing, support and prevent outward bulging of the body of said body blank during folding of said flaps.

126. A machine of the character described including, in combination, flap folding mechanism, a box former with which said flap folding mechanism is adapted to cooperate, means adapted to supply, in position for conjoint action of said folding mechanism and former, a corner-cut body blank having a cover sheet adhesively attached to the flaps and body thereof and extending across the body portion of the body blank, means for actuating said flap folding mechanism so as to fold said flaps with the attached cover sheet onto the sides of said former and cause said folding to tension the cover sheet across the body of said body blank, means for pressing the cover sheet against the body of the body blank and, simultaneously with said pressing, support and prevent outward bulging of the body of said body blank during folding of said flaps, and means adapted to coact to cause strip material to secure said flaps together and stay them in folded relation while held by said folding mechanism and while said body is supported by said pressing means.

127. A machine of the character described including, in combination, flap folding mechanism, a box former with which said flap folding mechanism is adapted to cooperate, means adapted to supply, in position for conjoint action of said folding mechanism and former, a corner-cut body blank having a cover sheet adhesively attached to the flaps and extending across the body portion of the body blank, means for actuating said flap folding mechanism so as to fold said flaps with the attached cover sheet onto the sides of said former and cause said folding to tension the cover sheet across the body of said body blank, means adapted to coact to cause strip material to be applied to said flaps to secure them together and stay them in folded relation on said former while held by said folding mechanism, means adapted to coact to cause strip material to be wound exteriorly on the assemblage of folded flaps crosswise of the joints therebetween and so as to extend beyond the outer ends of said flaps, a hollow mandrel to receive the folded article in its interior and closely fit the exterior of the flap assemblage adjacent the outer ends of said flaps, a plurality of members movable toward and from the hollow mandrel, and toward and from each other transversely of said last mentioned movement, each said member having a forwardly projecting folding and pressing rib movable into and out of said article in said hollow mandrel, and mechanism adapted to cause said movements of said members at predetermined intervals including a device for moving said members away from each other to dispose said ribs in position adapted, on subsequent movement, to contact the exterior of the extended portions of said strip and fold said strip across the ends of the flaps of said article, and press the folded strip against the inner wall of the article against the reaction of the hollow mandrel.

128. A machine of the character described including, in combination, flap folding mechanism, a box former with which said flap folding mechanism is adapted to cooperate, means adapted to apply, to a face of said former, a corner-cut body blank so that the flaps of the blank project from the former, means adapted to apply adhesive to the body and flaps of said body-blank, means adapted to support a pack of cover sheets and cause the centre of the end sheet of the pack to bulge outwardly, means adapted to cause approaching and receding movements between said former and said sheet supporting means to press the end sheet of said pack to the glued face of the body and flaps of said body blank progressively from the bulged centre laterally of the sheet, and means for actuating said flap folding mechanism so as to fold said flaps with the attached cover sheet onto the sides of said former in directions tending to tension the cover sheet by said folding.

129. A machine of the character described including, in combination, flap folding mechanism, a box former with which said flap folding mechanism is adapted to cooperate, means adapted to apply, to a face of said former, a corner-cut body blank so that the flaps of the blank project from the former, means adapted to apply adhesive to the body and flaps of said body blank, means adapted to support a pack of cover sheets and cause the centre of the end sheet of the pack to bulge outwardly, means adapted to cause approaching and receding movements between said former and said sheet supporting means to press the end sheet of said pack to the glued face of the body and flaps of said body blank progressively from the bulged centre laterally of the sheet, means for actuating said flap folding mechanism so as to fold said flaps with the attached cover sheet onto the sides of said former in directions tending to tension the cover sheet by said folding, a presser plate for pressing the adhesively attached cover sheet against the body of the body blank, and the latter against said former, during folding of said flaps, and means for actuating said plate.

130. A machine of the character described including, in combination, flap folding mechanism, a box former with which said flap folding mechanism is adapted to cooperate, means adapted to apply, to a face of said former, a corner-cut body blank so that the flaps of the blank project from the former, means adapted to apply adhesive to the body and flaps of said body blank, means adapted to support a pack of cover sheets and cause the center of the end sheet of the pack to bulge outwardly, means adapted to cause approaching and receding movements between said former and said sheet supporting means to press the end sheet of said pack to the glued face of the body and flaps of said body blank progressively from the bulged center laterally of the sheet, means for actuating said flap folding mechanism so as to fold said flaps with the attached cover sheet onto the sides of said former in directions tending to tension the cover sheet by said folding, a presser plate for pressing the adhesively attached cover sheet against the body of the body blank, and the latter against said former, during folding of said flaps, means for actuating said plate, and means adapted to coact to cause strip material to be applied to said flaps to secure them together, and stay them in folded relation on said former while held by said folding mechanism and while the cover sheet is pressed by said plate.

131. A machine of the character described including, in combination, a mandrel having an outer rectangular periphery, means adapted to coact with said mandrel to hold a corner-cut body-blank against the end thereof and fold the flaps of said blank against said periphery, a hollow mandrel having a rectangular inner periphery slightly larger than the outer periphery of said first mentioned mandrel and having means for retaining therein the folded blank from said first mentioned mandrel, means adapted to move said mandrels into and out of positions in which they register with and at a distance from each other, means adapted to move said mandrels into and out of position in which one telescopes the other, a strip folder mounted operatively to coact with said hollow mandrel when out of registry with the other mandrel, and means to actuate said strip folder.

132. A machine of the character described including, in combination, a mandrel having an outer rectangular periphery, means adapted to coact with said mandrel to hold a corner-cut body-blank against the end thereof and fold the flaps of said blank against said periphery, a hollow mandrel having a rectangular inner periphery slightly larger than the outer periphery of said first mentioned mandrel and having means for retaining therein the folded blank from said first mention mandrel, means adapted to move said mandrels into and out of positions in which they register with and at a distance from each other, means adapted to move said mandrels into and out of position in which one telescopes the other, a strip folder mounted operatively to coact with said hollow mandrel when out of registry with the other mandrel, and means to actuate said strip folder, the end faces of each of said mandrels having ports, said holding and retaining means including suction producing means adapted to communicate with said ports, and means to control said communication.

In testimony whereof I affix my signature.

HAROLD CARLE.